United States Patent
Roop et al.

(10) Patent No.: US 12,503,675 B2
(45) Date of Patent: Dec. 23, 2025

(54) GENETICALLY ENGINEERED YEAST CELLS AND METHODS OF USE THEREOF

(71) Applicant: BERKELEY FERMENTATION SCIENCE, INC., Oakland, CA (US)

(72) Inventors: Jeremy Roop, Berkeley, CA (US); Charles Denby, Berkeley, CA (US); Rachel Li, Berkeley, CA (US); Nicholas Harris, Oakland, CA (US)

(73) Assignee: BERKELEY FERMENTATION SCIENCE, INC., Oakland, CA (US)

( * ) Notice: Subject to any disclaimer, the term of this patent is extended or adjusted under 35 U.S.C. 154(b) by 328 days.

(21) Appl. No.: 17/768,257

(22) PCT Filed: Oct. 16, 2020

(86) PCT No.: PCT/US2020/056022
§ 371 (c)(1),
(2) Date: Apr. 12, 2022

(87) PCT Pub. No.: WO2021/076917
PCT Pub. Date: Apr. 22, 2021

(65) Prior Publication Data
US 2024/0150687 A1 May 9, 2024

Related U.S. Application Data

(60) Provisional application No. 63/086,363, filed on Oct. 1, 2020, provisional application No. 62/916,529, filed on Oct. 17, 2019.

(51) Int. Cl.
| | |
|---|---|
| *C12N 9/88* | (2006.01) |
| *C12C 11/00* | (2006.01) |
| *C12C 12/00* | (2006.01) |
| *C12G 1/022* | (2006.01) |
| *C12N 1/18* | (2006.01) |
| *C12N 15/81* | (2006.01) |

(52) U.S. Cl.
CPC .......... *C12C 12/004* (2013.01); *C12C 11/003* (2013.01); *C12C 12/006* (2013.01); *C12G 1/0203* (2013.01); *C12N 1/18* (2013.01); *C12N 9/88* (2013.01); *C12N 15/81* (2013.01); *C12Y 404/01013* (2013.01); *C12C 2200/05* (2013.01); *C12G 2200/05* (2013.01); *C12G 2200/11* (2013.01); *C12G 2200/15* (2013.01); *C12N 2800/102* (2013.01)

(58) Field of Classification Search
CPC ...... C07K 14/395; C12C 12/04; C12C 12/004
See application file for complete search history.

(56) References Cited

U.S. PATENT DOCUMENTS

| | | |
|---|---|---|
| 2009/0221027 A1 | 9/2009 | Zelder et al. |
| 2018/0312851 A1 | 11/2018 | Falb et al. |
| 2024/0150687 A1* | 5/2024 | Roop ............. C12Y 401/99001 |

FOREIGN PATENT DOCUMENTS

WO  WO 2007/095682 A1  8/2007

OTHER PUBLICATIONS

EP 20877078.4, Oct. 9, 2023, Extended European Search Report.
PCT/US2020/056022, Dec. 31, 2020, Invitation to Pay Additional Fees.
PCT/US2020/056022, Mar. 2, 2021, International Search Report and Written Opinion.
PCT/US2020/056022, Apr. 28, 2022, International Preliminary Report on Patentability.
Cordente et al., "Inactivating Mutations in Irc7p Are Common in Wine Yeasts, Attenuating Carbon-Sulfur β-Lyase Activity and Volatile Sulfur Compound Production", The Australian Wine Research Institute, Glen Osmond, South Australia, Australia, Applied and Environmental Microbiology, Mar. 2019, vol. 85, Issue 6, pp. 1-14.
Pinu et al., "Concentrations of the Volatile Thiol 3-Mercaptohexanol in Sauvignon blank Wines: No Correlation with Juice Precursors", American Journal of Enology and Viticulture, 2012, vol. 63, Issue 3, pp. 407-412.
Michel et al., "Screening of brewing yeast β-lyase activity and release of hop volatile thiols from precursors during fermentation", BrewingScience, Nov. / Dec. 2019, vol. 72, pp. 179-186.
Phillips et al., Formation in vitro hybrid dimers of H463F and Y74F mutant *Escherichia coli* tryptophan indole-lyase rescues activity with L-tryptophan. Biochemistry. Mar. 26, 2002;41(12):4012-9. doi: 10.1021/bi015838t.
Roncoroni et al., The yeast IRC7 gene encodes a β-lyase responsible for production of the varietal thiol 4-mercapto-4-methylpentan-2-one in wine. Food Microbiol. Aug. 2011;28(5):926-35. doi: 10.1016/j.fm.2011.01.002. Epub Jan. 13, 2011.
Swiegers et al., Engineering volatile thiol release in *Saccharomyces cerevisiae* for improved wine aroma. Yeast. Jul. 2007;24(7):561-74. doi: 10.1002/yea.1493.

* cited by examiner

*Primary Examiner* — Tekchand Saidha
(74) *Attorney, Agent, or Firm* — Squire Patton Boggs (US) LLP

(57) ABSTRACT

Provided herein are genetically modified yeast cells that recombinantly expresses a gene encoding a mutant beta-lyase. Also provided are methods of producing fermented products and methods of producing ethanol.

20 Claims, 13 Drawing Sheets
Specification includes a Sequence Listing.

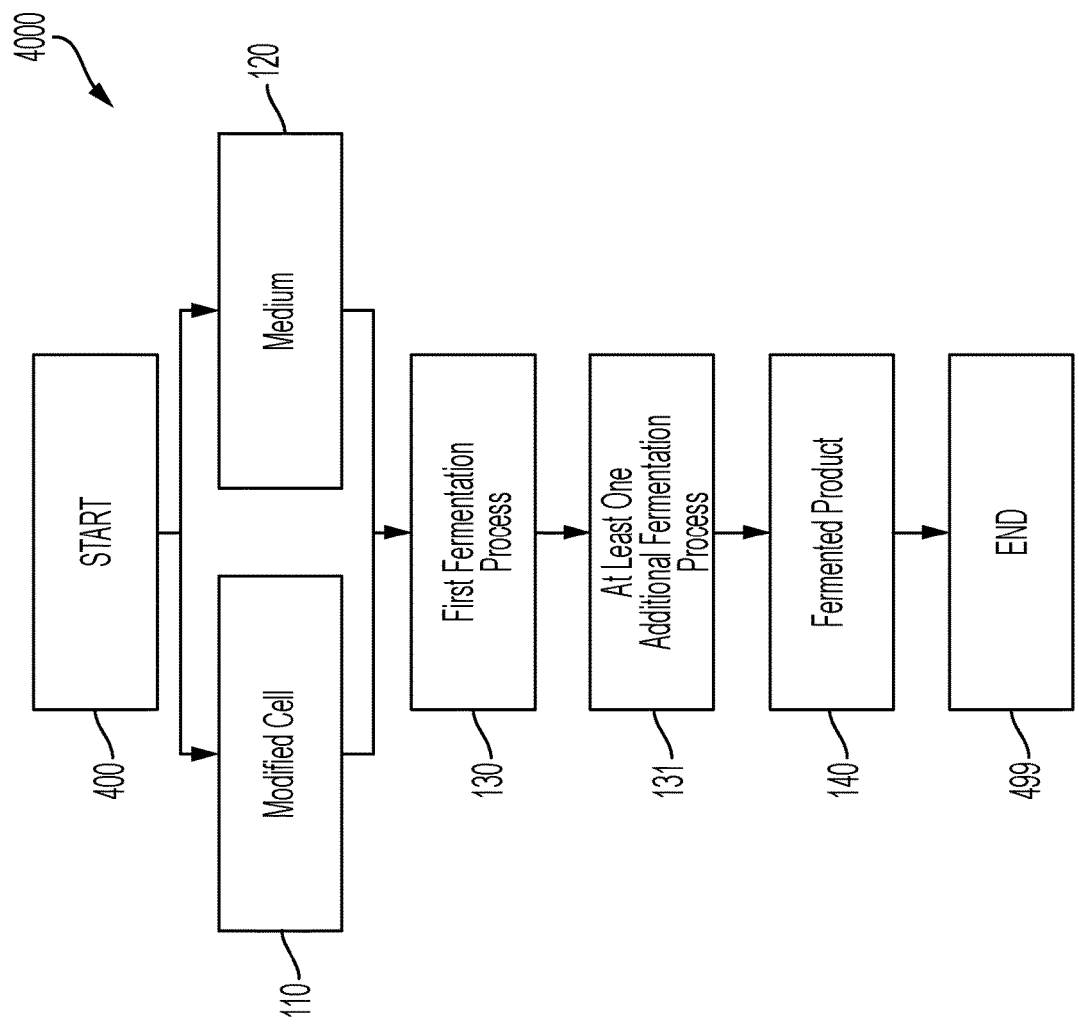

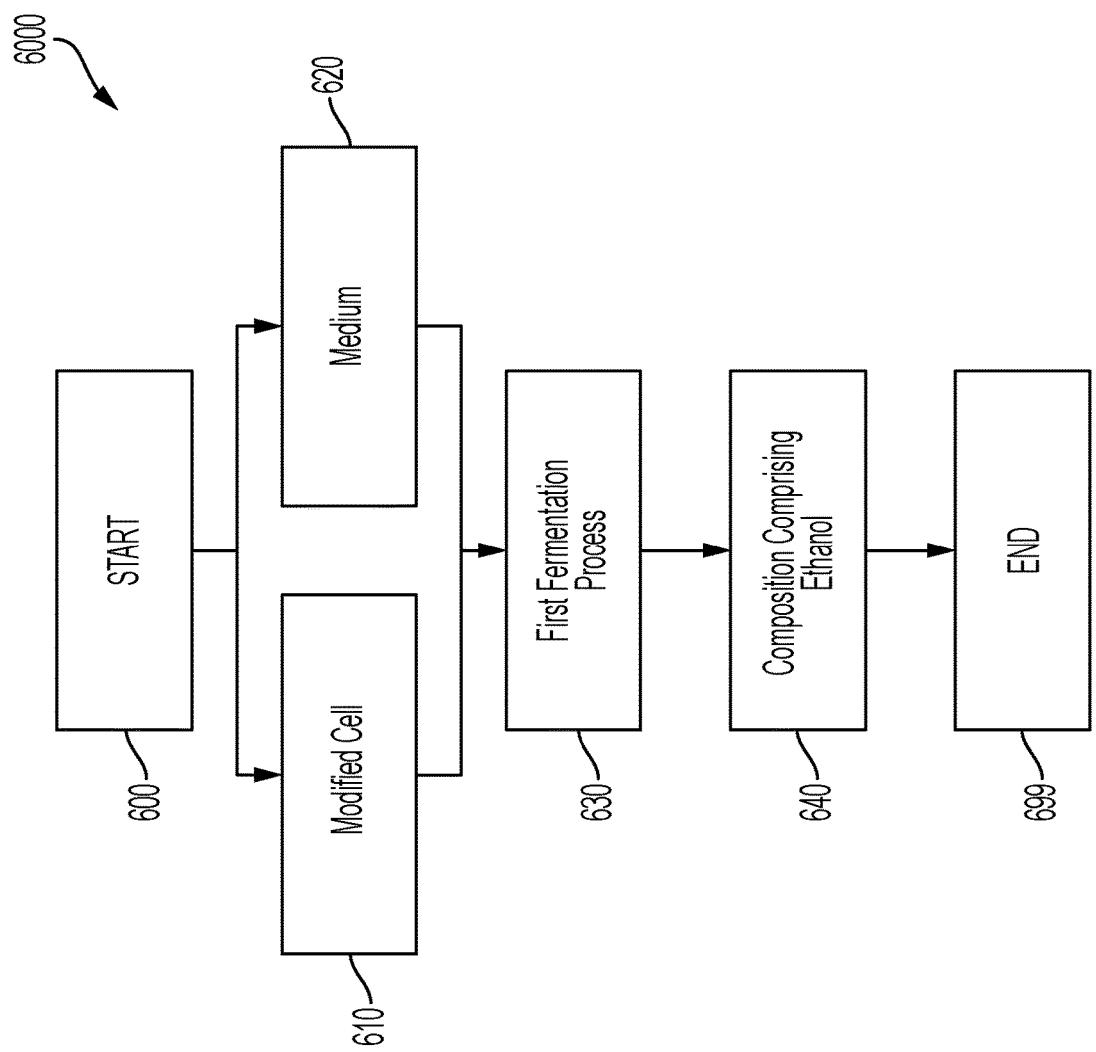

SEQUENCE LISTING

<160> NUMBER OF SEQ ID NOS: 9

<210> SEQ ID NO 1
<211> LENGTH: 471
<212> TYPE: PRT
<213> ORGANISM: Citrobacter amalonaticus

<400> SEQUENCE: 1

Met Asp Asn Phe Lys His Leu Pro Glu Pro Phe Arg Ile Arg Val Ile
1               5                   10                  15

Glu Pro Val Lys Arg Thr Thr Arg Glu His Arg Asn Asn Ala Ile Ile
            20                  25                  30

Lys Ser Gly Met Asn Pro Phe Leu Leu Asp Ser Glu Asp Val Phe Ile
        35                  40                  45

```
Asp Leu Leu Thr Asp Ser Gly Thr Gly Ala Val Thr Gln Asn Met Gln
    50                  55                  60

Ala Ala Met Leu Arg Gly Asp Glu Ala Tyr Ser Gly Ser Arg Ser Tyr
 65                  70                  75                  80

Tyr Ala Leu Ser Glu Ala Val Lys Asn Ile Phe Gly Tyr Gln Tyr Thr
                 85                  90                  95

Ile Pro Thr His Gln Gly Arg Gly Ala Glu Gln Ile Tyr Ile Pro Val
            100                 105                 110

Leu Ile Lys Lys Arg Glu Gln Glu Lys Gly Leu Asp Arg Ser Lys Met
        115                 120                 125

Ala Val Phe Ser Asn Tyr Phe Asp Thr Thr Gln Gly His Ser Gln
    130                 135                 140

Ile Asn Gly Cys Ala Val Arg Asn Val Tyr Ile Lys Glu Ala Phe Asp
145                 150                 155                 160

Thr Gly Val Arg Tyr Asp Phe Lys Gly Asn Phe Asp Leu Asp Gly Leu
                165                 170                 175

Glu Arg Gly Ile Gln Glu Val Gly Pro Asn Asn Val Pro Tyr Ile Val
            180                 185                 190

Ala Thr Ile Thr Ser Asn Ser Ala Gly Gly Gln Pro Val Ser Leu Ala
        195                 200                 205

Asn Leu Lys Ala Met Tyr Asn Ile Ala Lys Lys Tyr Asp Ile Pro Val
    210                 215                 220

Val Met Asp Ser Ala Arg Phe Ala Glu Asn Ala Tyr Phe Ile Gln Lys
225                 230                 235                 240

Arg Glu Ala Glu Tyr Arg Asp Trp Ser Ile Glu Ile Thr Arg Glu
                245                 250                 255

Thr Tyr Lys Tyr Ala Asp Met Leu Ala Met Ser Ala Lys Lys Asp Ala
                260                 265                 270

Met Val Pro Met Gly Gly Leu Leu Cys Ile Lys Asp Asp Thr Tyr Phe
            275                 280                 285

Asp Val Tyr Thr Glu Cys Arg Thr Leu Cys Val Val Gln Glu Gly Phe
        290                 295                 300

Pro Thr Tyr Gly Gly Leu Glu Gly Gly Ala Met Glu Arg Leu Ala Val
305                 310                 315                 320

Gly Leu Val Asp Gly Met Asn Gln Asp Trp Leu Ala Tyr Arg Ile Ala
                325                 330                 335

Gln Val Gln Tyr Leu Val Asp Gly Leu Glu Ala Ile Gly Val Thr Cys
            340                 345                 350

Gln Gln Ala Gly Gly His Ala Ala Phe Val Asp Ala Gly Lys Leu Leu
        355                 360                 365

Pro His Ile Pro Ala Glu Gln Phe Pro Ala Gln Ala Leu Ala Cys Glu
    370                 375                 380

Leu Tyr Lys Val Ala Gly Ile Arg Ala Val Glu Ile Gly Ser Phe Leu
385                 390                 395                 400

Leu Gly Arg Asp Pro Lys Thr Gly Lys Gln Leu Pro Cys Pro Ala Glu
                405                 410                 415

Leu Leu Arg Leu Thr Ile Pro Arg Ala Thr Tyr Thr Gln Ser His Met
            420                 425                 430

Asp Phe Ile Ile Glu Ala Phe Glu His Val Lys Glu Asn Ser Met Asn
        435                 440                 445

Ile Lys Gly Leu Thr Phe Thr Tyr Glu Pro Lys Val Leu Arg His Phe
    450                 455                 460
```

```
Thr Ala Lys Leu Lys Glu Val
465                 470
```

<210> SEQ ID NO 2
<211> LENGTH: 471
<212> TYPE: PRT
<213> ORGANISM: Artificial Sequence
<220> FEATURE:
<223> OTHER INFORMATION: Synthetic

<400> SEQUENCE: 2

```
Met Asp Asn Phe Lys His Leu Pro Glu Pro Phe Arg Ile Arg Val Ile
1               5                   10                  15

Glu Pro Val Lys Arg Thr Thr Arg Glu His Arg Asn Asn Ala Ile Ile
            20                  25                  30

Lys Ser Gly Met Asn Pro Phe Leu Leu Asp Ser Glu Asp Val Phe Ile
        35                  40                  45

Asp Leu Leu Thr Asp Ser Gly Thr Gly Ala Val Thr Gln Asn Met Gln
    50                  55                  60

Ala Ala Met Leu Arg Gly Asp Glu Ala Tyr Ser Gly Ser Arg Ser Tyr
65              70                  75                  80

Tyr Ala Leu Ser Glu Ala Val Lys Asn Ile Phe Gly Tyr Gln Tyr Thr
                85                  90                  95

Ile Pro Thr His Gln Gly Arg Gly Ala Glu Gln Ile Tyr Ile Pro Val
            100                 105                 110

Leu Ile Lys Lys Arg Glu Gln Glu Lys Gly Leu Asp Arg Ser Lys Met
        115                 120                 125

Ala Val Phe Ser Asn Tyr Phe Phe Asp Thr Thr Gln Gly His Ser Gln
130                 135                 140

Ile Asn Gly Cys Ala Val Arg Asn Val Tyr Ile Lys Glu Ala Phe Asp
145                 150                 155                 160

Thr Gly Val Arg Tyr Asp Phe Lys Gly Asn Phe Asp Leu Asp Gly Leu
                165                 170                 175

Glu Arg Gly Ile Gln Glu Val Gly Pro Asn Asn Val Pro Tyr Ile Val
            180                 185                 190

Ala Thr Ile Thr Ser Asn Ser Ala Gly Gly Gln Pro Val Ser Leu Ala
        195                 200                 205

Asn Leu Lys Ala Met Tyr Asn Ile Ala Lys Lys Tyr Asp Ile Pro Val
    210                 215                 220

Val Met Asp Ser Ala Arg Phe Ala Glu Asn Ala Tyr Phe Ile Gln Lys
225                 230                 235                 240

Arg Glu Ala Glu Tyr Arg Asp Trp Ser Ile Glu Glu Ile Thr Arg Glu
                245                 250                 255

Thr Tyr Lys Tyr Ala Asp Met Leu Ala Met Ser Ala Lys Lys Asp Ala
            260                 265                 270

Met Val Pro Met Gly Gly Leu Leu Cys Ile Lys Asp Asp Thr Tyr Phe
        275                 280                 285

Asp Val Tyr Thr Glu Cys Arg Thr Leu Cys Val Val Gln Glu Gly Phe
    290                 295                 300

Pro Thr Tyr Gly Gly Leu Glu Gly Gly Ala Met Glu Arg Leu Ala Val
305                 310                 315                 320

Gly Leu Val Asp Gly Met Asn Gln Asp Trp Leu Ala Tyr Arg Ile Ala
                325                 330                 335

Gln Val Gln Tyr Leu Val Asp Gly Leu Glu Ala Ile Gly Val Thr Cys
            340                 345                 350
```

```
Gln Gln Ala Gly Gly His Ala Ala Phe Val Asp Ala Gly Lys Leu Leu
            355                 360                 365
Pro His Ile Pro Ala Glu Gln Phe Pro Ala Gln Ala Leu Ala Cys Glu
            370                 375                 380
Leu Tyr Lys Val Ala Gly Ile Arg Ala Val Glu Ile Gly Ser Phe Leu
385                 390                 395                 400
Leu Gly Arg Asp Pro Lys Thr Gly Lys Gln Leu Pro Cys Pro Ala Glu
            405                 410                 415
Leu Leu Arg Leu Thr Ile Pro Arg Ala Thr Tyr Thr Gln Ser His Met
            420                 425                 430
Asp Phe Ile Ile Glu Ala Phe Glu His Val Lys Glu Asn Ser Met Asn
            435                 440                 445
Ile Lys Gly Leu Thr Phe Thr Tyr Glu Pro Lys Val Leu Arg Phe Phe
450                 455                 460
Thr Ala Lys Leu Lys Glu Val
465                 470

<210> SEQ ID NO 3
<211> LENGTH: 461
<212> TYPE: PRT
<213> ORGANISM: Trichoderma asperellum

<400> SEQUENCE: 3

Met Leu Pro Asp Cys His Leu Pro Glu Thr Trp Arg Ala Lys Met Val
1               5                   10                  15
Glu Arg Ile Pro Ser Ser Thr Lys Asp Gln Arg Gln Glu Trp Ile Cys
            20                  25                  30
Lys Ala Asp Tyr Asn Leu Phe Lys Leu Arg Ser Asn Glu Val Arg Phe
            35                  40                  45
Asp Leu Gly Thr Asp Gly Gly Ser Gly Gly Met Ser Asp Asn Gln Trp
        50                  55                  60
Ser Ala Leu Met Arg Gly Asp Ser Ala Ala Thr Arg Ser Pro Ser Ser
65              70                  75                  80
Tyr Arg Leu Gln Glu Lys Val Lys Glu Leu Phe Gly Phe Thr Tyr Thr
                85                  90                  95
Ile Pro Val His Arg Gly Arg Ala Ala Lys His Ala Leu Val Gln Ala
            100                 105                 110
Leu Leu Asn Glu Glu Ser Ile Val Pro Gly Asn Ala Phe Phe Asp Thr
        115                 120                 125
Thr Arg Ala Asn Ile Glu Ser Gln Lys Ala Ile Ala Ile Asp Cys Ala
        130                 135                 140
Ile Glu Gly Ala Phe Asp Ile Tyr Tyr Gln His Pro Phe Lys Gly Asn
145                 150                 155                 160
Val Asn Leu Pro Glu Leu Glu Lys Ile Leu Gln Gly Ser Gly Ser Asn
                165                 170                 175
Val Pro Met Ile Met Val Ser Ile Thr Cys Asp Lys Thr Gly Gly Gln
            180                 185                 190
Pro Val Ser Met His Asn Leu Arg Glu Val Lys Arg Leu Ala Lys Met
        195                 200                 205
Phe Asn Val Pro Val Ile Leu Asp Ser Ala Arg Phe Ala Glu Asn Ala
    210                 215                 220
Trp Phe Ile Gln Lys Asn Glu Ser Glu Tyr Ser Ser Gln Ser Ile Pro
225                 230                 235                 240
Asp Ile Val Gln Glu Met Tyr His His Ala Asp Gly Met Val Met Ser
                245                 250                 255
```

Gly Lys Thr Asp Gly Leu Val Asn Ala Gly Phe Phe Ala Thr Asn
            260                 265                 270

Asn Lys Asp Leu Phe Asp Arg Val Gly Lys Tyr Ala Asn Leu Phe Cys
        275                 280                 285

Gly Leu Ala Gly Arg Asp Met Glu Ala Leu Thr Val Gly Leu Gly Glu
    290                 295                 300

Val Thr Gln Gln Glu Tyr Leu Asp Asp Arg Ile Arg Gln Ile His Arg
305                 310                 315                 320

Phe Gly Met Arg Leu Met Ala Ala Asn Val Pro Ile Gln Gln Pro Ile
                325                 330                 335

Gly Gly His Ala Ile Val Ile Asp Ala Ser Leu Phe Leu Pro Leu Val
            340                 345                 350

Pro Arg Glu Glu Tyr Val Ala Lys Thr Leu Ala Val Glu Leu Tyr Val
        355                 360                 365

Glu Ala Gly Ile Arg Gly Ala Gly Met Glu Thr Val Ile Gly Gly Gly
    370                 375                 380

Asn Pro Ile Thr Gly Ile Asn Arg Asn Arg Ser Asn Ala Lys Asp Phe
385                 390                 395                 400

Leu Tyr Leu Ala Ile Pro Arg Gln Ala Tyr Thr Asn Asp Gln Leu Ser
                405                 410                 415

Phe Val Ala Asn Ala Leu Ile Gln Ile Phe Glu Arg Arg Phe Thr Ile
            420                 425                 430

Thr Arg Gly Leu Tyr Val Val His Glu Asp Ala Ile Leu Arg Tyr Leu
        435                 440                 445

Thr Ile Gln Leu Lys Lys Ala Asp Gly Lys Ser Ile Ala
    450                 455                 460

<210> SEQ ID NO 4
<211> LENGTH: 473
<212> TYPE: PRT
<213> ORGANISM: Artificial Sequence
<220> FEATURE:
<223> OTHER INFORMATION: Synthetic

<400> SEQUENCE: 4

Met Asn Asn Phe Lys His Leu Pro Glu Pro Phe Arg Ile Arg Val Val
1               5                   10                  15

Glu Pro Val Lys Arg Thr Thr Leu Ala Tyr Arg Glu Lys Ala Ile Leu
            20                  25                  30

Asn Ala Gly Met Asn Pro Phe Leu Leu Asp Ser Lys Asp Val Phe Ile
        35                  40                  45

Asp Leu Leu Thr Asp Ser Gly Thr Gly Ala Ile Thr Gln Glu Met Gln
    50                  55                  60

Ala Ala Met Phe Ile Gly Asp Glu Ala Tyr Ser Gly Ser Arg Ser Tyr
65                  70                  75                  80

Tyr Ala Leu Ala Asp Ala Val Lys Asp Ile Phe Gly Tyr Glu Tyr Thr
                85                  90                  95

Ile Pro Thr His Gln Gly Arg Gly Ala Glu Gln Ile Tyr Ile Pro Val
            100                 105                 110

Leu Ile Lys Lys Arg Glu Lys Glu Lys Gly Leu Asp Arg Thr Lys Met
        115                 120                 125

Val Ala Leu Ser Asn Tyr Phe Phe Asp Thr Thr Gln Gly His Thr Gln
    130                 135                 140

Leu Asn Ala Cys Val Ala Lys Asn Val Phe Thr Lys Glu Ala Phe Asp
145                 150                 155                 160

```
Thr Ser Ile Ser Ala Asp Phe Lys Gly Asn Phe Asp Leu Glu Leu Leu
            165                 170                 175

Glu His Ala Ile Leu Glu Ala Gly Pro Gln Asn Val Pro Tyr Ile Val
        180                 185                 190

Ser Thr Ile Thr Cys Asn Ser Ala Gly Gly Gln Pro Val Ser Ile Ala
            195                 200                 205

Asn Leu Lys Ala Val Tyr Glu Ile Ala Gln Arg Tyr Glu Ile Pro Val
        210                 215                 220

Ile Met Asp Ser Ala Arg Phe Ala Glu Asn Ala Tyr Phe Ile Gln Gln
225                 230                 235                 240

Arg Glu Pro Glu Tyr Gln Asp Trp Ser Ile Glu Ala Ile Thr Phe Glu
            245                 250                 255

Ser Tyr Lys Tyr Ala Asp Ala Leu Ala Met Ser Ala Lys Lys Asp Ala
            260                 265                 270

Met Val Gln Met Gly Gly Leu Leu Cys Phe Lys Asp Lys Ser Met Leu
            275                 280                 285

Asp Val Tyr Asn Glu Cys Arg Thr Leu Cys Val Val Gln Glu Gly Phe
            290                 295                 300

Pro Thr Tyr Gly Gly Leu Glu Gly Gly Ala Met Glu Arg Leu Ala Val
305                 310                 315                 320

Gly Leu Tyr Asp Gly Met Arg Gln Asp Trp Leu Ala Tyr Arg Ile Asn
                325                 330                 335

Gln Val Gln Tyr Leu Val Asn Gly Leu Glu Ser Ile Gly Ile Val Cys
            340                 345                 350

Gln Gln Ala Gly Gly His Ala Ala Phe Val Asp Ala Gly Lys Leu Leu
            355                 360                 365

Pro His Ile Pro Ala Asp Gln Phe Pro Ala His Ala Leu Ala Cys Glu
            370                 375                 380

Leu Tyr Lys Val Ala Gly Ile Arg Ala Val Glu Ile Gly Ser Leu Leu
385                 390                 395                 400

Leu Gly Arg Asp Pro Thr Thr Gly Lys Gln His Pro Cys Pro Ala Glu
                405                 410                 415

Leu Leu Arg Leu Thr Ile Pro Arg Ala Thr Tyr Thr Gln Thr His Met
            420                 425                 430

Asp Phe Ile Ile Glu Ala Phe Glu Lys Val Lys Glu Asn Ala Ser His
            435                 440                 445

Val Lys Gly Leu Thr Phe Thr Tyr Glu Pro Glu Val Leu Arg Phe Phe
        450                 455                 460

Thr Ala Arg Leu Lys Glu Val Glu Asn
465                 470

<210> SEQ ID NO 5
<211> LENGTH: 460
<212> TYPE: PRT
<213> ORGANISM: Artificial Sequence
<220> FEATURE:
<223> OTHER INFORMATION: Synthetic

<400> SEQUENCE: 5

Met Pro Asn Thr Ala Thr Pro Gly Thr Trp Arg Val Lys Thr Val Glu
1               5                   10                  15

His Ile Arg Pro Ser Thr Arg Asp Gln Arg Gln Gln Trp Ile Glu Glu
            20                  25                  30

Ala Gly Phe Asn Leu Phe Thr Leu Pro Ser Asp Arg Val Phe Ile Asp
        35                  40                  45
```

```
Leu Leu Thr Asp Ser Gly Thr Gly Ala Met Ser Asp Arg Gln Trp Ala
     50                  55                  60

Ala Ile Met Ser Gly Asp Glu Ser Tyr Ala Gly Ser Thr Ser Phe His
 65                  70                  75                  80

Ala Leu His Glu Val Val Gln Asp Leu Phe Gly Leu Glu Tyr Leu Leu
                     85                  90                  95

Pro Val His Gln Gly Arg Ala Ala Glu Asn Ala Leu Phe Ser Val Leu
                100                 105                 110

Val His Glu Asp Gln Leu Val Pro Ala Asn Ser His Phe Asp Thr Thr
            115                 120                 125

Arg Ala His Ile Glu Phe Arg Lys Ala Ala Val Asp Cys Leu Ser
        130                 135                 140

Ser Gly Ala Tyr Asp Val Thr Asp Thr Asn Pro Phe Lys Gly Asn Met
145                 150                 155                 160

Asn Leu Asp Met Leu Arg Asp Ile Leu Gln Glu Ser His Ala Arg Val
                165                 170                 175

Pro Phe Ile Leu Leu Thr Ile Thr Cys Asn Thr Thr Gly Gly Gln Pro
                180                 185                 190

Val Ser Leu Ala Asn Ile Ala Ala Val Lys Ala Leu Ala Asp Arg Tyr
            195                 200                 205

His Lys Pro Leu Val Val Asp Ala Ala Arg Phe Ala Glu Asn Ala Trp
        210                 215                 220

Phe Ile Gln Gln Arg Glu Pro Gly Tyr Arg Asp Thr Ser Leu Arg Asp
225                 230                 235                 240

Ile Thr Arg Gln Met Leu Gly Met Ala Asp Ala Met Val Met Ser Ala
                245                 250                 255

Lys Lys Asp Gly Leu Val Asn Ile Gly Gly Phe Leu Ala Thr Arg His
            260                 265                 270

Arg Glu Trp Phe Asp Gln Ala Thr Glu Tyr Val Ile Leu Phe Glu Gly
        275                 280                 285

Phe Arg Thr Tyr Gly Gly Leu Ala Gly Arg Asp Leu Ala Ala Leu Ala
290                 295                 300

Val Gly Leu Glu Glu Val Ile Ser Ala Asp Tyr Leu Ala Ser Arg Ile
305                 310                 315                 320

Gly Gln Val Gln Arg Phe Gly Gln Arg Leu Ile Asp Ala Gly Val Pro
                325                 330                 335

Ile Gln Gln Pro Val Gly Gly His Ala Val Leu Val Asp Ala Ser Arg
            340                 345                 350

Phe Leu Pro Glu Val Pro Arg Glu Tyr Val Ala Gln Thr Leu Ala
        355                 360                 365

Val Glu Leu Tyr Leu Glu Ala Gly Val Arg Gly Val Glu Ile Gly Thr
        370                 375                 380

Leu Leu Asn Gly Arg Asp Pro Glu Ser Gly Glu Glu Arg Phe Ala Glu
385                 390                 395                 400

Thr Glu Trp Leu Arg Leu Ala Ile Pro Arg Arg Val Tyr Ser Asn Asp
                405                 410                 415

His Leu Glu Tyr Val Ala Gln Ala Leu Ile Asp Leu Tyr His Arg Arg
            420                 425                 430

Ser Glu Ile Arg Ala Gly Val Arg Ile Val Glu Glu Lys Pro Val Leu
        435                 440                 445

Arg Phe Phe Thr Val Arg Leu Glu Arg Lys Thr Glu
450                 455                 460
```

```
<210> SEQ ID NO 6
<211> LENGTH: 473
<212> TYPE: PRT
<213> ORGANISM: Zooshikella ganghwensis

<400> SEQUENCE: 6

Met Asn Asn Phe Lys His Leu Pro Glu Pro Phe Arg Ile Arg Val Val
1               5                   10                  15

Glu Pro Val Lys Arg Thr Thr Leu Ala Tyr Arg Glu Lys Ala Ile Leu
            20                  25                  30

Asn Ala Gly Met Asn Pro Phe Leu Leu Asp Ser Lys Asp Val Phe Ile
        35                  40                  45

Asp Leu Leu Thr Asp Ser Gly Thr Gly Ala Ile Thr Gln Glu Met Gln
    50                  55                  60

Ala Ala Met Phe Ile Gly Asp Glu Ala Tyr Ser Gly Ser Arg Ser Tyr
65                  70                  75                  80

Tyr Ala Leu Ala Asp Ala Val Lys Asp Ile Phe Gly Tyr Glu Tyr Thr
                85                  90                  95

Ile Pro Thr His Gln Gly Arg Gly Ala Glu Gln Ile Tyr Ile Pro Val
            100                 105                 110

Leu Ile Lys Lys Arg Glu Lys Glu Lys Gly Leu Asp Arg Thr Lys Met
        115                 120                 125

Val Ala Leu Ser Asn Tyr Phe Phe Asp Thr Thr Gln Gly His Thr Gln
130                 135                 140

Leu Asn Ala Cys Val Ala Lys Asn Val Phe Thr Lys Glu Ala Phe Asp
145                 150                 155                 160

Thr Ser Ile Ser Ala Asp Phe Lys Gly Asn Phe Asp Leu Glu Leu Leu
                165                 170                 175

Glu His Ala Ile Leu Glu Ala Gly Pro Gln Asn Val Pro Tyr Ile Val
            180                 185                 190

Ser Thr Ile Thr Cys Asn Ser Ala Gly Gly Gln Pro Val Ser Ile Ala
        195                 200                 205

Asn Leu Lys Ala Val Tyr Glu Ile Ala Gln Arg Tyr Glu Ile Pro Val
    210                 215                 220

Ile Met Asp Ser Ala Arg Phe Ala Glu Asn Ala Tyr Phe Ile Gln Gln
225                 230                 235                 240

Arg Glu Pro Glu Tyr Gln Asp Trp Ser Ile Glu Ala Ile Thr Phe Glu
                245                 250                 255

Ser Tyr Lys Tyr Ala Asp Ala Leu Ala Met Ser Ala Lys Lys Asp Ala
            260                 265                 270

Met Val Gln Met Gly Gly Leu Leu Cys Phe Lys Asp Lys Ser Met Leu
        275                 280                 285

Asp Val Tyr Asn Glu Cys Arg Thr Leu Cys Val Val Gln Glu Gly Phe
    290                 295                 300

Pro Thr Tyr Gly Gly Leu Glu Gly Gly Ala Met Glu Arg Leu Ala Val
305                 310                 315                 320

Gly Leu Tyr Asp Gly Met Arg Gln Asp Trp Leu Ala Tyr Arg Ile Asn
                325                 330                 335

Gln Val Gln Tyr Leu Val Asn Gly Leu Glu Ser Ile Gly Ile Val Cys
            340                 345                 350

Gln Gln Ala Gly Gly His Ala Ala Phe Val Asp Ala Gly Lys Leu Leu
        355                 360                 365

Pro His Ile Pro Ala Asp Gln Phe Pro Ala His Ala Leu Ala Cys Glu
    370                 375                 380
```

```
Leu Tyr Lys Val Ala Gly Ile Arg Ala Val Glu Ile Gly Ser Leu Leu
385                 390                 395                 400

Leu Gly Arg Asp Pro Thr Thr Gly Lys Gln His Pro Cys Pro Ala Glu
            405                 410                 415

Leu Leu Arg Leu Thr Ile Pro Arg Ala Thr Tyr Thr Gln Thr His Met
        420                 425                 430

Asp Phe Ile Ile Glu Ala Phe Glu Lys Val Lys Glu Asn Ala Ser His
            435                 440                 445

Val Lys Gly Leu Thr Phe Thr Tyr Glu Pro Glu Val Leu Arg His Phe
        450                 455                 460

Thr Ala Arg Leu Lys Glu Val Glu Asn
465                 470
```

<210> SEQ ID NO 7
<211> LENGTH: 460
<212> TYPE: PRT
<213> ORGANISM: Aspergillus saccharolyticus

<400> SEQUENCE: 7

```
Met Pro Asn Thr Ala Thr Pro Glu Thr Trp Arg Val Lys Thr Val Glu
1               5                   10                  15

His Ile Arg Pro Ser Thr Arg Asp Gln Arg Gln Gln Trp Ile Glu Glu
            20                  25                  30

Ala Gly Phe Asn Leu Phe Thr Leu Pro Ser Asp Arg Val Phe Ile Asp
        35                  40                  45

Leu Leu Thr Asp Ser Gly Thr Gly Ala Met Ser Asp Arg Gln Trp Ala
50                  55                  60

Ala Ile Met Ser Gly Asp Glu Ser Tyr Ala Gly Ser Thr Ser Phe His
65                  70                  75                  80

Ala Leu His Glu Val Val Gln Asp Leu Phe Gly Leu Glu Tyr Leu Leu
                85                  90                  95

Pro Val His Gln Gly Arg Ala Ala Glu Asn Ala Leu Phe Ser Val Leu
            100                 105                 110

Val His Glu Asp Gln Leu Val Pro Ala Asn Ser His Phe Asp Thr Thr
        115                 120                 125

Arg Ala His Ile Glu Phe Arg Lys Ala Ala Val Asp Cys Leu Ser
130                 135                 140

Ser Gly Ala Tyr Asp Val Thr Asp Thr Asn Pro Phe Lys Gly Asn Met
145                 150                 155                 160

Asn Leu Asp Met Leu Arg Asp Ile Leu Gln Glu Ser His Ala Arg Val
                165                 170                 175

Pro Phe Ile Leu Leu Thr Ile Thr Cys Asn Thr Thr Gly Gly Gln Pro
            180                 185                 190

Val Ser Leu Ala Asn Ile Ala Ala Val Lys Ala Leu Ala Asp Arg Tyr
        195                 200                 205

His Lys Pro Leu Val Val Asp Ala Ala Arg Phe Ala Glu Asn Ala Trp
210                 215                 220

Phe Ile Gln Gln Arg Glu Pro Gly Tyr Arg Asp Thr Ser Leu Arg Asp
225                 230                 235                 240

Ile Thr Arg Gln Met Leu Gly Met Ala Asp Ala Met Val Met Ser Ala
                245                 250                 255

Lys Lys Asp Gly Leu Val Asn Ile Gly Gly Phe Leu Ala Thr Arg His
            260                 265                 270

Arg Glu Trp Phe Asp Gln Ala Thr Glu Tyr Val Ile Leu Phe Glu Gly
```

```
                    275                 280                 285
Phe Arg Thr Tyr Gly Gly Leu Ala Gly Arg Asp Leu Ala Ala Leu Ala
    290                 295                 300

Val Gly Leu Glu Glu Val Ile Ser Ala Asp Tyr Leu Ala Ser Arg Ile
305                 310                 315                 320

Gly Gln Val Gln Arg Phe Gly Gln Arg Leu Ile Asp Ala Gly Val Pro
                325                 330                 335

Ile Gln Gln Pro Val Gly Gly His Ala Val Leu Val Asp Ala Ser Arg
                340                 345                 350

Phe Leu Pro Glu Val Pro Arg Glu Glu Tyr Val Ala Gln Thr Leu Ala
                355                 360                 365

Val Glu Leu Tyr Leu Glu Ala Gly Val Arg Gly Val Glu Ile Gly Thr
370                 375                 380

Leu Leu Asn Gly Arg Asp Pro Glu Ser Gly Glu Glu Arg Phe Ala Glu
385                 390                 395                 400

Thr Glu Trp Leu Arg Leu Ala Ile Pro Arg Arg Val Tyr Ser Asn Asp
                405                 410                 415

His Leu Glu Tyr Val Ala Gln Ala Leu Ile Asp Leu Tyr His Arg Arg
                420                 425                 430

Ser Glu Ile Arg Ala Gly Val Arg Ile Val Glu Glu Lys Pro Val Leu
                435                 440                 445

Arg His Phe Thr Val Arg Leu Glu Arg Lys Thr Glu
    450                 455                 460

<210> SEQ ID NO 8
<211> LENGTH: 6
<212> TYPE: PRT
<213> ORGANISM: Citrobacter amalonaticus

<400> SEQUENCE: 8

Met Ser Ala Lys Lys Asp
1               5

<210> SEQ ID NO 9
<211> LENGTH: 9
<212> TYPE: PRT
<213> ORGANISM: Citrobacter amalonaticus

<400> SEQUENCE: 9

Ile Asp Leu Leu Thr Asp Ser Gly Thr
1               5
```

US 12,503,675 B2

GENETICALLY ENGINEERED YEAST CELLS AND METHODS OF USE THEREOF

RELATED APPLICATIONS

This application is a national stage filing under 35 U.S.C. 371 of International Patent Application Serial No. PCT/US2020/056022, filed Oct. 16, 2020, which claims the benefit under 35 U.S.C. § 119 (e) of U.S. provisional application No. 62/916,529 filed Oct. 17, 2019 and U.S. provisional application No. 63/086,363, filed Oct. 1, 2020. The entire contents of each of which is incorporated by reference herein.

GOVERNMENT SUPPORT

This invention was made with government support under Award Number 1831242 awarded by the National Science Foundation. The government has certain rights in the invention.

REFERENCE TO A SEQUENCE LISTING SUBMITTED AS A TEXT FILE VIA EFS-WEB

The instant application contains a Sequence Listing which has been submitted in ASCII format via EFS-Web and is hereby incorporated by reference in its entirety. Said ASCII copy, created on Apr. 5, 2022, is named B150970000US02-SEQ-JRV.txt, and is 29,158 bytes in size.

BACKGROUND

Within the last decade, tropical fruit flavors have become increasingly popular in the beverage market, both, within the United States and internationally. See, Cannon et al. *J. Food Drug Anal.* (2018) 26: 445-468; Watson, B. *Early* 2018 *Beer Style Trends*; Hahn et al. Washington Post (2016): washingtonpost.com/lifestyle/food/pineapple-and-mango-in-the-pint-glass-so-hot-right-now/2016/05/22/73f6c52a-1dd2-11e6-b6e0-c53b7ef63b45_story.html. In the beer industry, this trend is exemplified by the drastic increase in usage of flavoring hops prized for their tropical fruit aromas. Within the wine industry, tropical flavor notes drive the popularity of Sauvignon Blanc and Chardonnay styles, and longstanding efforts seek to further increase the tropical aromas found within these wines. See, Tominaga, et al. *Flavour and Fragrance Journal* (1998) 13, 159-162; Swiegers, et al. *Yeast* (2007) 24, 561-574; Howell, et al. *Appl. Environ. Microbiol.* (2005) 71, 5420-5426; Santiago, et al. *FEMS Yeast Res.* (2015) 15, fov034; Roland, A., et al. *Flavour and Fragrance Journal* (2012) 27, 266-272; Jeffery, et al *Australian Journal of Chemistry* (2016) 69, 1323. Research has revealed that a variety of diverse flavor molecules combine to produce the majority of fruit flavors. See, Cannon et al. *J. Food Drug Anal.* (2018) 26: 445-468; Bartowsky et al. Biology of Microorganisms on Grapes, in Must and in Wine, pp: 209-231; Holt et al. (*FEMS Microbiol. Rev.* 2019) 43: 193-222. However, numerous studies have also attributed much of the tropical flavor and aroma of Sauvignon Blanc wines and certain varieties of flavoring hops is due to the presence of three specific volatile thiol molecules. These thiols, 3-mercaptohexan-1-ol (3MH), 3-mercaptohexyl acetate (3MHA), and 4-methyl-4-mercaptopentan-2-one (4MMP), are all detectable to human odorant receptors at very low concentrations, and impart grapefruit/passionfruit, guava/gooseberry, and passionfruit/black currant flavors, respectively. See, Vanzo et al. Sci. Rep. (2017): 7; Roland et al. Chem. Rev. (2012) 111, 7355-7376.

SUMMARY

Aspects of the present disclosure provide genetically modified yeast cells (modified cells), comprising a heterologous gene encoding an enzyme with beta-lyase activity. In some embodiments, the enzyme with beta-lyase activity has a sequence with at least 90% sequence identity to the sequence as set forth in SEQ ID NO: 2. In some embodiments, the enzyme with beta-lyase activity does not comprise the sequence as set forth in SEQ ID NO: 1, 6, or 7. In some embodiments, the enzyme with beta-lyase activity has a sequence as set forth in SEQ ID NO: 2. In some embodiments, the enzyme with beta-lyase activity has a sequence with at least 90% sequence identity to the sequence as set forth in any one of SEQ ID NOs: 3-7. In some embodiments, the enzyme with beta-lyase activity has a sequence as set forth in any one of SEQ ID NOs: 3-5.

In some embodiments, the enzyme with beta-lyase activity comprises a substitution mutation at a position corresponding to position H463 of SEQ ID NO: 1. In some embodiments, the substitution mutation at a position corresponding to position H463 of SEQ ID NO: 1 is a phenylalanine, arginine, glutamic acid, threonine, glycine, isoleucine, or valine.

In some embodiments, the yeast cell is of the genus *Saccharomyces*. In some embodiments, the yeast cell is of the species *Saccharomyces cerevisiae* (*S. cerevisiae*). In some embodiments, the yeast cell is *S. cerevisiae* California Ale Yeast strain WLP001. In some embodiments, the yeast cell is of the species *Saccharomyces pastorianus* (*S. pastorianus*).

Aspects of the present disclosure provide methods of producing a fermented product, comprising, contacting any of the modified cells described herein with a medium comprising at least one fermentable sugar, wherein the contacting is performed during at least a first fermentation process, to produce a fermented product. In some embodiments, the at least one fermentable sugar is provided in at least one sugar source. In some embodiments, the fermentable sugar is glucose, fructose, sucrose, maltose, and/or maltotriose. In some embodiments, the at least one sugar source comprises at least one precursor, such as a plant derived precursor or a chemically synthesized precursor. In some embodiments, the at least one precursor comprises cysteine conjugated 3-mercaptohexan-1-ol (Cys 3-MH), cysteine-conjugated 4-methyl-4-mercaptopentan-2-one (Cys 4MMP), glutathione conjugated 3-mercaptohexan-1-ol (Glut-3-MH), and/or glutathione conjugated 4-methyl-4-mercaptopentan 2-one (Glut 4MMP). In some embodiments, the method further comprises adding one or more precursor to the medium, wherein the precursor comprises 3-mercaptohexan-1-ol (Cys 3-MH), cysteine-conjugated 4-methyl-4-mercaptopentan-2-one (Cys 4MMP), glutathione conjugated 3-mercaptohexan-1-ol (Glut-3-MH), and/or glutathione conjugated 4-methyl-4-mercaptopentan 2-one (Glut 4MMP).

In some embodiments, the fermented product comprises an increased level of at least one volatile thiol as compared to a fermented product produced by a counterpart cell that does not express the heterologous gene or a counterpart cell that expresses a wildtype enzyme having beta-lyase activity. In some embodiments, the at least one volatile thiol comprises 3-mercaptohexan-1-ol (3MH), 3-mercaptohexyl acetate (3MHA), 4-methyl-4-mercaptopenta-2-one (4MMP), or a combination thereof. In some embodiments, the fermented product comprises at least 200 ng/L 3-mercaptohexan-1-ol (3MH), 3-mercaptohexyl acetate (3MHA), and/or 4-methyl-4-mercaptopenta-2-one (4MMP).

In some embodiments, the fermented product comprises a reduced level of at least one undesired product as compared to a fermented product produced by a counterpart cell that does not express the heterologous gene or a counterpart cell that expresses a wildtype enzyme having beta-lyase activity.

In some embodiments, at least one undesired product is an indole. In some embodiments, the fermented product is a fermented beverage. In some embodiments, the fermented beverage is beer, wine, sparkling wine (champagne), sake, mead, kombucha, or cider. In some embodiments, the sugar source comprises wort, fruit juice, honey, rice starch, or a combination thereof. In some embodiments, the fruit juice is grape juice or apple juice.

In some embodiments, the sugar source is wort, and the method further comprises producing the medium, wherein producing the medium comprise contacting a plurality of grains with water; and boiling or steeping the water and grains to produce wort. In some embodiments, the method further comprises adding at least one hop variety to the wort to produce a hopped wort. In some embodiments, the method further comprises adding at least one hop variety to the medium. In some embodiments, the method further comprises at least one additional fermentation process. In some embodiments, the method further comprises carbonating the fermented product.

Aspects of the present disclosure provide fermented products produced by any of the methods described herein. In some embodiments, the fermented product comprises at least 200 ng/L 3-mercaptohexan-1-ol (3MH), 3-mercaptohexyl acetate (3MHA), and/or 4-methyl-4-mercaptopenta-2-one (4MMP). In some embodiments, the fermented product comprises less than 500 µg/L indole.

Aspects of the present disclosure provide methods of producing a composition comprising ethanol, comprising contacting any of the modified cells described herein with a medium comprising at least one fermentable sugar, wherein such contacting is performed during at least a first fermentation process, to produce the composition comprising ethanol. In some embodiments, the at least one fermentable sugar is provided in at least one sugar source. In some embodiments, the fermentable sugar is glucose, fructose, sucrose, maltose, and/or maltotriose. In some embodiments, the at least one sugar source comprises at least one precursor. In some embodiments, the at least one precursor comprises cysteine conjugated 3-mercaptohexan-1-ol (Cys 3-MH), cysteine-conjugated 4-methyl-4-mercaptopentan-2-one (Cys 4MMP), glutathione conjugated 3-mercaptohexan-1-ol (Glut-3-MH), and/or glutathione conjugated 4-methyl-4-mercaptopentan 2-one (Glut 4MMP). In some embodiments, the method further comprises adding one or more precursor to the medium, wherein the precursor comprises 3-mercaptohexan-1-ol (Cys 3-MH), cysteine-conjugated 4-methyl-4-mercaptopentan-2-one (Cys 4MMP), glutathione conjugated 3-mercaptohexan-1-ol (Glut-3-MH), and/or glutathione conjugated 4-methyl-4-mercaptopentan 2-one (Glut 4MMP).

In some embodiments, the composition comprising ethanol further comprises an increased level of at least one volatile thiol as compared to a composition comprising ethanol produced by a counterpart cell that does not express the heterologous gene or a counterpart cell that expresses a wildtype enzyme having beta-lyase activity. In some embodiments, the at least one volatile thiol comprises 3-mercaptohexan-1-ol (3MH), 3-mercaptohexyl acetate (3MHA), 4-methyl-4-mercaptopenta-2-one (4MMP), or a combination thereof. In some embodiments, the composition comprising ethanol further comprises at least 200 ng/L 3-mercaptohexan-1-ol (3MH), 3-mercaptohexyl acetate (3MHA), and/or 4-methyl-4-mercaptopenta-2-one (4MMP).

In some embodiments, the composition comprising ethanol further comprises a reduced level of at least one undesired product as compared to a composition comprising ethanol produced by a counterpart cell that does not express the heterologous gene or a counterpart cell that expresses a wildtype enzyme having beta-lyase activity. In some embodiments, the at least one undesired product is an indole.

In some embodiments, the composition comprising ethanol t is a fermented beverage. In some embodiments, the fermented beverage is beer, wine, sparkling wine (champagne), sake, mead, kombucha, or cider. In some embodiments, the sugar source comprises wort, fruit juice, honey, rice starch, or a combination thereof. In some embodiments, the fruit juice is grape juice or apple juice.

In some embodiments, wherein the sugar source is wort, and the method further comprises producing the medium, wherein producing the medium comprises contacting a plurality of grains with water; and boiling or steeping the water and grains to produce wort. In some embodiments, the method further comprises adding at least one hop variety to the wort to produce a hopped wort. In some embodiments, the method further comprises adding at least one hop variety to the medium. In some embodiments, the method further comprises at least one additional fermentation process. In some embodiments, the method further comprises carbonating the fermented product.

Aspects of the present disclosure provide compositions comprising ethanol produced by any of the methods described herein. In some embodiments, the composition further comprises at least 200 ng/L 3-mercaptohexan-1-ol (3MH), 3-mercaptohexyl acetate (3MHA), and/or 4-methyl-4-mercaptopenta-2-one (4MMP). In some embodiments, the fermented product comprises less than 500 µg/L indole.

BRIEF DESCRIPTION OF THE DRAWINGS

Further aspects of the disclosure will be readily appreciated upon review of the Detailed Description of its various aspects and embodiments, described below, when taken in conjunction with the accompanying Drawings.

FIGS. 1A-1H show exemplary process diagrams of methods of making a fermented product or methods of making ethanol as described herein. FIG. 1A shows a method of contacting the modified cells of the disclosure with a medium during at least a first fermentation process to produce a fermented product. FIG. 1B shows an embodiment of the method of FIG. 1A, wherein the medium is produced by contacting a plurality of grains with water, boiling the water to produce wort which is cooled into the medium. FIG. 1C shows an embodiment of the method of FIG. 1A, wherein at least one variety of hop is added to the medium. FIG. 1D shows an embodiment of the method of FIG. 1A, wherein at least one additional fermentation process occurs. FIG. 1E shows an embodiment of the method of FIG. 1A, wherein the fermented product is carbonated. FIG. 1F shows a method of making ethanol involving contacting the modified cells of the disclosure with a medium during at least a first fermentation process to produce a composition comprising ethanol. FIG. 1G shows an embodiment of the method of FIG. 1A, at least one volatile thiol precursor (e.g., Cys-MH, Glu-3MH) is added to the medium. FIG. 1H shows a method of contacting purified enzymes of the disclosure with a medium during at least a first fermentation process to produce a fermented product.

FIG. 3A shows the concentration of 3-mercaptohexan-1-ol (3MH) and indole in beer brewed by wild-type yeast strains and engineered yeast strains that express TnaA or the TnaA H463F mutant. The left axis shows 3MH concentration (ng/L), and the right axis reports indole concentration (μg/L). Strains shown from left to right: wild-type California Ale yeast (WLP001); WLP001 over-expressing wildtype TnaA (Y319; Trpase WT); and WLP001 over-expressing TnaA H463F mutant (Y502; Trpase H463F). FIG. 3B shows the concentration of 3-mercaptohexan-1-ol (3MH) and indole in wine fermented with wild-type yeast strains and engineered yeast strains that express TnaA or the TnaA H463F mutant. The left axis shows 3MH concentration (ng/L), and the right axis reports indole concentration (μg/L). Strains shown from left to right: wild-type Red Star Cote des Blanc yeast strain; Red Star over-expressing wildtype TnaA (Y919; Trpase WT); and Red Star over-expressing TnaA H463F mutant (Y484; Trpase H463F).

FIG. 4A shows the concentration of 3-mercaptohexan-1-ol (3MH (ng/L)) in beer brewed by wild-type yeast strains and engineered yeast strains that express TnaA or the TnaA H463F mutant. FIG. 4B shows the concentration of indole (μg/L) in beer brewed by wild-type yeast strains and engineered yeast strains that express TnaA or the TnaA H463F mutant. Strains shown from left to right: wild-type California Ale yeast (WLP001); WLP001 over-expressing wildtype TnaA (Y319; Trpase WT); and WLP001 over-expressing TnaA H463F mutant (Y502; Trpase H463F). For each strain, the right column shows indole produced in fermentations containing Glut-3MH added at the beginning of the fermentation process; the left column shows 3MH produced in the absence of Glut-3MH added to the fermentation process.

DETAILED DESCRIPTION

Figure 1A:
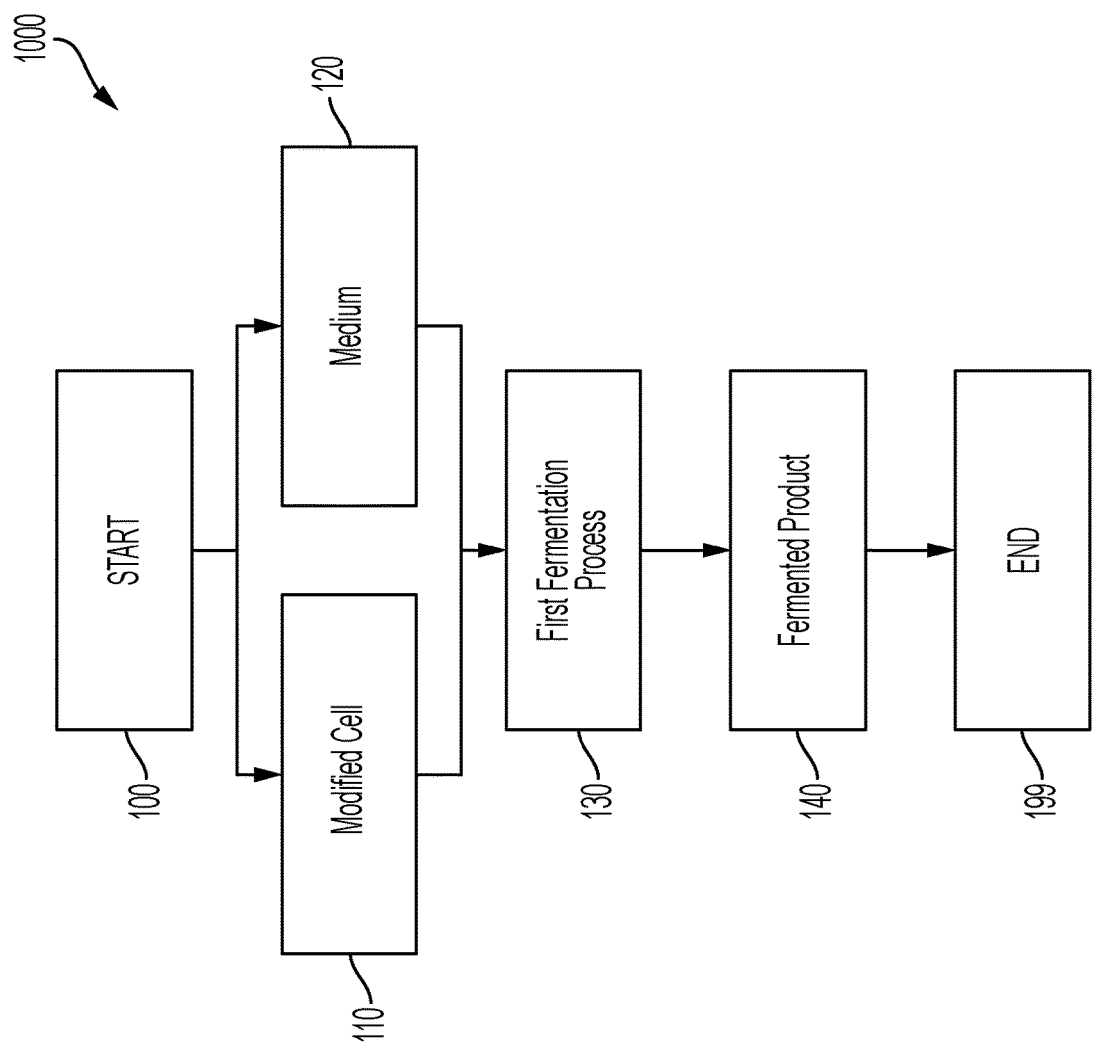
Figure 1B:
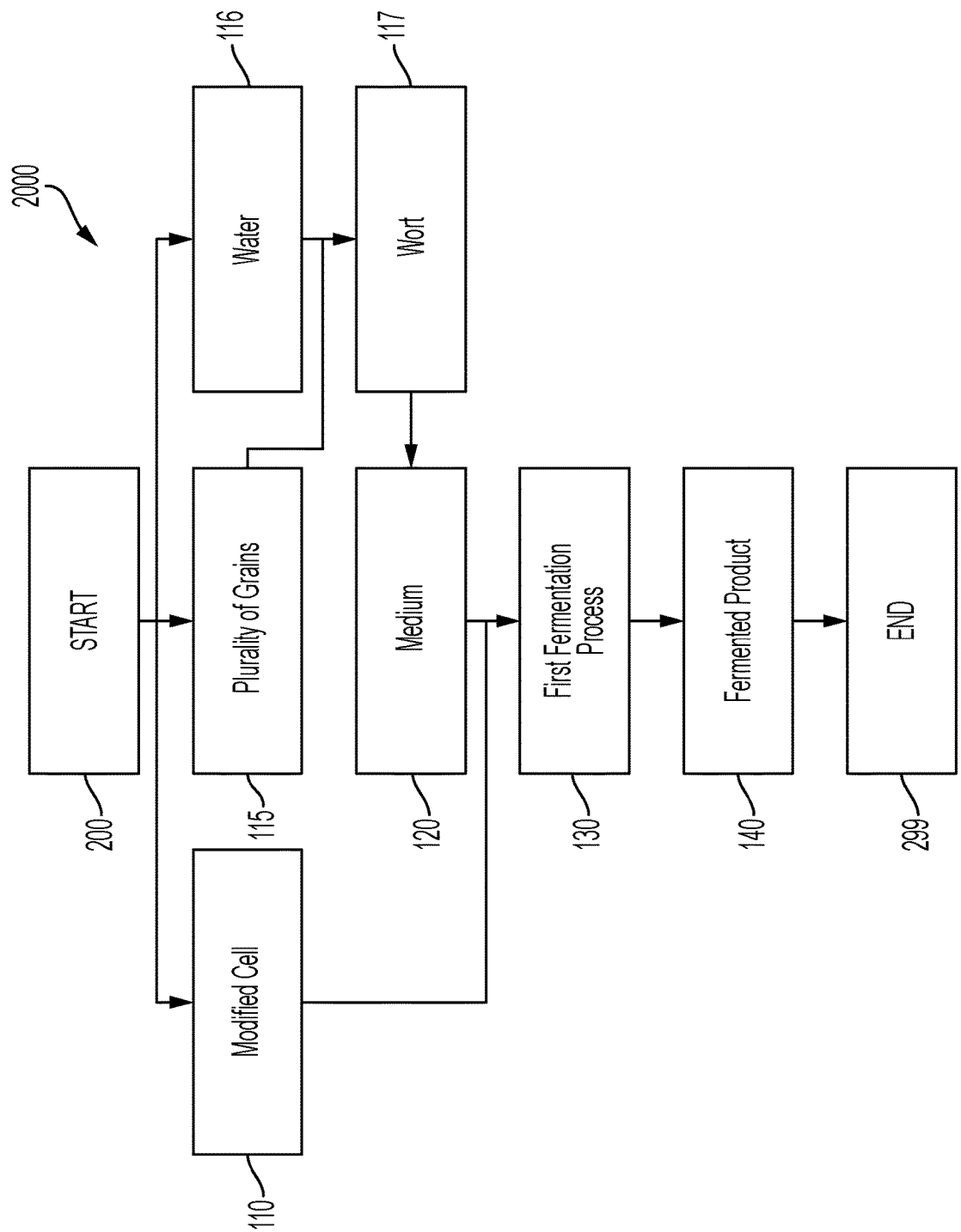
Figure 1C:
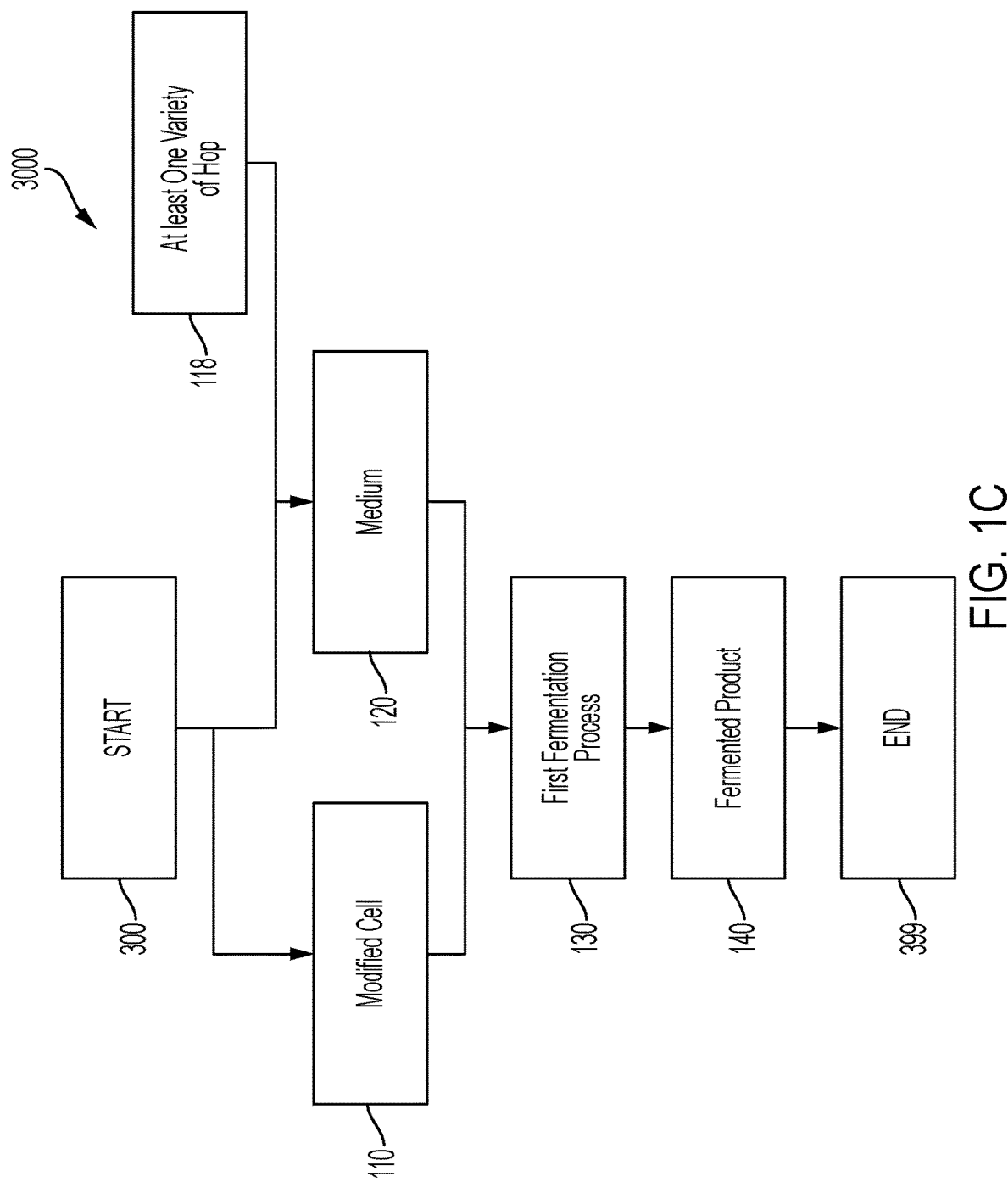

Within the last decade, tropical fruit flavors have become increasingly popular in the beverage market. For example, in the beer and wine industries, there is demand for beverages with flavor notes such as mango, *papaya*, and pineapple that has increased dramatically in recent years. Three flavor molecules that impart tropical notes in fermented beverages are the volatile thiols 3-mercaptohexan-1-ol (3MH), 3-mercaptohexyl acetate (3MHA), and 4-methyl-4-mercaptopentan-2-one (4MMP). These thiols are produced during the fermentation process by yeast-expressed enzymes that convert odorless precursors (e.g., plant derived precursors) into flavor active volatile thiols. Several attempts have been made to identify yeast strains that release high levels of these thiols, as well as to bioengineer yeast strains for increased thiol production, however these attempts have been only modestly successful, as increases in volatile production have been moderate, context dependent, or marred by the concomitant release of undesired products (e.g., off-flavors), such as indoles. The instant disclosure provides genetically modified yeast cells that have been modified to increase such thiols and reduce the production of undesired products.

Provided herein are genetically modified yeast cells that have been engineered to express an enzyme having beta-lyase activity. In some embodiments, the enzyme having beta-lyase activity has been modified to increase production of desired volatile thiols and reduce production of undesired indoles. Also provided herein are methods of producing a fermented beverage involving contacting the genetically modified yeast cells with a medium comprising a sugar source comprising at least one fermentable sugar during a fermentation process. Also provided herein are methods of producing ethanol involving contacting the genetically modified yeast cells with a medium comprising a sugar source comprising at least one fermentable sugar during a fermentation process.

Beta-Lyase (β-Lyase)

The genetically modified cells described herein contain a heterologous gene encoding an enzyme with beta-lyase activity. The term "heterologous gene," as used herein, refers to a hereditary unit corresponding to a sequence of nucleic acid (e.g., DNA) that contains the genetic instruction, which is introduced into and expressed by a host organism (e.g., a genetically modified cell) which does not naturally encode the gene.

Beta-lyase enzymes are involved in the production of thiols, which are related to alcohols and phenyls but contain a thiol or sulfanyl group ("—SH"). Thiols may have any of a variety of aromas or smells and are generally categorized to thiols having a negative smell and thiols having a positive smell. Certain sulphur containing compounds, such as those that provide a rotten egg smell, are the result of formation of $H_2S$ by yeast fermentation. Other secondary reductive odors such as cooked vegetables, onion, and cabbage are also produced from Sulphur-containing compounds such as thioacetic acid esters and mercaptans which are thought to be due to too low redox potential in the fermented product (Brajkovich et al., 2005).

Sulphur-containing compounds that contribute positively to a product are termed "volatile thiols," which tend to have distinctive aroma profiles. For example, the volatile thiols responsible for well-known aromas include: 3-Mercapto-hexan-1-ol (3MH) ($C_6H_{14}OS$, also referred to as 3-mercapto-1-hexanol, 3-mercaptohexanol, 3-sulphanylhexan-1-ol, 3-thiohexanol, 1-hexanol, 3-mercapto-), which imparts an aroma of grapefruit, passion fruit, gooseberry, and guava; 3-mercaptohexylacetate (3MHA) ($C8H_{16}O_2S$, also referred to as 3-sulfanylhexyl acetate), which imparts an aroma of passion fruit, grapefruit, box tree, gooseberry, and guava; and 4-methyl-4-mercaptopentan-2-one (4MMP) ($C_6H_{12}OS$, also referred to as 4-mercapto-4-methyl-2-pentanone), which imparts an aroma of box tree, passion fruit, broom, and black currant.

Without wishing to be bound to any particular theory, it is thought that formation of aromatic precursors involves the steps of enzymatic oxidation, metabolic processing of unsaturated fatty acids, cysteinylated or glutathionylated conjugation to aldehydes, and beta-lyase cleavage during alcoholic fermentation to release the aromatic compound. This process converts the odorless precursor molecules (e.g., plant-derived precursors) of the sugar source in the medium (e.g., wort, must, etc.) into active thiols by the fermenting organisms and is referred to as "biotransformation." See, e.g., Swiegers et al. Yeast (2007) 24: 561-574; Santiago et al. FEMS Yeast Res. (2015) 15; Holt et al. Appl. Environ. Microbiol. (2011) 77: 3626-3632; Thibon et al. FEMS Yeast Res. (2008) 8: 1076-1086; Kishimoto et al. J. Am. Soc. Brewing Chemists (2008) 66: 192-196. 3MH and 4MMP are produced during fermentation by biotransformation of the cysteine-conjugate precursor molecules Cys-3MH and Cys-4MMP, respectively. See, e.g., Roland et al. Flavour and Fragrance Journal (2016) 69: 1323. The biotransformation is catalyzed by organisms expressing an enzyme with beta-lyase activity, which activity cleaves the cysteine-conjugates to release the volatile thiols. See, e.g., Santiago et al. FEMS Yeast Res. (2015) 15; Roncoroni et al. Food Microbiol. (2011) 926-935; Roland et al. Chem. Rev. (2011) 111: 7355-7376. 3MH can subsequently be acetylated by yeast expressing acyl-transferase enzymes to produce 3MHA. See, e.g., Roland et al. Chem. Rev. (2011) 111: 7355-7376.

During fermentation, Cys3-MH and Cys-4MMP can be transported from the medium into yeast cells and cleaved by enzymes having beta-lyase activity. Alternatively, brewing wort and grape juice or grape must can also contain the glutathione conjugates Glut-3MH and Glut-4MMP. See, e.g., Roland et al. Chem. Rev. (2011) 111: 7355-7376; Kishimoto et al. J. Am. Soc. Brewing Chemists (2008) 66: 192-196. The glutathione conjugates can be transported into yeast cells and cleaved by transpeptidase enzymes to produce Cys-3MH and Cys-4MMP, which then become substrates for the enzyme with beta-lyases activity. See, e.g., Howell et al. Appl. Environ. Microbiol (2005) 71: 5420-5426; Santiago et al. FEMS Yeast Res. (2015) 15. 3MH and 4MMP are then generated by cleavage of the cysteine conjugate by an enzyme having beta-lyase activity. Several studies have indicated that this reaction is highly inefficient, and that commonly used strains of vintners yeast convert only 0.2% to 2.0% of available cysteine-conjugate precursors into flavor active thiols during grape must fermentation.[6,7,21] This inefficiency represents a significant biochemical bottleneck which limits the production of beneficial volatile thiols (e.g., 3MH, 3MHA, 4MMP) in fermented beverages.

In addition to inefficiencies in producing volatile thiols, expression of beta-lyases may also result in increased production of undesired molecules, such as indoles. Indoles are formed of an aromatic heterocyclic organic compound with formula $C_8H_7N$ and have a bicyclic structure, consisting of a six-membered benzene ring fused to a five-membered pyrrole ring. Indoles are widely distributed in the environment and naturally occur in human feces and have an intense fecal odor. Accordingly, producing indoles during production of a fermentable product intended for consumption is undesirable.

Various enzymes exhibit beta-lyase activity, for example, beta-lyase and tryptophanase (TnaA). In some embodiments, the heterologous gene encoding an enzyme with beta-lyase activity is a wild-type beta-lyase gene (e.g., a gene isolated from an organism). In some embodiments, the heterologous gene encoding an enzyme with beta-lyase activity is a mutant beta-lyase gene and contains one or mutations (e.g., substitutions, deletions, insertions) in the nucleic acid sequence of the beta-lyase gene and/or in amino acid sequence of the enzyme having beta-lyase activity. As will be understood by one of ordinary skill in the art, mutations in a nucleic acid sequence may change the amino acid sequence of the translated polypeptide (e.g., substitution mutation) or may not change the amino acid sequence of the translated polypeptide (e.g., silent mutations) relative to a wild-type enzyme or a reference enzyme.

In some embodiments, the heterologous gene encoding an enzyme with beta-lyase activity is a truncation, which is deficient in one or more amino acids, preferably at the N-terminus or the C-terminus of the enzyme, relative to a wild-type enzyme or a reference enzyme.

In some embodiments, the beta-lyase may also be referred to as a cystathionine beta-lyase (E.C. 4.4.1.13). In some embodiments, the beta-lyase gene is from a fungus. In some embodiments, the beta-lyase gene is from a *Saccharomyces* species, such as an endogenous yeast beta-lyase. Examples of endogenous yeast beta-lyases include, without limitation, Irc7p encoded by the gene IRC7 (also referred to as YFR055W) and Str3p encoded by the gene STR3. In some embodiments, the beta-lyase is IRC7 or STR3 from *S. cerevisiae* yeast strain VL3.

In some embodiments, the beta-lyase gene is from a bacterium or fungus. In some embodiments, the beta-lyase gene is from *Escherichia coli* (*E. coli*). In some embodiments, the beta-lyase gene is from a *Citrobacter* species. In some embodiments, the beta-lyase gene is from *Citrobacter amalonaticus*.

An exemplary beta-lyase is TnaA from *Citrobacter amalonaticus* and is provided by the amino acid sequence set forth as SEQ ID NO: 1. The consensus motif "MSAKKD" (SEQ ID NO: 8) is shown in boldface, with the catalytic residue, lysine at position number 270 (referred to as K270) shown with in boldface and underline. The conserved motif "IDLLTDSGT" (SEQ ID NO: 9) is shown in boldface italics.

Amino acid sequence of wildtype TnaA
from C. amalonaticus (SEQ ID NO: 1)
MDNFKHLPEPFRIRVIEPVKRITREHRNNAIIKSGMNPFLLDSEDVFIDL

LTDSGTGAVTQNMQAAMLRGDEAYSGSRSYYALSEAVKNIFGYQYTIPTH

QGRGAEQIYIPVLIKKREQEKGLDRSKMAVFSNYFFDTTQGHSQINGCAV

RNVYIKEAFDTGVRYDFKGNFDLDGLERGIQEVGPNNVPYIVATITSNSA

GGQPVSLANLKAMYNIAKKYDIPVVMDSARFAENAYFIQKREAEYRDWSI

EEITRETYKYADMLAMSAKKDAMVPMGGLLCIKDDTYFDVYTECRTLCVV

QEGFPTYGGLEGGAMERLAVGLVDGMNQDWLAYRIAQVQYLVDGLEAIGV

TCQQAGGHAAFVDAGKLLPHIPAEQFPAQALACELYKVAGIRAVEIGSFL

LGRDPKTGKQLPCPAELLRLTIPRATYTQSHMDFIIEAFEHVKENSMNIK

GLIFTYEPKVLRHFTAKLKEV

In some embodiments, the beta-lyase is a homolog of TnaA from *C. amalonaticus* (SEQ ID NO: 1). Homologs or related enzymes may be identified using methods known in the art, such as those described herein. In some embodiments, the beta-lyase gene is from *Zooshikella* species. In some embodiments, the beta-lyase gene is from *Zooshikella ganghwensis*. The amino acid sequence of wildtype TnaA homolog from *Z. ganghwensis* is provided by Accession No. WP_094789495.1 and has 82% overall sequence identity to TnaA from *C. amalonaticus* (SEQ ID NO: 1).

In some embodiments, the beta-lyase gene is from an *Aspergillus* species. In some embodiments, the beta-lyase gene is from *Aspergillus* saccharolyticus (e.g., *A. saccharolyticus* strain JOP 1030-1). The amino acid sequence of wildtype TnaA homolog from *A. saccharolyticus* is provided by Accession No. XP_025427068.1 and has 44% overall sequence identity to TnaA from *C. amalonaticus* (SEQ ID NO: 1).

In some embodiments, the beta-lyase gene is from an *Aspergillus* species. In some embodiments, the beta-lyase gene is from *Trichoderma asperellum* (e.g., *T. asperellum* strain CBS 433.97).

The amino acid sequence of wildtype TnaA homolog from *T. asperellum* is provided by Accession No. XP_024760083.1 and has 38% overall sequence identity to TnaA from *C. amalonaticus* (SEQ ID NO: 1). The amino acid sequence of the beta-lyase from *T. asperellum* (SEQ ID NO: 3) contains a tyrosine (Y) at the position corresponding to H463 of TnaA (SEQ ID NO: 1).

(SEQ ID NO: 3)
MLPDCHLPETWRAKMVERIPSSTKDQRQEWICKADYNLFKLRSNEVRFDL

GTDGGSGGMSDNQWSALMRGDSAATRSPSSYRLQEKVKELFGFTYTIPVH

RGRAAKHALVQALLNEESIVPGNAFEDTTRANIESQKAIAIDCAIEGAFD

IYYQHPFKGNVNLPELEKILOGSGSNVPMIMVSITCDKTGGQPVSMHNLR

EVKRLAKMFNVPVILDSARFAENAWFIQKNESEYSSQSIPDIVQEMYHHA

DGMVMSGKTDGLVNAGGFFATNNKDLFDRVGKYANLFCGLAGRDMEALTV

GLGEVTQQEYLDDRIRQIHRFGMRLMAANVPIQQPIGGHAIVIDASLFLP

LVPREEYVAKTLAVELYVEAGIRGAGMETVIGGGNPITGINRNRSNAKDF

LYLAIPRQAYINDQLSFVANALIQIFERRFTITRGLYVVHEDAILRYLTI

QLKKADGKSIA

Amino acids of the beta-lyase may be modified (e.g., substituted) to produce a beta-lyase variant. For example, as described herein, the amino acid at position 463, referred to as histidine 463 (H463) of SEQ ID NO: 1 was mutated to produce a beta-lyase enzyme having desired activity. In some embodiments, the amino acid corresponding to histidine at position 463 (H463) of SEQ ID NO: 1 is substituted with an amino acid that is not a histidine residue (e.g., any other amino acid). In some embodiments, the amino acid corresponding to histidine at position 463 (H463) of SEQ ID NO: 1 is substituted with an amino acid selected from alanine (A), arginine (R), lysine (K), aspartic acid (D), glutamic acid (E), serine (S), threonine (T), asparagine (N), glutamine (G), cysteine (C), glycine (G), proline (P), valine (V), isoleucine (I), leucine (L), methionine (M), phenylalanine (F), tyrosine (Y), or tryptophan (W).

In some embodiments, the amino acid corresponding to histidine at position 463 (H463) of SEQ ID NO: 1 is substituted with a hydrophobic amino acid (e.g., alanine (A), valine (V), isoleucine (I), leucine (L), methionine (M), phenylalanine (F), tyrosine (Y), tryptophan (W)). In some embodiments, the amino acid corresponding to histidine at position 463 (H463) of SEQ ID NO: 1 is substituted with a phenylalanine (F), arginine (R), glutamic acid (E), threonine (T), glycine (G), isoleucine (I), or valine (V). In some embodiments, the amino acid corresponding to histidine at position 463 (H463) of SEQ ID NO: 1 is substituted with a phenylalanine (F) residue (H463F), provided by SEQ ID NO: 2. In some embodiments, the amino acid corresponding to histidine at position 463 (H463) of SEQ ID NO: 1 is substituted with an arginine (R) residue (H463R). In some embodiments, the amino acid corresponding to histidine at position 463 (H463) of SEQ ID NO: 1 is substituted with a glutamic acid (E) residue (H463E). In some embodiments, the amino acid corresponding to histidine at position 463 (H463) of SEQ ID NO: 1 is substituted with a threonine (T) residue (H463T). In some embodiments, the amino acid corresponding to histidine at position 463 (H463) of SEQ ID NO: 1 is substituted with glycine (G) residue (H463G). In some embodiments, the amino acid corresponding to histidine at position 463 (H463) of SEQ ID NO: 1 is substituted with isoleucine (I) residue (H463I). In some embodiments, the amino acid corresponding to histidine at position 463 (H463) of SEQ ID NO: 1 is substituted with valine (V) residue (H463V).

In some embodiments, the amino acid corresponding to histidine at position 463 (H463) of SEQ ID NO: 1 is substituted with a phenylalanine (F) residue (H463F) and is provided by SEQ ID NO: 4. In some embodiments, the amino acid corresponding to histidine at position 463 (H463) of SEQ ID NO: 1 is substituted with a phenylalanine (F) residue (H463F) and is provided by SEQ ID NO: 5.

Amino acid sequence of TnaA from
C. amalonaticus - H463F substitution
mutation (Y502)

(SEQ ID NO: 2)
MDNFKHLPEPFRIRVIEPVKRITREHRNNAIIKSGMNPFLLDSEDVFIDL

LTDSGIGAVIQNMQAAMLRGDEAYSGSRSYYALSEAVKNIFGYQYTIPTH

QGRGAEQIYIPVLIKKREQEKGLDRSKMAVFSNYFFDTTQGHSQINGCAV

RNVYIKEAFDTGVRYDFKGNFDLDGLERGIQEVGPNNVPYIVATITSNSA

GGQPVSLANLKAMYNIAKKYDIPVVMDSARFAENAYFIQKREAEYRDWSI

EEITRETYKYADMLAMSAKKDAMVPMGGLLCIKDDTYFDVYTECRTLCVV

QEGFPTYGGLEGGAMERLAVGLVDGMNQDWLAYRIAQVQYLVDGLEAIGV

TCQQAGGHAAFVDAGKLLPHIPAEQFPAQALACELYKVAGIRAVEIGSFL

LGRDPKIGKOLPCPAELLRLTIPRATYTOSHMDFIIEAFEHVKENSMNIK

GLTFTYEPKVLRFFTAKLKEV

Amino acid sequence of a TnaA homolog
from Z. ganghwensis is provided by
Accession No. WP_094789495.1 - H463F
substitution mutation
(SEQ ID NO: 4)
MNNFKHLPEPFRIRVVEPVKRITLAYREKAILNAGMNPFLLDSKDVFIDL

LTDSGTGAITQEMQAAMFIGDEAYSGSRSYYALADAVKDIFGYEYTIPTH

QGRGAEQIYIPVLIKKREKEKGLDRTKMVALSNYFFDTTQGHTQLNACVA

KNVFTKEAFDTSISADFKGNFDLELLEHAILEAGPQNVPYIVSTITCNSA

GGQPVSIANLKAVYEIAQRYEIPVIMDSARFAENAYFIQQREPEYQDWSI

EAITFESYKYADALAMSAKKDAMVOMGGLLCFKDKSMLDVYNECRTLCVV

QEGFPTYGGLEGGAMERLAVGLYDGMRQDWLAYRINQVQYLVNGLESIGI

VCQQAGGHAAFVDAGKLLPHIPADQFPAHALACELYKVAGIRAVEIGSLL

LGRDPTTGKOHPCPAELLRLTIPRATYTQTHMDFIIEAFEKVKENASHVK

GLTFTYEPEVLRFFTARLKEVEN

Amino acid sequence of a TnaA homolog
from A. saccharolyticus is provided by
Accession No. XP_025427068.1 - H463F
substitution mutation
(SEQ ID NO: 5)
MPNTATPETWRVKIVEHIRPSTRDQRQQWIEEAGFNLFTLPSDRVFIDLL

TDSGTGAMSDRQWAAIMSGDESYAGSTSFHALHEVVQDLFGLEYLLPVHQ

GRAAENALFSVLVHEDQLVPANSHFDTTRAHIEFRKAAAVDCLSSGAYDV

TDINPFKGNMNLDMLRDILQESHARVPFILLTITCNTTGGQPVSLANIAA

VKALADRYHKPLVVDAARFAENAWFIQQREPGYRDTSLRDITROMLGMAD

AMVMSAKKDGLVNIGGFLATRHREWFDQATEYVILFEGFRTYGGLAGRDL

AALAVGLEEVISADYLASRIGQVORFGORLIDAGVPIQQPVGGHAVLVDA

SRELPEVPREEYVAQTLAVELYLEAGVRGVEIGTLLNGRDPESGEERFAE

TEWLRLAIPRRVYSNDHLEYVAQALIDLYHRRSEIRAGVRIVEEKPVLRF

FTVRLERKTE

Amino acid sequence of a TnaA homolog
from Z. ganghwensis is provided by
Accession No. WP_094789495.1 - wildtype
sequence
(SEQ ID NO: 6)
MNNFKHLPEPFRIRVVEPVKRITLAYREKAILNAGMNPFLLDSKDVFIDL

LTDSGTGAITQEMQAAMFIGDEAYSGSRSYYALADAVKDIFGYEYTIPTH

QGRGAEQIYIPVLIKKREKEKGLDRTKMVALSNYFFDTTQGHTQLNACVA

KNVFTKEAFDISISADFKGNEDLELLEHAILEAGPQNVPYIVSTITCNSA

GGQPVSIANLKAVYEIAQRYEIPVIMDSARFAENAYFIQQREPEYQDWSI

EAITFESYKYADALAMSAKKDAMVOMGGLLCFKDKSMLDVYNECRTLCVV

QEGFPTYGGLEGGAMERLAVGLYDGMRQDWLAYRINQVQYLVNGLESIGI

VCQQAGGHAAFVDAGKLLPHIPADQFPAHALACELYKVAGIRAVEIGSLL

LGRDPTTGKQHPCPAELLRLTIPRATYTQTHMDFIIEAFEKVKENASHVK

GLIFTYEPEVLRHFTARLKEVEN

Amino acid sequence of a TnaA homolog
from A. saccharolyticus is provided by
Accession No. XP_025427068.1 - wildtype
sequence
(SEQ ID NO: 7)
MPNTATPETWRVKIVEHIRPSTRDQRQQWIEEAGFNLFTLPSDRVFIDLL

TDSGTGAMSDRQWAAIMSGDESYAGSTSFHALHEVVQDLFGLEYLLPVHQ

GRAAENALFSVLVHEDQLVPANSHFDTTRAHIEFRKAAAVDCLSSGAYDV

TDTNPFKGNMNLDMLRDILQESHARVPFILLTITCNTTGGQPVSLANIAA

VKALADRYHKPLVVDAARFAENAWFIQQREPGYRDTSLRDITRQMLGMAD

AMVMSAKKDGLVNIGGFLATRHREWFDQATEYVILFEGERTYGGLAGRDL

AALAVGLEEVISADYLASRIGQVORFGORLIDAGVPIQQPVGGHAVLVDA

SRFLPEVPREEYVAQTLAVELYLEAGVRGVEIGTLLNGRDPESGEERFAE

TEWLRLAIPRRVYSNDHLEYVAQALIDLYHRRSEIRAGVRIVEEKPVLRH

FTVRLERKTE

In some embodiments, the enzyme comprises the amino acid sequence of any one of SEQ ID NOs: 1-7 and the amino acid corresponding to histidine at position 463 (H463) of SEQ ID NO: 1 is substituted with an amino acid that is not a histidine residue (e.g., any other amino acid). In some embodiments, the enzyme comprises the amino acid sequence of any one of SEQ ID NOs: 1-7 and the amino acid corresponding to histidine at position 463 (H463) of SEQ ID NO: 1 is substituted with an amino acid selected from alanine (A), arginine (R), lysine (K), aspartic acid (D), glutamic acid (E), serine (S), threonine (T), asparagine (N), glutamine (G), cysteine (C), glycine (G), proline (P), valine (V), isoleucine (I), leucine (L), methionine (M), phenylalanine (F), tyrosine (Y), or tryptophan (W).

In some embodiments, the enzyme comprises the amino acid sequence of any one of SEQ ID NOs: 1-7 and the amino acid corresponding to histidine at position 463 (H463) of SEQ ID NO: 1 is substituted with a hydrophobic amino acid (e.g., alanine (A), valine (V), isoleucine (I), leucine (L), methionine (M), phenylalanine (F), tyrosine (Y), tryptophan (W)). In some embodiments, the amino acid corresponding to histidine at position 463 (H463) of SEQ ID NO: 1 is substituted with a phenylalanine (F), arginine (R), glutamic acid (E), threonine (T), glycine (G), isoleucine (I), or valine (V).

In some embodiments, the heterologous gene encodes an enzyme with beta-lyase activity such that a cell that expresses the enzyme is capable of producing increased levels of volatile thiols as compared to a cell that does not express the heterologous gene. In some embodiments, the heterologous gene encodes an enzyme with beta-lyase activity such that a cell that expresses the enzyme is capable of producing increased levels of volatile thiols as compared to a cell that expresses an enzyme with wild-type beta-lyase activity. In some embodiments, the enzyme with beta-lyase activity that is capable of producing increased levels of volatile thiols contains a substitution of the amino acid at the position corresponding to histidine at position 463 (H463) of SEQ ID NO: 1. In some embodiments, the enzyme with beta-lyase activity that is capable of producing increased levels of volatile thiols has the sequence provided by any one of SEQ ID NOs: 2-5.

In some embodiments, the mutant beta-lyase produces increased titers/levels of volatile thiols. In some embodiments, the mutant beta-lyase produces increased titers/levels of 3MH. In some embodiments, the mutant beta-lyase produces increased titers/levels of 3MHA. In some embodiments, the mutant beta-lyase produces increased titers/levels of 4MMP. In some embodiments, the mutant beta-lyase produces increased titers/levels of one or more volatile thiols, e.g., 3MH, 3MHA, and/or 4MMP.

In some embodiments, the heterologous gene encodes an enzyme with beta-lyase activity and decreased tryptophanase activity. In some embodiments, the heterologous gene encodes an enzyme with beta-lyase activity such that the enzyme produces an increased concentration of volatile thiols as compared to an enzyme with wild-type beta-lyase activity and which also has decreased tryptophanase activity.

In some embodiments, the enzyme with beta-lyase activity has an amino acid sequence with at least 80%, 81%, 82%, 83%, 84%, 85%, 86%, 87%, 88%, 89%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, or 99.9% sequence identity to the sequence as set forth in any one of SEQ ID NOs: 1-7. In some embodiments, the enzyme with beta-lyase activity has an amino acid sequence with at least 80%, 81%, 82%, 83%, 84%, 85%, 86%, 87%, 88%, 89%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, or 99.9% sequence identity to the sequence as set forth in any one of SEQ ID NOs: 1-7 and the amino acid corresponding to histidine at position 463 (H463) of SEQ ID NO: 1 is substituted with an amino acid that is not a histidine residue (e.g., any other amino acid). In some embodiments, the enzyme with beta-lyase activity has an amino acid sequence with at least 80%, 81%, 82%, 83%, 84%, 85%, 86%, 87%, 88%, 89%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, or 99.9% sequence identity to the sequence as set forth in any one of SEQ ID NOs: 1-7 and the amino acid corresponding to histidine at position 463 (H463) of SEQ ID NO: 1 is substituted with an amino acid selected from alanine (A), arginine (R), lysine (K), aspartic acid (D), glutamic acid (E), serine (S), threonine (T), asparagine (N), glutamine (G), cysteine (C), glycine (G), proline (P), valine (V), isoleucine (I), leucine (L), methionine (M), phenylalanine (F), tyrosine (Y), or tryptophan (W).

The terms "percent identity," "sequence identity," "% identity," "% sequence identity," and % identical," as they may be interchangeably used herein, refer to a quantitative measurement of the similarity between two sequences (e.g., nucleic acid or amino acid). Percent identity can be determined using the algorithms of Karlin and Altschul, *Proc. Natl. Acad. Sci. USA* 87:2264-68, 1990, modified as in Karlin and Altschul, *Proc. Natl. Acad. Sci. USA* 90:5873-77, 1993. Such algorithms are incorporated into the NBLAST and XBLAST programs (version 2.0) of Altschul et al., *J. Mol. Biol.* 215:403-10, 1990. BLAST protein searches can be performed with the XBLAST program, score=50, word length=3, to obtain amino acid sequences homologous to the protein molecules of interest. Where gaps exist between two sequences, Gapped BLAST can be utilized as described in Altschul et al., *Nucleic Acids Res.* 25(17):3389-3402, 1997. When utilizing BLAST and Gapped BLAST programs, the default parameters of the respective programs (e.g., XBLAST and NBLAST) can be used.

When a percent identity is stated, or a range thereof (e.g., at least, more than, etc.), unless otherwise specified, the endpoints shall be inclusive and the range (e.g., at least 70% identity) shall include all ranges within the cited range (e.g., at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 95.5%, at least 96%, at least 96.5%, at least 97%, at least 97.5%, at least 98%, at least 98.5%, at least 99%, at least 99.5%, at least 99.6%, at least 99.7%, at least 99.8%, or at least 99.9% identity) and all increments thereof (e.g., tenths of a percent (i.e., 0.1%), hundredths of a percent (i.e., 0.01%), etc.).

In some embodiments, the enzyme with beta-lyase activity comprises an amino acid sequence as set forth in SEQ ID NO: 2. In some embodiments, the enzyme with beta-lyase activity consists of the amino acid sequence as set forth in SEQ ID NO: 2. In some embodiments, the enzyme with beta-lyase activity comprises an amino acid sequence as set forth in SEQ ID NO: 3. In some embodiments, the enzyme with beta-lyase activity consists of the amino acid sequence as set forth in SEQ ID NO: 3. In some embodiments, the enzyme with beta-lyase activity comprises an amino acid sequence as set forth in SEQ ID NO: 4. In some embodiments, the enzyme with beta-lyase activity consists of the amino acid sequence as set forth in SEQ ID NO: 4. In some embodiments, the enzyme with beta-lyase activity comprises an amino acid sequence as set forth in SEQ ID NO: 5. In some embodiments, the enzyme with beta-lyase activity consists of the amino acid sequence as set forth in SEQ ID NO: 5.

In some embodiments, the gene encoding the enzyme with beta-lyase activity comprises a nucleic acid sequence which encodes an enzyme comprising an amino acid sequence with at least 80% (e.g., at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 95.5%, at least 96%, at least 96.5%, at least 97%, at least 97.5%, at least 98%, at least 98.5%, at least 99%, at least 99.5%, at least 99.6%, at least 99.7%, at least 99.8%, or at least 99.9%) sequence identity to the sequence as set forth in any one of SEQ ID NOs: 2-5. In some embodiments, the gene encoding the enzyme with beta-lyase activity comprises a nucleic acid sequence which encodes an enzyme comprising an amino acid sequence as set forth in SEQ ID NO: 2. In some embodiments, the gene encoding the enzyme with beta-lyase activity comprises a nucleic acid sequence which encodes an enzyme consisting of an amino acid sequence as set forth in any one of SEQ ID NOs: 2-5.

Identification of additional enzymes having beta-lyase activity or predicted to have beta-lyase activity may be performed, for example based on similarity or homology with one or more domains of a beta-lyase, such as the beta-lyase provided by any one of SEQ ID NOs: 1-7. In some embodiments, an enzyme for use in the modified cells and methods described herein may be identified based on similarity or homology with an active domain, such as a catalytic domain, such as a catalytic domain associated with beta-lyase activity. In some embodiments, an enzyme for use in the modified cells and methods described herein may have a relatively high level of sequence identity with a reference beta-lyase, e.g., a wild-type beta-lyase, such as SEQ ID NO: 1, in the region of the catalytic domain but a relatively low level of sequence identity to the reference beta-lyase based on analysis of a larger portion of the enzyme or across the full length of the enzyme. In some embodiments, the enzyme for use in the modified cells and methods described herein has at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 95.5%, at least 96%, at least 96.5%, at least 97%, at least 97.5%, at least 98%, at least 98.5%, at least 99%, at least 99.5%, at least 99.6%, at least 99.7%, at least 99.8%, or at least 99.9% sequence identity in the region of the catalytic domain of the enzyme relative to a reference beta-lyase (e.g., SEQ ID NO: 1).

In some embodiments, the enzyme for use in the modified cells and methods described herein has a relatively high level of sequence identity in the region of the catalytic domain of the enzyme relative to a reference beta-lyase (e.g., SEQ ID NO: 1, 3, 6, or 7) and a relatively low level of sequence identity to the reference beta-lyase based on analysis of a larger portion of the enzyme or across the full length of the enzyme. In some embodiments, the enzyme for use in the modified cells and methods described herein has at least 30% at least 35%, at least 40%, at least 45%, at least 50%, at least 55%, at least 60%, at least 65%, at least 88%, at least 89%, at least 90%, at least 91%, at least 92%, at least 93%, at least 94%, at least 95%, at least 95.5%, at least 96%, at least 96.5%, at least 97%, at least 97.5%, at least 98%, at least 98.5%, at least 99%, at least 99.5%, at least 99.6%, at least 99.7%, at least 99.8%, or at least 99.9% sequence identity based on a portion of the enzyme or across the full length of the enzyme relative to a reference beta-lyase (e.g., SEQ ID NO: 1, 3, 6, or 7).

In some embodiments, the amino acid substitution(s) may be in the active site. As used herein, the term "active site" refers to a region of the enzyme with which a substrate interacts. The amino acids that comprise the active site and amino acids surrounding the active site, including the functional groups of each of the amino acids, may contribute to the size, shape, and/or substrate accessibility of the active site. In some embodiments, the beta-lyase variant contains one or more modifications that are substitutions of a selected amino acid with an amino acid having a different functional group.

This information can also be used to identify positions, e.g., corresponding positions, in other enzymes having or predicted to have beta-lyase activity. As will be evident to one of ordinary skill in the art, an amino acid substitution at a position identified in one beta-lyase enzyme can also be made in the corresponding amino acid position of another beta-lyase enzyme. In such instances, one of the beta-lyase enzymes may be used as a reference enzyme. For example, as described herein, an amino acid substitution at position H463 of TnaA from *Citrobacter amalonaticus* have been shown to increase production of volatile thiols and reduce production of indoles. Similar amino acid substitutions can be made at the corresponding position of other enzymes having beta-lyase activity using TnaA as a reference (e.g., SEQ ID NO: 1). For example, amino acid substitutions can be made at the corresponding position of a beta-lyase from *Z. ganghwensis* or *A. saccharolyticus*, as described herein, using TnaA as a reference (e.g., SEQ ID NO: 1). In some embodiments, the amino acid at the position corresponding to position H463 of TnaA from *C. amalonaticus* (SEQ ID NO: 1) in another enzyme (e.g., a beta-lyase from *T. asperellum*) is not a histidine, see, e.g., SEQ ID NO: 3.

As will also be evident to one or ordinary skill in the art, the amino acid position number of a selected residue in a beta-lyase may have a different amino acid position number in another beta-lyase enzyme (e.g., a reference enzyme). Generally, one may identify corresponding positions in other beta-lyase enzymes using methods known in the art, for example by aligning the amino acid sequences of two or more enzymes. Software programs and algorithms for aligning amino acid (or nucleotide) sequences are known in the art and readily available, e.g., Clustal Omega (Sievers et al. 2011).

The beta-lyase variants described herein may further contain one or more additional modifications, for example to specifically alter a feature of the polypeptide unrelated to its desired physiological activity. Alternatively or in addition, the beta-lyase variants described herein may contain or more additional mutations to modulate expression of the enzyme in the cell.

Mutations of a nucleic acid which encodes a beta-lyase preferably preserve the amino acid reading frame of the coding sequence, and preferably do not create regions in the nucleic acid which are likely to hybridize to form secondary structures, such a hairpins or loops, which can be deleterious to expression of the enzyme.

Mutations can be made by selecting an amino acid substitution, or by random mutagenesis of a selected site in a nucleic acid which encodes the polypeptide. As described herein, variant polypeptides can be expressed and tested for one or more activities to determine which mutation provides a variant polypeptide with the desired properties. Further mutations can be made to variants (or to non-variant polypeptides) which are silent as to the amino acid sequence of the polypeptide, but which provide preferred codons for translation in a particular host (referred to as codon-optimization). The preferred codons for translation of a nucleic acid in, e.g., *S. cerevisiae*, are well known to those of ordinary skill in the art. Still other mutations can be made to the noncoding sequences of a gene or cDNA clone to enhance expression of the polypeptide. The activity of beta-lyase variant can be tested by cloning the gene encoding the beta-lyase variant into an expression vector, introducing the vector into an appropriate host cell, expressing the beta-lyase variant, and testing for a functional capability of the beta-lyase, as disclosed herein.

The beta-lyase variants described herein contain an amino acid substitution of one or more positions corresponding to a reference beta-lyase. In some embodiments, the beta-lyase variant contains an amino acid substitution at 1, 2, 3, 4, 5, or more positions corresponding to a reference beta-lyase. In some embodiments, the beta-lyase is not a naturally occurring beta-lyase, e.g., is genetically modified. In some embodiments, the beta-lyase does not have the amino acid sequence provided by SEQ ID NO: 1. In some embodiments, the beta-lyase does not have the amino acid sequence provided by SEQ ID NO: 3. In some embodiments, the beta-lyase does not have the amino acid sequence provided by SEQ ID NO: 6. In some embodiments, the beta-lyase does not have the amino acid sequence provided by SEQ ID NO: 7.

In some embodiments, the beta-lyase variant may also contain one or more amino acid substitutions that do not substantially affect the activity and/or structure of the beta-lyase enzyme. The skilled artisan will also realize that conservative amino acid substitutions may be made in the beta-lyase variant to provide functionally equivalent variants of the foregoing polypeptides, i.e., the variants retain the functional capabilities of the polypeptides. As used herein, a "conservative amino acid substitution" refers to an amino acid substitution which does not alter the relative charge or size characteristics of the protein in which the amino acid substitution is made. Variants can be prepared according to methods for altering polypeptide sequence known to one of ordinary skill in the art such as are found in references which compile such methods, e.g., Molecular Cloning: A Laboratory Manual, J. Sambrook, et al., eds., Fourth Edition, Cold Spring Harbor Laboratory Press, Cold Spring Harbor, New York, 2012, or Current Protocols in Molecular Biology, F. M. Ausubel, et al., eds., John Wiley & Sons, Inc., New York. Exemplary functionally equivalent variants of polypeptides include conservative amino acid substitutions in the amino acid sequences of proteins disclosed herein. Conservative substitutions of amino acids include substitutions made amongst amino acids within the following groups: (a) M, I, L, V; (b) F, Y, W; (c) K, R, H; (d) A, G; (e) S, T; (f) Q, N; and (g) E, D.

As one of ordinary skill in the art would be aware, homologous genes encoding an enzyme having beta-lyase could be obtained from other species and could be identified by homology searches, for example through a protein BLAST search, available at the National Center for Biotechnology Information (NCBI) internet site (ncbi.nlm.nih.gov). By aligning the amino acid sequence of an enzyme with one or more reference enzymes and/or by comparing the secondary or tertiary structure of a similar or homologous enzyme with one or more reference eta lyase, one can determine corresponding amino acid residues in similar or homologous enzymes and can determine amino acid residues for mutation in the similar or homologous enzyme.

Genes associated with the disclosure can be obtained (e.g., by PCR amplification) from DNA from any source of DNA which contains the given gene. In some embodiments, genes associated with the invention are synthetic, e.g., produced by chemical synthesis in vitro. Any means of obtaining a gene encoding the enzymes described herein are compatible with the modified cells and methods described herein.

The disclosure provided herein involves recombinant expression of genes encoding an enzyme having beta-lyase activity, functional modifications and variants of the foregoing, as well as uses relating thereto. Homologs and alleles of the nucleic acids associated with the invention can be identified by conventional techniques. Also encompassed by the invention are nucleic acids that hybridize under stringent conditions to the nucleic acids described herein. The term "stringent conditions" as used herein refers to parameters with which the art is familiar. Nucleic acid hybridization parameters may be found in references which compile such methods, e.g., Molecular Cloning: A Laboratory Manual, J. Sambrook, et al., eds., Fourth Edition, Cold Spring Harbor Laboratory Press, Cold Spring Harbor, New York, 2012, or Current Protocols in Molecular Biology, F. M. Ausubel, et al., eds., John Wiley & Sons, Inc., New York.

There are other conditions, reagents, and so forth which can be used, which result in a similar degree of stringency. The skilled artisan will be familiar with such conditions, and thus they are not given here. It will be understood, however, that the skilled artisan will be able to manipulate the conditions in a manner to permit the clear identification of homologs and alleles of nucleic acids of the invention (e.g., by using lower stringency conditions). The skilled artisan also is familiar with the methodology for screening cells and libraries for expression of such molecules which then are routinely isolated, followed by isolation of the pertinent nucleic acid molecule and sequencing.

The invention also includes degenerate nucleic acids which include alternative codons to those present in the native materials. For example, serine residues are encoded by the codons TCA, AGT, TCC, TCG, TCT and AGC. Each of the six codons is equivalent for the purposes of encoding a serine residue. Thus, it will be apparent to one of ordinary skill in the art that any of the serine-encoding nucleotide triplets may be employed to direct the protein synthesis apparatus, in vitro or in vivo, to incorporate a serine residue into an elongating polypeptide. Similarly, nucleotide sequence triplets which encode other amino acid residues include, but are not limited to: CCA, CCC, CCG and CCT (proline codons); CGA, CGC, CGG, CGT, AGA and AGG (arginine codons); ACA, ACC, ACG and ACT (threonine codons); AAC and AAT (asparagine codons); and ATA, ATC and ATT (isoleucine codons). Other amino acid residues may be encoded similarly by multiple nucleotide sequences. Thus, the invention embraces degenerate nucleic acids that differ from the biologically isolated nucleic acids in codon sequence due to the degeneracy of the genetic code. The invention also embraces codon optimization to suit optimal codon usage of a host cell.

The invention also provides modified nucleic acid molecules which include additions, substitutions and deletions of one or more nucleotides. In preferred embodiments, these modified nucleic acid molecules and/or the polypeptides they encode retain at least one activity or function of the unmodified nucleic acid molecule and/or the polypeptides, such as enzymatic activity. In certain embodiments, the modified nucleic acid molecules encode modified polypeptides, preferably polypeptides having conservative amino acid substitutions as are described elsewhere herein. The modified nucleic acid molecules are structurally related to the unmodified nucleic acid molecules and in preferred embodiments are sufficiently structurally related to the unmodified nucleic acid molecules so that the modified and unmodified nucleic acid molecules hybridize under stringent conditions known to one of skill in the art.

For example, modified nucleic acid molecules which encode polypeptides having single amino acid changes can be prepared. Each of these nucleic acid molecules can have one, two or three nucleotide substitutions exclusive of nucleotide changes corresponding to the degeneracy of the genetic code as described herein. Likewise, modified nucleic acid molecules which encode polypeptides having two amino acid changes can be prepared which have, e.g., 2-6 nucleotide changes. Numerous modified nucleic acid molecules like these will be readily envisioned by one of skill in the art, including for example, substitutions of nucleotides in codons encoding amino acids 2 and 3, 2 and 4, 2 and 5, 2 and 6, and so on. In the foregoing example, each combination of two amino acids is included in the set of modified nucleic acid molecules, as well as all nucleotide substitutions which code for the amino acid substitutions. Additional nucleic acid molecules that encode polypeptides having additional substitutions (i.e., 3 or more), additions or deletions (e.g., by introduction of a stop codon or a splice site(s)) also can be prepared and are embraced by the invention as readily envisioned by one of ordinary skill in the art. Any of the foregoing nucleic acids or polypeptides can be tested by routine experimentation for retention of structural relation or activity to the nucleic acids and/or polypeptides disclosed herein.

In some embodiments, one or more of the genes associated with the invention is expressed in a recombinant expression vector. As used herein, a "vector" may be any of a number of nucleic acids into which a desired sequence or sequences may be inserted by restriction and ligation for transport between different genetic environments or for expression in a host cell. Vectors are typically composed of DNA although RNA vectors are also available. Vectors include, but are not limited to: plasmids, fosmids, phagemids, virus genomes and artificial chromosomes.

A cloning vector is one which is able to replicate autonomously or integrated in the genome in a host cell. In the case of plasmids, replication of the desired sequence may occur many times as the plasmid increases in copy number within the host cell such as a host bacterium or just a single time per host before the host reproduces by mitosis. In the case of phage, replication may occur actively during a lytic phase or passively during a lysogenic phase.

An expression vector is one into which a desired DNA sequence may be inserted by restriction and ligation such that it is operably joined to regulatory sequences and may be expressed as an RNA transcript. Vectors may further contain one or more marker sequences suitable for use in the identification of cells which have or have not been transformed or transfected with the vector. Markers include, for example, genes encoding proteins which increase or decrease either resistance or sensitivity to antibiotics or other compounds, genes which encode enzymes whose activities are detectable by standard assays known in the art (e.g., β-galactosidase, luciferase or alkaline phosphatase), and genes which visibly affect the phenotype of transformed or transfected cells, hosts, colonies or plaques (e.g., green fluorescent protein). Preferred vectors are those capable of autonomous replication and expression of the structural gene products present in the DNA segments to which they are operably joined.

As used herein, a coding sequence and regulatory sequences are said to be "operably" joined when they are covalently linked in such a way as to place the expression or transcription of the coding sequence under the influence or control of the regulatory sequences. If it is desired that the coding sequences be translated into a functional protein, two DNA sequences are said to be operably joined if induction of a promoter in the 5' regulatory sequences results in the transcription of the coding sequence and if the nature of the linkage between the two DNA sequences does not (1) result in the introduction of a frame-shift mutation, (2) interfere with the ability of the promoter region to direct the transcription of the coding sequences, or (3) interfere with the ability of the corresponding RNA transcript to be translated into a protein. Thus, a promoter region would be operably joined to a coding sequence if the promoter region were capable of effecting transcription of that DNA sequence such that the resulting transcript can be translated into the desired protein or polypeptide.

When the nucleic acid molecule that encodes any of the enzymes of the claimed invention is expressed in a cell, a variety of transcription control sequences (e.g., promoter/enhancer sequences) can be used to direct its expression. The promoter can be a native promoter, i.e., the promoter of the gene in its endogenous context, which provides normal regulation of expression of the gene. In some embodiments the promoter can be constitutive, i.e., the promoter is unregulated allowing for continual transcription of its associated gene (e.g., an enzyme having beta-lyase activity). A variety of conditional promoters also can be used, such as promoters controlled by the presence or absence of a molecule.

The precise nature of the regulatory sequences needed for gene expression may vary between species or cell types, but shall in general include, as necessary, 5' non-transcribed and 5' non-translated sequences involved with the initiation of transcription and translation respectively, such as a TATA box, capping sequence, CAAT sequence, and the like. In particular, such 5' non-transcribed regulatory sequences will include a promoter region which includes a promoter sequence for transcriptional control of the operably joined gene. Regulatory sequences may also include enhancer sequences or upstream activator sequences as desired. The vectors of the invention may optionally include 5' leader or signal sequences. The choice and design of an appropriate vector is within the ability and discretion of one of ordinary skill in the art.

Expression vectors containing all the necessary elements for expression are commercially available and known to those skilled in the art. See, e.g., Sambrook et al., Molecular Cloning: A Laboratory Manual, Fourth Edition, Cold Spring Harbor Laboratory Press, 2012. Cells are genetically engineered by the introduction into the cells of heterologous DNA (RNA). That heterologous DNA (RNA) is placed under operable control of transcriptional elements to permit the expression of the heterologous DNA in the host cell. Heterologous expression of genes encoding enzymes having beta-lyase activity in genetically modified yeast cells, for example in methods of producing fermented beverages, such as beer, is demonstrated in the Examples using S. cerevisiae strain WLP001. As one of ordinary skill in the art would appreciate, any of the enzymes described herein can also be expressed in other yeast cells, including yeast strains used for producing wine, mead, sake, cider, etc.

A nucleic acid molecule that encodes the enzyme of the claimed invention can be introduced into a cell or cells using methods and techniques that are standard in the art. For example, nucleic acid molecules can be introduced by standard protocols such as transformation including chemical transformation and electroporation, transduction, particle bombardment, etc. Expressing the nucleic acid molecule encoding the enzymes of the claimed invention also may be accomplished by integrating the nucleic acid molecule into the genome.

The incorporation of a heterologous gene can be accomplished either by incorporation of the new nucleic acid into the genome of the yeast cell, or by transient or stable maintenance of the new nucleic acid as an episomal element. In eukaryotic cells, a permanent, inheritable genetic change is generally achieved by introduction of the DNA into the genome of the cell.

The heterologous gene may also include various transcriptional elements required for expression of the encoded gene product (e.g., enzyme having beta-lyase activity). For example, in some embodiments, the heterologous gene may include a promoter. In some embodiments, the promoter may be operably joined to the gene of the heterologous gene. In some embodiments, the cell is an inducible promoter. In some embodiments, the promoter is active during a particular stage of a fermentation process. In some embodiments, the promoter is a constitutive promoter. Examples of constitutive promoters for use in yeast cells are known in the art and evident to one of ordinary skill in the art. In some embodiments, the promoter is a yeast promoter, e.g., a native promoter from the yeast cell in which the heterologous gene is expressed. In some examples, the promoter is the PKG1 promoter (pPGK1) or the HHF2 promoter (pHHF2).

Genetically Modified Yeast Cells

Aspects of the present disclosure relates to genetically modified yeast cells (modified cells) and use of such modified cells in methods of producing a fermented product (e.g., a fermented beverage) and methods of producing ethanol. The genetically modified yeast cells described herein are genetically modified with a heterologous gene encoding an enzyme with beta-lyase activity.

The terms "genetically modified cell," "genetically modified yeast cell," and "modified cell," as may be used interchangeably herein, to refer to a eukaryotic cell (e.g., a yeast cell, which has been, or may be presently, modified by the introduction of a heterologous gene. The terms (e.g., modified cell) include the progeny of the original cell which has been genetically modified by the introduction of a heterologous gene. It shall be understood by the skilled artisan that the progeny of a single cell may not necessarily be completely identical in morphology or in genomic or total nucleic acid complement as the original parent, due to mutation (i.e., natural, accidental, or deliberate alteration of the nucleic acids of the modified cell).

Yeast cells for use in the methods described herein are preferably capable of fermenting a sugar source (e.g., a fermentable sugar) and producing ethanol (ethyl alcohol) and carbon dioxide. In some embodiments, the yeast cell is of the genus *Saccharomyces*. The *Saccharomyces* genus includes nearly 500 distinct of species, many of which are used in food production. One example species is *Saccharomyces cerevisiae* (*S. cerevisiae*), which is commonly referred to as "brewer's yeast" or "baker's yeast," and is used in the production of wine, bread, beer, among other products. Other members of the *Saccharomyces* genus include, without limitation, the wild yeast *Saccharomyces paradoxus*, which is a close relative to *S. cerevisiae*; *Saccharomyces bayanus*, *Saccharomyces pastorianus*, *Saccharomyces carlsbergensis*, *Saccharomyces uvarum*, *Saccharomyces cerevisiae* var *boulardii*, *Saccharomyces eubayanus*. In some embodiments, the yeast is *Saccharomyces cerevisiae* (*S. cerevisiae*).

*Saccharomyces* species may be haploid (i.e., having a single set of chromosomes), diploid (i.e., having a paired set of chromosomes), or polyploid (i.e., carrying or containing more than two homologous sets of chromosomes). *Saccharomyces* species used, for example for beer brewing, are typically classified into two groups: ale strains (e.g., *S. cerevisiae*), which are top fermenting, and lager strains (e.g., *S. pastorianus, S. carlsbergensis, S. uvarum*), which are bottom fermenting. These characterizations reflect their separation characteristics in open square fermentors, as well as often other characteristics such as preferred fermentation temperatures and alcohol concentrations achieved.

Although beer brewing and wine producing has traditionally focused on use of *S. cerevisiae* strains, other yeast genera have been appreciated in production of fermented beverages. In some embodiments, the yeast cell belongs to a non-*Saccharomyces* genus. See, e.g., Crauwels et al. *Brewing Science* (2015) 68: 110-121; Esteves et al. *Microorganisms* (2019) 7(11): 478. In some embodiments, the yeast cell is of the genus *Kloeckera, Candida, Starmerella, Hanseniaspora, Kluyveromyces/Lachance, Metschnikowia, Saccharomycodes, Zygosaccharomyce, Dekkera* (also referred to as *Brettanomyces*), *Wickerhamomyces*, or *Torulaspora*. Examples of non-*Saccharomyces* yeast include, without limitation, *Hanseniaspora uvarum, Hanseniaspora guillermondii, Hanseniaspora vinae, Metschnikowia pulcherrima, Kluyveromyces/Lachancea thermotolerans, Starmerella bacillaris* (previously referred to as *Candida stellata/Candida zemplinina*), *Saccharomycodes ludwigii, Zygosaccharomyces rouxii, Dekkera bruxellensis, Dekkera anomala, Brettanomyces custersianus, Brettanomyces naardenensis, Brettanomyces nanus, Wickerhamomyces anomalus*, and *Torulaspora delbrueckii*.

In some embodiments, the methods described herein involve use of more than one genetically modified yeast. For example, in some embodiments, the methods may involve use of more than one genetically modified yeast belonging to the genus *Saccharomyces*. In some embodiments, the methods may involve use of more than one genetically modified yeast belonging to a non-*Saccharomyces* genus. In some embodiments, the methods may involve use of more than one genetically modified yeast belonging to the genus *Saccharomyces* and one genetically modified yeast belonging to a non-*Saccharomyces* genus. Alternatively or in addition, the any of the methods described herein may involve use of one or more genetically modified yeast and one or more non-genetically modified (wildtype) yeast.

In some embodiments, the yeast is a hybrid strain. As will be evident to one of ordinary skill in the art, the term "hybrid strain" of yeast refers to a yeast strain that has resulted from the crossing of two different yeast strains, for example, to achieve one or more desired characteristics. For example, a hybrid strain may result from the crossing of two different yeast strains belonging to the same genus or the same species. In some embodiments, a hybrid strain results from the crossing of a *Saccharomyces cerevisiae* strain and a *Saccharomyces eubayanus* strain. See, e.g., Krogerus et al. *Microbial Cell Factories* (2017) 16: 66.

In some embodiments, the yeast strain is a wild yeast strain, such as a yeast strain that is isolated from a natural source and subsequently propagated. Alternatively, in some embodiments, the yeast strain is a domesticated yeast strain. Domesticated yeast strains have been subjected to human selection and breeding to have desired characteristics.

In some embodiments, the genetically modified yeast cells may be used in symbiotic matrices with bacterial strains and used for the production of fermented beverages, such as kombucha, kefir, and ginger beers. *Saccharomyces fragilis*, for example, is part of kefir culture and is grown on the lactose contained in whey.

Methods of genetically modifying yeast cells are known in the art. In some embodiments, the yeast cell is diploid and one copy of a heterologous gene encoding an enzyme with beta-lyase activity as described herein is introduced into the yeast genome. In some embodiments, the yeast cell is diploid and one copy of a heterologous gene encoding an enzyme with beta-lyase activity as described herein is introduced into both copies of the yeast genome. In some embodiments, the copies of the heterologous gene are identical. In some embodiments, the copies of the heterologous gene are not identical, but the genes encode an identical enzyme having beta-lyase activity. In some embodiments, the copies of the heterologous gene are not identical, and the genes encode enzymes having beta-lyase activity that are different (e.g., mutants, variants, fragments thereof).

In some embodiments, the yeast cell is tetraploid. Tetraploid yeast cells are cells which maintain four complete sets of chromosomes (i.e., a complete set of chromosomes in four copies). In some embodiments, the yeast cell is tetraploid and a copy of a heterologous gene encoding an enzyme with beta-lyase activity as described herein is introduced into at least one copy of the genome. In some embodiments, the yeast cell is tetraploid and a copy of a heterologous gene encoding an enzyme with beta-lyase activity as described herein is introduced into more than one copy of the genome. In some embodiments, the yeast cell is tetraploid and a copy of a heterologous gene encoding an enzyme with beta-lyase activity as described herein is introduced all four copies of the genome. In some embodiments, the copies of the heterologous gene are identical. In some embodiments, the copies of the heterologous gene are not identical, but the genes encode an identical enzyme having beta-lyase activity. In some embodiments, the copies of the heterologous gene are not identical, and the genes encode enzymes having beta-lyase activity that are different (e.g., mutants, variants, fragments thereof).

Strains of yeast cells that may be used with the methods described herein will be known to one of ordinary skill in the art and include yeast strains used for brewing desired fermented beverages as well as commercially available yeast strains. Examples of common beer strains include, without limitation, American ale strains, Belgian ale strains, British ale strains, Belgian lambic/sour ale strains, Barleywine/Imperial Stout strains, India Pale Ale strains, Brown Ale strains, Kolsch and Altbier strains, Stout and Porter strains, Wheat beer strains.

Non-limiting examples of yeast strains for use with the genetically modified cells and methods described herein include Wyeast American Ale 1056, Wyeast American Ale 111272, Wyeast Denny's Favorite 50 1450, Wyeast Northwest Ale 1332, Wyeast Ringwood Ale 1187, Siebel Inst. American Ale BRY 96, White Labs American Ale Yeast Blend WLP060, White Labs California Ale V WLP051, White Labs California Ale WLP001, White Labs Old Sonoma Ale WLP076, White Labs Pacific Ale WLP041, White Labs East Coast Ale WLP008, White Labs East Midlands Ale WLP039, White Labs San Diego Super Yeast WLP090, White Labs San Francisco Lager WLP810, White Labs Neutral Grain WLP078, Lallemand American West Coast Ale BRY-97, Lallemand CBC-1 (Cask and Bottle Conditioning), Brewferm Top, Coopers Pure Brewers' Yeast, Fermentis US-05, Real Brewers Yeast Lucky #7, Muntons Premium Gold, Muntons Standard Yeast, East Coast Yeast Northeast Ale ECY29, East Coast Yeast Old Newark Ale ECY10, East Coast Yeast Old Newark Beer ECY12, Fermentis Safale US-05, Fermentis Safbrew T-58, Real Brewers Yeast The One, Mangrove Jack US West Coast Yeast, Mangrove Jack Workhorse Beer Yeast, Lallemand Abbaye Belgian Ale, White Labs Abbey IV WLP540, White Labs American Farmhouse Blend WLP670, White Labs Antwerp Ale WLP515, East Coast Yeast Belgian Abbaye ECY09, White Labs Belgian Ale WLP550, Mangrove Jack Belgian Ale Yeast, Wyeast Belgian Dark Ale 3822-PC, Wyeast Belgian Saison 3724, White Labs Belgian Saison I WLP565, White Labs Belgian Saison II WLP566, White Labs Belgian Saison III WLP585, Wyeast Belgian Schelde Ale 3655-PC, Wyeast Belgian Stout 1581-PC, White Labs Belgian Style Ale Yeast Blend WLP575, White Labs Belgian Style Saison Ale Blend WLP568, East Coast Yeast Belgian White ECY11, Lallemand Belle Saison, Wyeast Biere de Garde 3725-PC, White Labs *Brettanomyces bruxellensis* Trois Vrai WLP648, Brewferm Top, Wyeast Canadian/Belgian Ale 3864-PC, Lallemand CBC-1 (Cask and Bottle Conditioning), Wyeast Farmhouse Ale 3726-PC, East Coast Yeast Farmhouse Brett ECY03, Wyeast Flanders Golden Ale 3739-PC, White Labs Flemish Ale Blend WLP665, White Labs French Ale WLP072, Wyeast French Saison 3711, Wyeast Leuven Pale Ale 3538-PC, Fermentis Safbrew T-58, East Coast Yeast Saison Brasserie Blend ECY08, East Coast Yeast Saison Single-Strain ECY14, Real Brewers Yeast The Monk, Siebel Inst. Trappist Ale BRY 204, East Coast Yeast Trappist Ale ECY13, White Labs Trappist Ale WLP500, Wyeast Trappist Blend 3789-PC, Wyeast British Ale 1098, Wyeast British Ale 111335, Wyeast British Cask Ale 1026-PC, Wyeast English Special Bitter 1768-PC, Wyeast Irish Ale 1084, Wyeast London Ale 1028, Wyeast London Ale III 1318, Wyeast London ESB Ale 1968, Wyeast Ringwood Ale 1187, Wyeast Thames Valley Ale 1275, Wyeast Thames Valley Ale II 1882-PC, Wyeast West Yorkshire Ale 1469, Wyeast Whitbread Ale 1099, Mangrove Jack British Ale Yeast, Mangrove Jack Burton Union Yeast, Mangrove Jack Workhorse Beer Yeast, East Coast Yeast British Mild Ale ECY18, East Coast Yeast Northeast Ale ECY29, East Coast Yeast Burton Union ECY17, East Coast Yeast Old Newark Ale ECY10, White Labs Bedford British Ale WLP006, White Labs British Ale WLP005, White Labs Burton Ale WLP023, White Labs East Midlands Ale WLP039, White Labs English Ale Blend WLP085, White Labs English Ale WLP002, White Labs Essex Ale Yeast WLP022, White Labs Irish Ale WLP004, White Labs London Ale WLP013, White Labs Manchester Ale WLP038, White Labs Old Sonoma Ale WLP076, White Labs San Diego Super Yeast WLP090, White Labs Whitbread Ale WLP017, White Labs North Yorkshire Ale WLP037, Coopers Pure Brewers' Yeast, Siebel Inst. English Ale BRY 264, Muntons Premium Gold, Muntons Standard Yeast, Lallemand Nottingham, Fermentis Safale S-04, Fermentis Safbrew T-58, Lallemand Windsor (British Ale), Real Brewers Yeast Ye Olde English, Brewferm Top, White Labs American Whiskey WLP065, White Labs Dry English Ale WLP007, White Labs Edinburgh Ale WLP028, Fermentis Safbrew S-33, Wyeast Scottish Ale 1728, East Coast Yeast Scottish Heavy ECY07, White Labs Super High Gravity WLP099, White Labs Whitbread Ale WLP017, Wyeast Belgian Lambic Blend 3278, Wyeast Belgian Schelde Ale 3655-PC, Wyeast Berliner-Weisse Blend 3191-PC, Wyeast *Brettanomyces bruxellensis* 5112, Wyeast *Brettanomyces lambicus* 5526, Wyeast *Lactobacillus* 5335, Wyeast *Pediococcus cerevisiae* 5733, Wyeast Roeselare Ale Blend 3763, Wyeast Trappist Blend 3789-Pc, White Labs Belgian Sour Mix Wlp655, White Labs Berliner Weisse Blend Wlp630, White Labs *Saccharomyces* "*bruxellensis*" Trois Wlp644, White Labs *Brettanomyces bruxellensis* Wlp650, White Labs *Brettanomyces claussenii* Wlp645, White Labs *Brettanomyces lambicus* Wlp653, White Labs Flemish Ale Blend Wlp665, East Coast Yeast Berliner Blend Ecy06, East Coast Yeast Brett *Anomala* Ecy04, East Coast Yeast Brett Bruxelensis Ecy05, East Coast Yeast Brett *custersianus* Ecy19, East Coast Yeast Brett *Nanus* Ecy16, Strain #2, East Coast Yeast BugCounty ECY20, East Coast Yeast BugFarm ECY01, East Coast Yeast Farmhouse Brett ECY03, East Coast Yeast Flemish Ale ECY02, East Coast Yeast Oud Brune ECY23, Wyeast American Ale 1056, Siebel Inst. American Ale BRY 96, White Labs American Ale Yeast Blend WLP060, White Labs Bourbon Yeast WLP070, White Labs California Ale V WLP051, White Labs California Ale WLP001, White Labs Dry English ale WLP007, White Labs East Coast Ale WLP008, White Labs Neutral Grain WLP078, White Labs Super High Gravity WLP099, White Labs Tennessee WLP050, Fermentis US-05, Real Brewers Yeast Lucky #7, Fermentis Safbrew S-33, East Coast Yeast Scottish Heavy ECY07, Lallemand Windsor (British Ale), Wyeast American Ale 1056, Wyeast American Ale 111272, Wyeast British Ale 1098, Wyeast British Ale 111335, Wyeast Denny's Favorite 50 1450, Wyeast London Ale 1028, Wyeast London Ale III 1318, Wyeast London ESB Ale 1968, Wyeast Northwest Ale 1332, Wyeast Ringwood Ale 1187, Siebel Inst. American Ale BRY 96, White Labs American Ale Yeast Blend WLP060, White Labs Bedford British Ale WLP006, White Labs British Ale WLP005, White Labs Burton Ale WLP023, White Labs California Ale V WLP051, White Labs California Ale WLP001, White Labs East Coast Ale WLP008, White Labs English Ale WLP002, White Labs London Ale WLP013, White Labs Essex Ale Yeast WLP022, White Labs Pacific Ale WLP041, White Labs San Diego Super Yeast WLP090, White Labs Whitbread Ale WLP017, Brewferm Top, Mangrove Jack Burton Union Yeast, Mangrove Jack US West Coast Yeast, Mangrove Jack Workhorse Beer Yeast, Coopers Pure Brewers' Yeast, Fermentis US-05, Fermentis Safale S-04, Fermentis Safbrew T-58, Real Brewers Yeast Lucky #7, Real Brewers Yeast The One, Muntons Premium Gold, Muntons Standard Yeast, East Coast Yeast Northeast Ale ECY29, Lallemand Nottingham, Lallemand Windsor (British Ale), Wyeast American Ale 1056, Wyeast American Ale 111272, Wyeast British Ale 1098, Wyeast British Ale 111335, Wyeast Thames Valley Ale 1275, Wyeast Thames Valley Ale II 1882-PC, Wyeast West Yorkshire Ale 1469, Wyeast Whitbread Ale 1099, Wyeast British Cask Ale 1026-PC, Wyeast English Special Bitter 1768-PC, Wyeast London Ale 1028, Wyeast London Ale III 1318, Wyeast London ESB Ale 1968, Wyeast Northwest Ale 1332, Wyeast Ringwood Ale 1187, White Labs American Ale Yeast Blend WLP060, White Labs British Ale WLP005, White Labs Bedford British Ale WLP006, White Labs British Ale WLP005, White Labs Burton Ale WLP023, White Labs California Ale V WLP051, White Labs California Ale WLP001, White Labs East Coast Ale WLP008, White Labs English Ale WLP002, White Labs Essex Ale Yeast WLP022, White Labs French Ale WLP072, White Labs London Ale WLP013, White Labs Pacific Ale WLP041, White Labs Whitbread Ale WLP017, Brewferm Top, East Coast Yeast British Mild Ale ECY18, Coopers Pure Brewers' Yeast, Muntons Premium Gold, Muntons Standard Yeast, Mangrove Jack Newcastle Dark Ale Yeast, Lallemand CBC-1 (Cask and Bottle Conditioning), Lallemand Nottingham, Lallemand Windsor (British Ale), Fermentis Safale S-04, Fermentis US-05, Siebel Inst. American Ale BRY 96, Wyeast American Wheat 1010, Wyeast German Ale 1007, Wyeast Kölsch 2565, Wyeast Kolsch II 2575-PC, White Labs Belgian Lager WLP815, White Labs Dusseldorf Alt WLP036, White Labs European Ale WLP011, White Labs German Ale/Kölsch WLP029, East Coast Yeast Kölschbier ECY21, Mangrove Jack Workhorse Beer Yeast, Siebel Inst. Alt Ale BRY 144, Wyeast American Ale 1056, Wyeast American Ale 111272, Wyeast British Ale 1098, Wyeast British Ale 111335, Wyeast Denny's Favorite 50 1450, Wyeast English Special Bitter 1768-PC, Wyeast Irish Ale 1084, Wyeast London Ale 1028, Wyeast London Ale III 1318, Wyeast London ESB Ale 1968, Wyeast Northwest Ale 1332, Wyeast Ringwood Ale 1187, Wyeast Thames Valley Ale 1275, Wyeast Thames Valley Ale II 1882-PC, Wyeast West Yorkshire Ale 1469, Wyeast Whitbread Ale 1099, White Labs American Ale Yeast Blend WLP060, White Labs Bedford British Ale WLP006, White Labs British Ale WLP005, White Labs Burton Ale WLP023, White Labs California Ale V WLP051, White Labs California Ale WLP001, White Labs East Coast Ale WLP008, White Labs East Midlands Ale WLP039, White Labs English Ale WLP002, White Labs Essex Ale Yeast WLP022, White Labs Irish Ale WLP004, White Labs London Ale WLP013, White Labs Old Sonoma Ale WLP076, White Labs Pacific Ale WLP041, White Labs Whitbread Ale WLP017, Coopers Pure Brewers' Yeast, Fermentis US-05, Muntons Premium Gold, Muntons Standard Yeast, Fermentis Safale S-04, Lallemand Nottingham, Lallemand Windsor (British Ale), Siebel Inst. American Ale BRY 96, White Labs American Hefeweizen Ale 320, White Labs Bavarian Weizen Ale 351, White Labs Belgian Wit Ale 400, White Labs Belgian Wit Ale II 410, White Labs Hefeweizen Ale 300, White Labs Hefeweizen IV Ale 380, Wyeast American Wheat 1010, Wyeast Bavarian Wheat 3638, Wyeast Bavarian Wheat Blend 3056, Wyeast Belgian Ardennes 3522, Wyeast Belgian Wheat 3942, Wyeast Belgian Witbier 3944, Wyeast Canadian/Belgian Ale 3864-PC, Wyeast Forbidden Fruit Yeast 3463, Wyeast German Wheat 3333, Wyeast Weihenstephan Weizen 3068, Siebel Institute Bavarian Weizen BRY 235, Fermentis Safbrew WB-06, Mangrove Jack Bavarian Wheat, Lallemand Munich (German Wheat Beer), Brewferm Blanche, Brewferm Lager, East Coast Yeast Belgian White ECY11. In some embodiments, the yeast is *S. cerevisiae* strain WLP001.

In some embodiments, the yeast strain for use with the genetically modified cells and methods described herein is a wine yeast strain. Examples of yeast strains for use with the genetically modified cells and methods described herein include, without limitation, Red Star Montrachet, Red Star Cote des Blancs, Red Star Premier Cuvee, Red Star Pasteur Red, Red Star Pasteur Champagne, Fermentis BCS-103, and Fermentis VR44.

Methods

Aspects of the present disclosure relate to methods of producing a fermented product using any of the genetically modified yeast cells described herein. Also provided are methods of producing ethanol using any of the genetically modified yeast cells described herein.

The process of fermentation exploits a natural process of using microorganisms to convert carbohydrates into alcohol and carbon dioxide. It is a metabolic process that produces chemical changes in organic substrates through enzymatic action. In the context of food production, fermentation broadly refers to any process in which the activity of microorganisms brings about a desirable change to a food product or beverage. The conditions for fermentation and the carrying out of a fermentation is referred to herein as a "fermentation process."

Figure 1E:
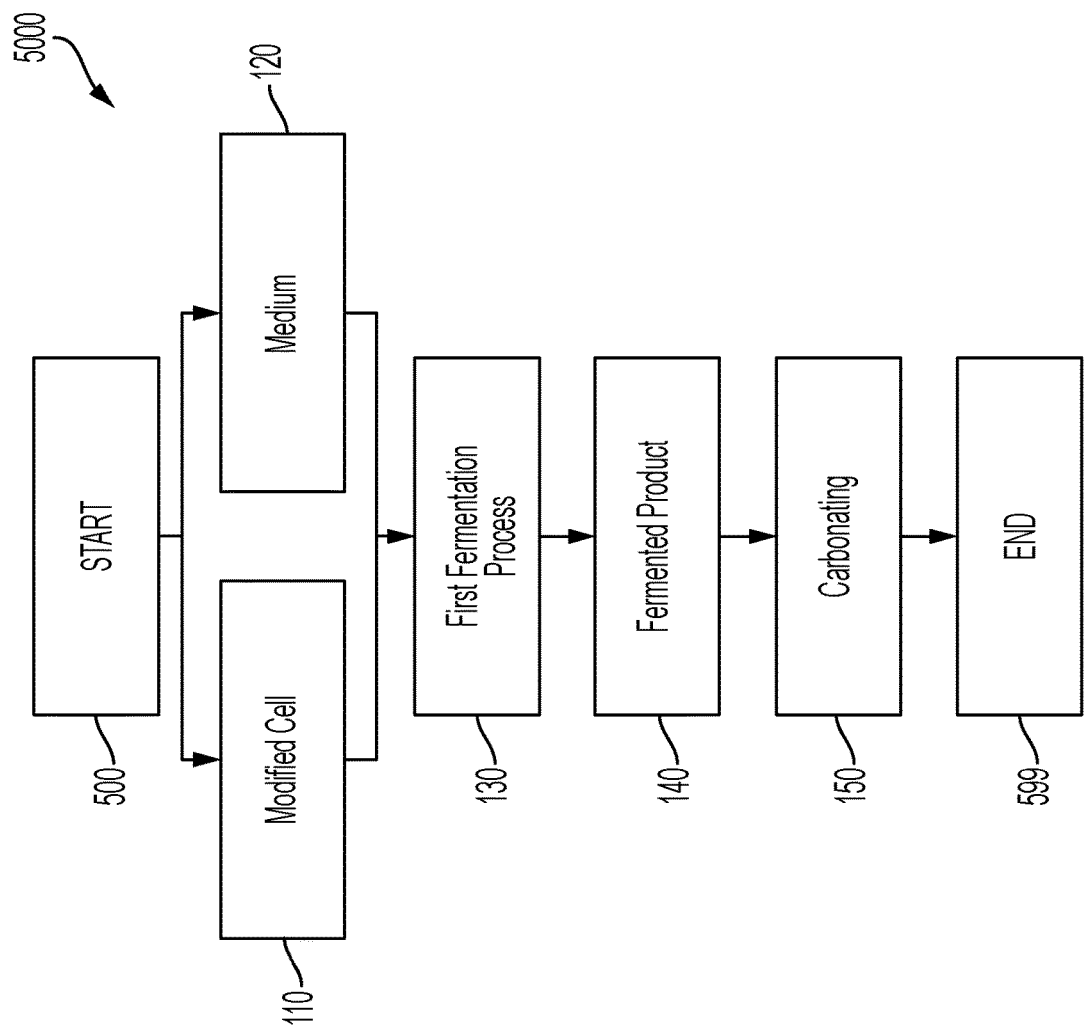

In some aspects, the disclosure relates to a method of producing a fermented product, such as a fermented beverage, involving contacting any of the modified cell described herein with a medium comprising at least one fermentable sugar during a first fermentation process, to produce a fermented product (FIGS. 1A-1G). A "medium" as used herein, refers to liquid conducive to fermentation, meaning a liquid which does not inhibit or prevent the fermentation process. In some embodiments, the medium is water. In some embodiments, the methods of producing a fermented product involve contacting purified enzymes (e.g., any of the beta-lyase enzymes described herein) with a medium comprising at least one fermentable sugar during a first fermentation process, to produce a fermented product (FIG. 1H).

As also used herein, the term "fermentable sugar" refers to a carbohydrate that may be converted into an alcohol and carbon dioxide by a microorganism, such as any of the cells described herein. In some embodiments, the fermentable sugar is converted into an alcohol and carbon dioxide by an enzyme, such as a recombinant enzyme or a cell that expresses the enzyme. Examples of fermentable sugars include, without limitation, glucose, fructose, lactose, sucrose, maltose, and maltotriose.

In some embodiments, the fermentable sugar is provided in a sugar source. The sugar source for use in the claimed methods may depend, for example, on the type of fermented product and the fermentable sugar. Examples of sugar sources include, without limitation, wort, grains/cereals, fruit juice (e.g., grape juice, apple juice/cider), honey, cane sugar, rice, and koji.

As will be evident to one of ordinary skill in the art, in some instances, it may be necessary to process the sugar source in order to make available the fermentable sugar for fermentation. Using beer production as an example fermented beverage, grains (cereal, barley) are boiled or steeped in water, which hydrates the grain and activates the malt enzymes converting the starches to fermentable sugars, referred to as "mashing." As used herein, the term "wort" refers to the liquid produced in the mashing process, which contains the fermentable sugars. The wort then is exposed to a fermenting organism (e.g., any of the cells described herein), which allows enzymes of the fermenting organism to convert the sugars in the wort to alcohol and carbon dioxide. In some embodiments, the wort is contacted with a recombinant enzyme (e.g., any of the enzymes described herein), which may optionally be purified or isolated from an organism that produces the enzyme, allowing the enzyme to convert the sugars in the wort to alcohol and carbon dioxide.

In some embodiments, the grains are malted, unmalted, or comprise a combination of malted and unmalted grains. Examples of grains for use in the methods described herein include, without limitation, barley, oats, maize, rice, rye, sorghum, wheat, karasumugi, and hatomugi.

In the example of producing sake, the sugar source is rice, which is incubated with koji mold (*Aspergillus oryzae*) converting the rice starch to fermentable sugar, producing koji. The koji then is exposed to a fermenting organism (e.g., any of the cells described herein), which allows enzymes of the fermenting organism to convert the sugars in the koji to alcohol and carbon dioxide. In some embodiments, the koji is contacted with a recombinant enzyme (e.g., any of the enzymes described herein), which may optionally be purified or isolated from an organism that produces the enzyme, allowing the enzyme to convert the sugars in the koji to alcohol and carbon dioxide.

In the example of producing wine, grapes are harvested, mashed (e.g., crushed) into a composition containing the skins, solids, juice, and seeds. The resulting composition is referred to as the "must." The grape juice may be separated from the must and fermented, or the entirety of the must (i.e., with skins, seeds, solids) may be fermented. The grape juice or must then is exposed to a fermenting organism (e.g., any of the cells described herein), which allows enzymes of the fermenting organism to convert the sugars in the grape juice or must to alcohol and carbon dioxide. In some embodiments, the grape juice or must is contacted with a recombinant enzyme (e.g., any of the enzymes described herein), which may optionally be purified or isolated from an organism that produces the enzyme, allowing the enzyme to convert the sugars in the grape juice or must to alcohol and carbon dioxide.

In some embodiments, the methods described herein involve producing the medium, which may involve heating or steeping a sugar source, for example in water. In some embodiments, the water has a temperature of at least 50 degrees Celsius (50° C.) and incubated with a sugar source of a period of time. In some embodiments, the water has a temperature of at least 75° C. and incubated with a sugar source of a period of time. In some embodiments, the water has a temperature of at least 100° C. and incubated with a sugar source of a period of time. Preferably, the medium is cooled prior to addition of any of the cells described herein.

Figure 1G:
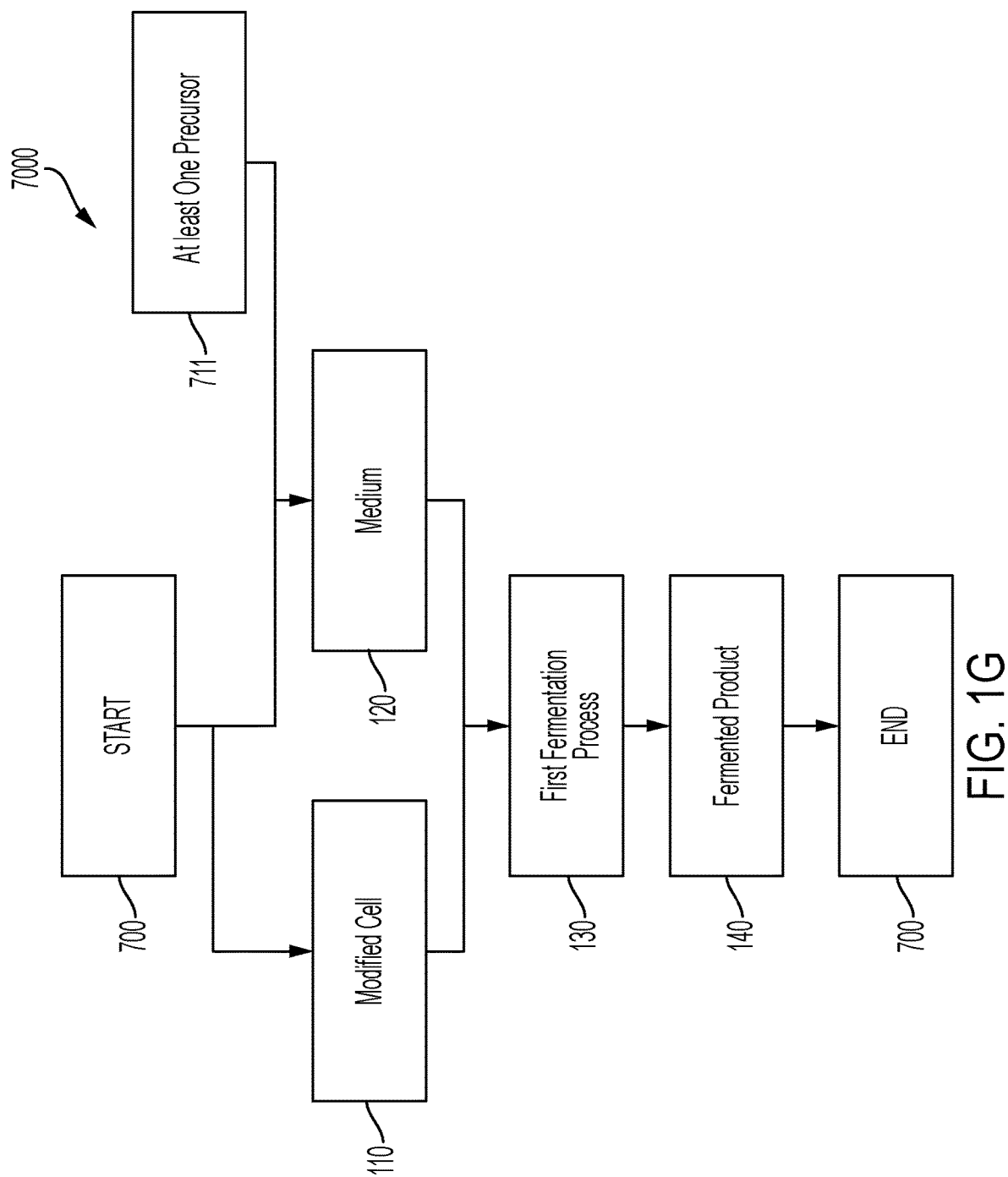
Figure 1H:
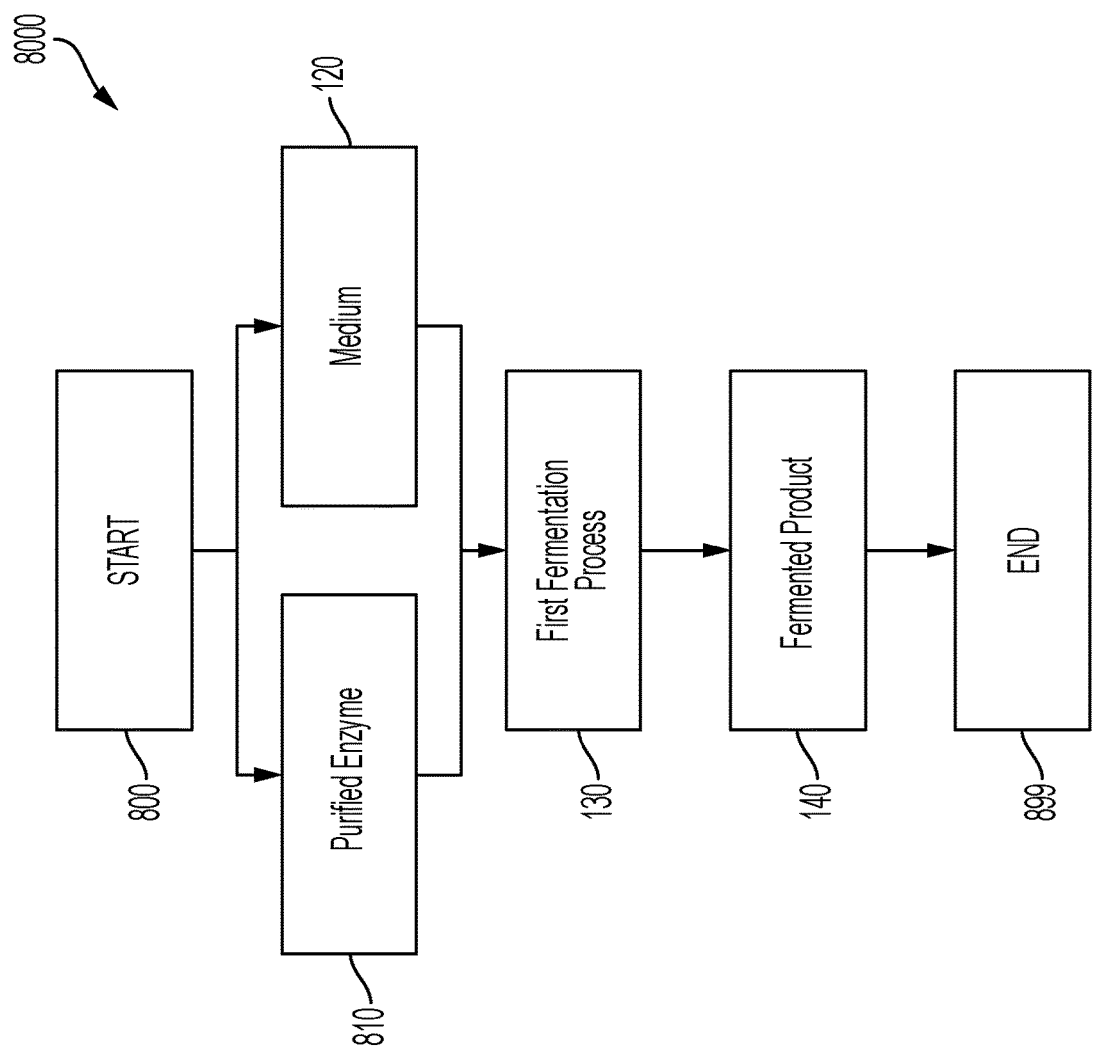

In some embodiments, the methods described herein further comprise adding at least one precursor (e.g., plant derived or chemically synthesized) to the medium or during the first fermentation process (FIG. 1G). Examples of precursors include, without limitation, 3-mercaptohexan-1-ol (Cys 3-MH), cysteine-conjugated 4-methyl-4-mercaptopentan-2-one (Cys 4MMP), glutathione conjugated 3-mercaptohexan-1-ol (Glut-3-MH), and/or glutathione conjugated 4-methyl-4-mercaptopentan 2-one (Glut 4MMP). In some embodiments, the precursor is a plant derived precursor. In some embodiments, the precursor is a chemically synthesized precursor. Methods of producing and/or obtaining the precursors are known in the art, for example, Grant-Preece et al. *J. Agric. Food Chem.* (2010) 58(3): 1383-1389; Fedrizzi et al. *J. Agric. Food Chem.* (2009) 57(3): 991-995; Pardon et al. *J. Agric. Food Chem.* (2008) 56(10): 3758-3763; Howell et al. *FEMS Microbiol. Lett.* (2004) 240(2): 125-9.

In some embodiments, the methods described herein further comprise adding at least one (e.g., 1, 2, 3, 4, 5, or more) hop variety for example to the medium, to a wort during a fermentation process. Hops are the flowers of the hops plant (*Humulus lupulus*) and are often used in fermentation to impart various flavors and aromas to the fermented product. Hops are considered to impart bitter flavoring in addition to floral, fruity, and/or citrus flavors and aromas and may be characterized based on the intended purpose. For example, bittering hops impart a level of bitterness to the fermented product due to the presence of alpha acids in the hop flowers, whereas aroma hops have lower lowers of alpha acids and contribute desirable aromas and flavor to the fermented product.

Whether one or more variety of hops is added to the medium and/or the wort and at stage during which the hops are added may be based on various factors, such as the intended purpose of the hops. For example, hops that are intended to impart a bitterness to the fermented product are typically added to during preparation of the wort, for example during boiling of the wort. In some embodiments, hops that are intended to impart a bitterness to the fermented product are added to the wort and boiled with the wort for a period of time, for example, for about 15-60 minutes. In contrast, hops that are intended to impart desired aromas to the fermented product are typically added later than hops used for bitterness. In some embodiments, hops that are intended to impart desired aromas to the fermented product are added to at the end of the boil or after the wort is boiled (i.e., "dry hopping"). In some embodiments, one or more varieties of hops may be added at multiple times (e.g., at least twice, at least three times, or more) during the methods.

In some embodiments, the hops are added in the form of either wet or dried hops and may optionally be boiled with the wort. In some embodiments, the hops are in the form of dried hop pellets. In some embodiments, at least one variety of hops is added to the medium. In some embodiments, the hops are wet (i.e., undried). In some embodiment, the hops are dried, and optionally may be further processed prior to use. In some embodiments, the hops are added to the wort prior to the fermentation process. In some embodiments, the hops are boiled in the wort. In some embodiments, the hops are boiled with the wort and then cooled with the wort.

Many varieties of hops are known in the art and may be used in the methods described herein. Examples of hop varieties include, without limitation, Ahtanum, Amarillo, Apollo, Cascade, Centennial, Chinook, Citra, Cluster, Columbus, Crystal/Chrystal, Eroica, Galena, Glacier, Greenburg, Horizon, Liberty, Millennium, Mosaic, Mount Hood, Mount Rainier, Newport, Nugget, Palisade, Santiam, Simcoe, Sterling, Summit, Tomahawk, Ultra, Vanguard, Warrior, Willamette, Zeus, Admiral, Brewer's Gold, Bullion, Challenger, First Gold, Fuggles, Goldings, Herald, Northdown, Northern Brewer, Phoenix, Pilot, Pioneer, Progress, Target, Whitbread Golding Variety (WGV), Hallertau, Hersbrucker, Saaz, Tettnang, Spalt, Feux-Coeur Francais, Galaxy, Green Bullet, Motueka, Nelson Sauvin, Pacific Gem, Pacific Jade, Pacifica, Pride of Ringwood, Riwaka, Southern Cross, Lublin, Magnum, Perle, Polnischer Lublin, Saphir, Satus, Select, Strisselspalt, Styrian Goldings, Tardif de Bourgogne, Tradition, Bravo, Calypso, Chelan, Comet, El Dorado, San Juan Ruby Red, Satus, Sonnet Golding, Super Galena, Tillicum, Bramling Cross, Pilgrim, Hallertauer Herkules, Hallertauer Magnum, Hallertauer Taurus, Merkur, Opal, Smaragd, Halleratau Aroma, Kohatu, Rakau, Stella, Sticklebract, Summer Saaz, Super Alpha, Super Pride, Topaz, Wai-iti, Bor, Junga, Marynka, Premiant, Sladek, Styrian Atlas, Styrian Aurora, Styrian Bobek, Styrian Celeia, Sybilla Sorachi Ace, Hallertauer Mittelfrueh, Hallertauer Tradition, Tettnanger, Tahoma, Triple Pearl, Yahima Gold, and Michigan Copper.

In some embodiments, the fermentation process of at least one sugar source comprising at least one fermentable sugar may be carried out for about 1 day to about 30 days. In some embodiments, the fermentation process is performed for about 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days or longer. In some embodiments, the fermentation process of the one or more fermentable sugars may be performed at a temperature of about 4° C. to about 30° C. In some embodiments, the fermentation process of one or more fermentable sugars may be carried out at temperature of about 8° C. to about 14° C. or about 18° C. to about 24° C. In some embodiments, the fermentation process of one or more fermentable sugars may be performed at a temperature of about 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., or 30° C.

The methods described herein may involve at least one additional fermentation process, for example as shown in FIG. 1D. Such additional fermentation methods may be referred to as secondary fermentation processes (also referred to as "aging" or "maturing"). As will be understood by one of ordinary skill in the art, secondary fermentation typically involves transferring a fermented beverage to a second receptacle (e.g., glass carboy, barrel) where the fermented beverage is incubated for a period of time. In some embodiments, the secondary fermentation is performed for a period of time between 10 minutes and 12 months. In some embodiments, the secondary fermentation is performed for 10 minutes, 20 minutes, 40 minutes, 40 minutes, 50 minutes, 60 minutes (1 hour), 2 ours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 1 day, 2 days, 3 days, 4 days, 5 days, 6 days, 7 days, 8 days, 9 days, 10 days, 11 days, 12 days, 13 days, 14 days, 2 weeks, 3 weeks, 4 weeks, 5 weeks, 6 weeks, 7 weeks, 8 weeks, 9 weeks, 10 weeks, 11 weeks, 12 weeks, 13 weeks, 14 weeks, 3 months, 4 months, 5 months, 6 months, 7 months, 8 months, 9 months, 10 months, 11 months, 12 months, or longer. In some embodiments, the additional or secondary fermentation process of the one or more fermentable sugars may be performed at a temperature of about 4° C. to about 30° C. In some embodiments, the additional or secondary fermentation process of one or more fermentable sugars may be carried out at temperature of about 8° C. to about 14° C. or about 18° C. to about 24° C. In some embodiments, the additional or secondary fermentation process of one or more fermentable sugars may be performed at a temperature of about 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., or 30° C.

As will be evident to one of ordinary skill in the art, selection of time period and temperature for an additional or secondary fermentation process will depend on factors such as the type of beer, the characteristics of the beer desired, and the yeast strain used in the methods.

In some embodiments, one or more additional flavor component may be added to the medium prior to or after the fermentation process. Examples include, hop oil, hop aromatics, hop extracts, hop bitters, and isomerized hops extract.

Various refinement, filtration, and aging processes may occur subsequent fermentation, after which the liquid is bottled (e.g., captured and sealed in a container for distribution, storage, or consumption). Any of the methods described herein may further involve distilling, pasteurizing and/or carbonating the fermented product. In some embodiments, the methods involve carbonating the fermented product, for example as shown in FIG. 1E). Methods of carbonating fermented beverages are known in the art and include, for example, force carbonating with a gas (e.g., carbon dioxide, nitrogen), naturally carbonating by adding a further sugar source to the fermented beverage to promote further fermentation and production of carbon dioxide (e.g., bottle conditioning).

Fermented Products

Aspects of the present disclosure relate to fermented products produced by any of the methods disclosed herein. In some embodiments, the fermented product is a fermented beverage. Examples of fermented beverages include, without limitation, beer, wine, sake, mead, cider, cava, sparkling wine (champagne), kombucha, ginger beer, water kefir. In some embodiments, the beverage is beer. In some embodiments, the beverage is wine. In some embodiments, the beverage is sake. In some embodiments, the beverage is mead. In some embodiments, the beverage is cider.

In some embodiments, the fermented product is a fermented food product. Examples of fermented food products include, without limitation, cultured yogurt, tempeh, miso, kimchi, sauerkraut, fermented sausage, bread, soy sauce.

According to aspects of the invention, increased titers of volatile thiols are produced through the recombinant expression of genes associated with the invention, in yeast cells and use of the cells in the methods described herein. As used herein, an "increased titer" or "high titer" refers to a titer in the nanograms per liter (ng L-1) scale. The titer produced for a given product will be influenced by multiple factors including the choice of medium and conditions for fermentation.

In some embodiments, the titer of volatile thiols (e.g., 3MH, 3MHA, and/or 4MMP) is at least 100 ng L-1. For example, the titer can be at least 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1050, 1100, 1200, 1300, 1400, 1500, 1600, 1700, 1800, 1900, 2000, 2100, 2200, 2300, 2400, 2500, 2600, 2700, 2800, 2900, 3000 or more than 3000 ng L-1.

In some embodiments, the titer of the volatile thiols is at least 1 µg L-1, for example at least 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1050, 1100, 1200, 1300, 1400, 1500, 1600, 1700, 1800, 1900, 2000, 2100, 2200, 2300, 2400, 2500, 2600, 2700, 2800, 2900, 3000 µg L-1.

In some embodiments, the titer of the volatile thiols is at least 1 mg L-1, for example at least 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1050, 1100, 1200, 1300, 1400, 1500, 1600, 1700, 1800, 1900, 2000, 2100, 2200, 2300, 2400, 2500, 2600, 2700, 2800, 2900, 3000 mg L-1 or more.

In some embodiments, the titer of volatile thiols is limited by the amount of precursors added to the fermentation process.

Aspects of the present disclosure relate to reducing the production of undesired products (e.g., byproducts, off-flavors) such as indoles during fermentation of a product. In some embodiments, expression of the beta-lyases described herein reduce the production of an undesired product by about 5%, 10%, 15%, 20%, 25%, 30%, 35%, 40%, 45%, 50%, 55%, 60%, 65%, 70%, 75%, 80%, 85%, 90%, 95% or more relative to production of the undesired product (e.g., indole) using a wildtype beta-lyase.

Methods of measuring titers/levels of volatile thiols and/or indoles will be evident to one of ordinary skill in the art. In some embodiments, the titers/levels of volatile thiols and/or indoles are measured using gas-chromatograph mass-spectrometry (GC/MS). In some embodiments, the titers/levels of volatile thiols and/or indoles are assessed using sensory panels, including for example human taste-testers.

In some embodiments, the fermented beverage contains an alcohol by volume (also referred to as "ABV," "abv," or "alc/vol") between 0.1% and 30%. In some embodiments, the fermented beverage contains an alcohol by volume of about 0.1%, 0.2%, 0.3%, 0.4%, 0.5%, 0.6%, 0.07%, 0.8%, 0.9%, 1.0%, 1.1%, 1.2%, 1.3%, 1.4%, 1.5%, 1.6%, 1.7%, 1.8%, 1.9%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30% or higher. In some embodiments, the fermented beverage is non-alcoholic (e.g., has an alcohol by volume less than 0.5%).

Kits

Aspects of the present disclosure also provides kits for use of the genetically modified yeast cells, for example to produce a fermented product or ethanol. In some embodiments, the kit contains a modified cell containing a heterologous gene encoding an enzyme with beta-lyase activity.

In some embodiments, the kit is for the production of a fermented beverage. In some embodiments, the kit is for the production of beer. In some embodiments, the kit is for the production of wine. In some embodiments, the kit is for the production of sake. In some embodiments, the kit is for the production of mead. In some embodiments, the kit is for the production of cider.

The kits may also comprise other components for use in any of the methods described herein, or for use of any of the cells as described herein. For example, in some embodiments, the kits may contain grains, water, wort, must, yeast, hops, juice, or other sugar source(s). In some embodiments, the kit may contain one or mor fermentable sugar. In some embodiments, the kit may contain one or more additional agents, ingredients, or components.

Instructions for performing the methods described herein may also be included in the kits described herein.

The kits may be organized to indicate a single use compositions containing any of the modified cells described herein. For example, the single use compositions (e.g., amount to be used) can be packaged compositions (e.g., modified cells) such as packeted (i.e., contained in a packet) powders, vials, ampoules, culture tube, tablets, caplets, capsules, or sachets containing liquids.

The compositions (e.g., modified cells) may be provided in dried, lyophilized, frozen, or liquid forms. In some embodiments, the modified cells are provided as colonies on an agar medium. In some embodiments, the modified cells are provided in the form of a starter culture that may be pitched directly into a medium. When reagents or components are provided as a dried form, reconstitution generally is by the addition of a solvent, such as a medium. The solvent may be provided in another packaging means and may be selected by one skilled in the art.

A number of packages or kits are known to those skilled in the art for dispensing a composition (e.g., modified cells). In certain embodiments, the package is a labeled blister package, dial dispenser package, tube, packet, drum, or bottle.

Any of the kits described herein may further comprise one or more vessel for performing the methods described herein, such as a carboy or barrel.

General Techniques

The practice of the subject matter of the disclosure will employ, unless otherwise indicated, conventional techniques of molecular biology (including recombinant techniques), microbiology, cell biology, biochemistry and immunology, which are within the skill of the art. Such techniques are explained fully in the literature, such as, but without limiting, Molecular Cloning: A Laboratory Manual, second edition (Sambrook, et al., 1989) Cold Spring Harbor Press; Oligonucleotide Synthesis (M. J. Gait, ed., 1984); Methods in Molecular Biology, Humana Press; Cell Biology: A Laboratory Notebook (J. E. Cellis, ed., 1998) Academic Press; Animal Cell Culture (R. I. Freshney, ed., 1987); Introduction to Cell and Tissue Culture (J. P. Mather and P. E. Roberts, 1998) Plenum Press; Cell and Tissue Culture: Laboratory Procedures (A. Doyle, J. B. Griffiths, and D. G. Newell, eds., 1993-8) J. Wiley and Sons; Methods in Enzymology (Academic Press, Inc.); Handbook of Experimental Immunology (D. M. Weir and C. C. Blackwell, eds.); Gene Transfer Vectors for Mammalian Cells (J. M. Miller and M. P. Calos, eds., 1987); Current Protocols in Molecular Biology (F. M. Ausubel, et al., eds., 1987); PCR: The Polymerase Chain Reaction, (Mullis, et al., eds., 1994); Current Protocols in Immunology (J. E. Coligan et al., eds., 1991); Short Protocols in Molecular Biology (Wiley and Sons, 1999).

EQUIVALENTS AND SCOPE

It is to be understood that this disclosure is not limited to any or all of the particular embodiments described expressly herein, and as such may, of course, vary. It is also to be understood that the terminology used herein is for the purpose of describing particular embodiments only and is not intended to be limiting.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this disclosure are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents (i.e., any lexicographical definition in the publications and patents cited that is not also expressly repeated in the disclosure should not be treated as such and should not be read as defining any terms appearing in the accompanying claims). If there is a conflict between any of the incorporated references and this disclosure, this disclosure shall control. In addition, any particular embodiment of this disclosure that falls within the prior art may be explicitly excluded from any one or more of the claims. Because such embodiments are deemed to be known to one of ordinary skill in the art, they may be excluded even if the exclusion is not set forth explicitly herein. Any particular embodiment of the disclosure can be excluded from any claim, for any reason, whether or not related to the existence of prior art.

The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

In the claims articles such as "a," "an," and "the" may mean one or more than one unless indicated to the contrary or otherwise evident from the context. Wherever used herein, a pronoun in a gender (e.g., masculine, feminine, neuter, other, etc. . . . ) the pronoun shall be construed as gender neutral (i.e., construed to refer to all genders equally) regardless of the implied gender unless the context clearly indicates or requires otherwise. Wherever used herein, words used in the singular include the plural, and words used in the plural includes the singular, unless the context clearly indicates or requires otherwise. Claims or descriptions that include "or" between one or more members of a group are considered satisfied if one, more than one, or all of the group members are present in, employed in, or otherwise relevant to a given product or process unless indicated to the contrary or otherwise evident from the context. The disclosure includes embodiments in which exactly one member of the group is present in, employed in, or otherwise relevant to a given product or process. The disclosure includes embodiments in which more than one, or all of the group members are present in, employed in, or otherwise relevant to a given product or process.

Furthermore, the disclosure encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists (e.g., in Markush group format), each subgroup of the elements is also disclosed, and any element(s) can be removed from the group. It should it be understood that, in general, where the disclosure, or aspects of the disclosure, is/are referred to as comprising particular elements and/or features, certain embodiments of the disclosure or aspects of the disclosure consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included in such ranges unless otherwise specified. Furthermore, unless otherwise indicated or otherwise evident from the context and understanding of one of ordinary skill in the art, values that are expressed as ranges can assume any specific value or sub-range within the stated ranges in different embodiments of the disclosure, to the tenth of the unit of the lower limit of the range, unless the context clearly dictates otherwise.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the disclosure, as defined in the following claims.

EXAMPLES

Example 1

Introduction

Volatile thiol molecules like 3MH, 3MHA, and 4MMP are major contributors to the tropical fruit flavors found in certain foods and beverages. Within the wine industry, significant research efforts have been made to enhance biosynthesis of these volatile thiols by *Saccharomyces* wine yeasts during the fermentation of grape must. These efforts have largely focused on increasing efficiency of the beta-lyase catalyzed enzymatic reaction that produces 3MH and 4MMP from their cysteine-conjugate precursors. Several groups have shown that over-expression of endogenous yeast beta-lyases IRC7 and STR3 can enhance production of volatile thiols during fermentation of either grape must, or synthetic grape mediza.[7,10] It has also been shown that expression of the *Escherichia coli* (*E. coli*) tryptophanase/ beta-lyase, TnaA, in yeast cells greatly enhances volatile thiol production during fermentation of both model grape juice, and sauvignon blanc juice.[5,30]

WLP001 H463F Mutation Increases 3MH Concentration while Inhibiting Indole Production It was investigated whether over-expression of IRC7, STR3, or TnaA, in *Saccharomyces* brewer's yeast, would enhance volatile thiol release during beer fermentation. Each of these genes was integrated, in turn, into the ADE2 locus of the California Ale Yeast, WLP001. The strong constitutive promoter, PGK1, was used to drive expression of the heterologous gene.

Beer was brewed using the IRC7-, STR3-, or TnaA-over-expressing yeast strains, as well as a non-engineered WLP001 control (wildtype). Following fermentation, sensory analysis indicated that beer fermented with yeast cells over-expressing STR3 or IRC7 over-expressing strains had an odor profile comparable to the wildtype control strain. In contrast, beer fermented by yeast cells over-expressing TnaA had a distinct, strong odor, characterized as tropical/guava and fecal/diaper (i.e., off-odor).

To quantitatively measure the concentrations of the volatile thiols and other flavor molecules produced during each of these fermentations, gas chromatography/mass spectrometry (GC/MS) analysis was performed on these beers. The analysis revealed that the concentrations of the volatile thiols 3MH, 3MHA, and 4MMP in beer brewed by the wildtype strain were very low, notably below the 5 nanogram per liter (ng/L) detection limit for the assay. Over-expression of STR3 or IRC7 had negligible impact on volatile thiol production, and levels of these thiols in beer brewed by these strains were also below the detection limit (FIG. 3, Y27 and Y33). In contrast, beer brewed using a yeast strain over-expressing TnaA (Y182) contained 229 ng/L of 3MH, an increase of over 45-fold compared to beer brewed using the wildtype strain (FIG. 3).

TnaA expression also led to increased production of other unidentified thiol molecules (not shown), as well as substantial production of indole (302 µg/L), an off-flavor molecule known to impart a strong fecal odor (FIG. 3). From these data it was concluded that TnaA expression in brewing yeast increases the concentrations of 3MH and other volatile thiols that impart tropical fruit flavors in beer, however it also increases the production of the off-flavor, undesired product, indole.

Previous studies have found that TnaA catalyzes the production of indole by cleavage of tryptophan.[30] Without wishing to be bound to any particular theory, it was hypothesized that the increased production of indole in beer fermented by yeast cells over-expressing TnaA was due to cleavage of tryptophan by TnaA. TnaA was then engineered to reduced activity with tryptophan as a substrate, while maintaining relatively high activity with cysteine-conjugate substrates that are the precursors of tropical fruit flavored volatile thiols by mutating amino acid H463 to generate the TnaA-H463F variant.

The activity of several TnaA mutants with the substrates tryptophan, and the cysteine conjugate, S-ethyl-L-cysteine has been reported.[25] Data from the literature showed that introduction of an H463F mutation decreased TnaA activity with tryptophan >2000-fold, while only decreasing activity with S-ethyl-L-Cysteine by 2-fold.

The TnaA-H463F mutation was integrated into the WLP001 strain and used to produce beer with the wort fermentation as described above. The finished beer was found to have a strong guava/*papaya* aroma and, in contrast to beer brewed using yeast expressing wild-type TnaA, did not contain any fecal odors. GC/MS analysis revealed a negligible concentration of indole in beer fermented with TnaA-H463F expressing yeast (FIG. 3, Y502). Surprisingly, although the H463F substitution was previously reported to reduce the activity of the TnaA enzyme with cysteine conjugates, the concentration of 3MH was increased ~25% in the beer produced using yeast cells expressing TnaA-H463F as compared to beer produced using yeast cells expressing wild-type TnaA. The 3MH concentration in beer brewed with the TnaA-H463F mutant was 285 ng/L, an increase of 1.25-fold and 56-fold compared to beer brewed with Y182, and the wild-type yeast strain, respectively.

These data indicate that expression of TnaA-H463F in beer brewing yeast strains drives robust production of 3MH in beer and also reduces the production of undesired indole. Additionally, the H463F mutation in TnaA was also unexpectedly found to increase the production of 3MH in beer relative to levels of 3MH produced using yeast cells expressing the wildtype TnaA.

Methods

Construction of Brewing Yeast Strains

The TnaA coding sequence used here was derived from *Citrobacter amalonaticus* and codon optimized for expression in *Saccharomyces* yeast. This coding sequence was synthesized by TWIST Bioscience (San Francisco, CA), and cloned into a plasmid such that it was flanked by PGK1 promoter and ENO1 terminator sequences derived from *Saccharomyces cerevisiae*. This plasmid also contained the *Saccharomyces cerevisiae* ADE2 coding sequence and regulatory regions, and additionally encoded sequences homologous to the ADE2 locus to enable genomic insertion into brewing yeast by homologous recombination. The TnaA-H463F gene was made by PCR mutagenesis, using this plasmid as a template. STR3 and IRC7 coding sequences used in this work were PCR amplified from the wine yeast strain, VL3, and analogously cloned into integration plasmids.

Prior to transformation into yeast, plasmids were digested with restriction enzymes to yield linear DNA fragments containing ADE2 and the gene of interest, flanked by ADE2 homology regions. Linear DNA was transformed into the brewing yeast strain WLP001 bearing an ADE2 coding sequence deletion, resulting in homologous recombination of the nucleic acid encoding the TnaA-H463F gene.

Three days after transformation, white colonies were selected based on rescue of the adenine biosynthesis pathway by the TnaA-ADE2 nucleic acid and screened by diagnostic PCR for insertion of ADE2/TnaA-H463F DNA at the ADE2 locus.

Beer Brewing

Strains were streaked on YPD medium and grown for 3 days at 25° C. Single colonies were used to inoculate initial 5 milliliter (mL) malt extract (ME, Sigma-Aldrich, St. Louis, MO, USA) cultures in glass culture tubes, which were grown for 1 day at 25° C. with shaking at 200 revolutions per minute (rpm). The resulting cultures were used to inoculate 1 liter (L) ME cultures in 2 L glass Erlenmeyer flasks, which were then grown for 2 days at 25° C. with shaking at 200 rpm. The resulting cultures were then used to inoculate 20 L beer wort in cylindroconical fermentors and grown for 10 days at 20° C.

For beer fermentations, 28.6 kilograms (kg) of 2-Row malt was milled, combined with 2.3 kg oats, and added to 100 L of water treated with 39 grams (g) of brewing salts. Mashing was performed for 60 minutes (min) at 67° C. The wort was allowed to recirculate for 10 min and was separated by lautering. Sparging occurred for 37 min, giving a final pre-boil volume in the brew kettle of 146 L. The wort was boiled until it reached a final volume of 137 L and a gravity of 12.6 Plato. Fifty-eight grams of Warrior hop pellets were added to the kettle and boiled for 1 hour (h). Ingredients were sourced from Brewers Supply Group (Shakopee, MN, USA), except where otherwise noted. After the wort was separated from the hot trub, it was transferred to six 20 L cylindroconical fermentors (SS Brewtech, Temecula, CA, USA). The beers were fermented at 20° C. until they reached terminal gravity, held for an additional 24 h for vicinal diketone (VDK) removal, and then cold conditioned at 0° C. to yield finished beer which was subsequently analyzed by gas chromatography mass spectrometry analysis for volatile thiols and indole.

GC/MS Analysis 3 mercaptohexanol and indole were quantified by gas chromatography/mass-spectrometry (GC/MS) analysis, using an Agilent 6890 series GC and 5973N mass selective detector with an electron ionization source operating in positive mode (Agilent Technologies, Santa Clara, CA, USA). For all experiments, helium (He) was used as the carrier gas flowing at a constant rate of 1.0 mL/min onto a HP-5 ms column (Agilent, 30 m length, 0.25 mm inner diameter (i.d.), 0.25 m film thickness). Oven temperature was held at 50° C. for 3 min, followed by a ramp of 10° C./min to a temperature of 275° C. and held for 1 min, followed by a ramp of 50° C./min to a final temperature of 325° C. and held for 5 min. All reagents and standards were acquired from Sigma-Aldrich, St. Louis, MO, USA.

Sampling and ion monitoring was optimized for each analyte: for quantifying 3 mercaptohexanol, 200 mL of finished beer was used for analysis. 1 g EDTA disodium salt and 2 g NaCl were added and the sample was extracted with 23 mL pentane two times in a separatory funnel. The organic phase was combined then washed with 20 mL NaHCO$_3$ (0.3% weight to volume (w/v), pH 6). Thiols were deprotonated and extracted from the organic phase by back extracting into 6 mL cold (4° C.) 1 N NaOH. The aqueous phase was then transferred to a 20 mL headspace vial. Residual pentane was removed by flowing a steady stream of N2 gas over the sample for 7 min. 100 microliters (p L) of 2,3,4,5,6-pentafluorobenzyl bromide (0.4% v/v in EtOH) was added and the vial was sealed with a screw cap and derivatized for 20 min at room temp. 0.5 g tartaric acid was then added to decrease the pH of the sample to ~4.5. 2 g NaCl was added before resealing the vial. Derivatized thiols were adsorbed onto a PDMS/DVB solid phase microextraction fiber for 1 hour at 70° C. Analytes were then desorbed onto the column at 250° C. for 10 min using a splitless injection. Derivatized thiols were detected by selectively monitoring m/z ions 133 and 181. Peak areas for 3 mercaptohexanol were quantified using MassHunter software (Agilent Technologies, Santa Clara, CA, USA). Absolute sample concentrations were calculated using a linear model generated from a standard curve composed of authentic standards and using 181 as the quant ion.

For quantifying indole, 1 mL of beer was sampled and extracted with 0.5 mL ethyl acetate by vortexing for 10 seconds (sec) followed by centrifugation at 15,000×gravity for 10 min. The organic phase was transferred to a 1.5 mL tube and Na2SO4 was added in excess to remove residual water. The sample was then briefly vortexed and centrifuged at 15,000×gravity for 5 min. The ethyl acetate was then transferred to a GC vial and 1 µL of the resulting extract was injected onto the column using a splitless injection. Indole was detected by selectively monitoring m/z ions 63, 90, and 117. Peak areas for indole were quantified using Agilent MassHunter Qualitative software. Absolute sample concentrations were calculated using a linear model generated from a standard curve composed of authentic standards and using 117 as the quant ion.

Figure 2:
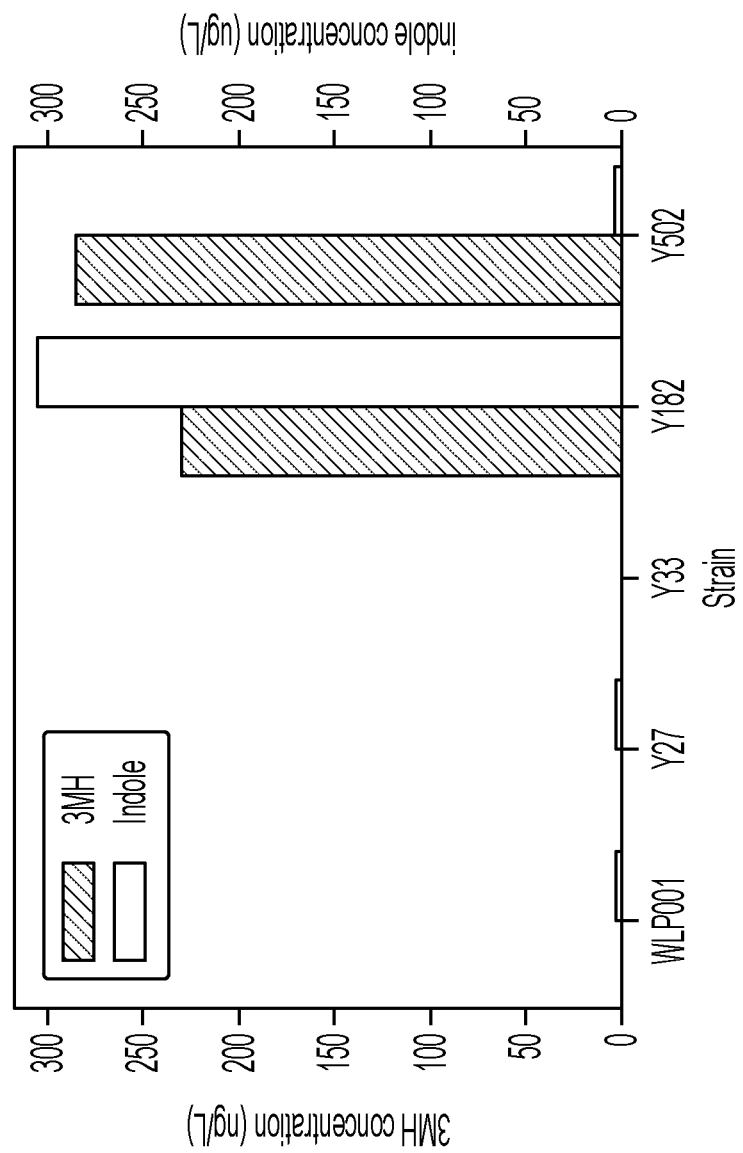
FIG. 2 shows concentrations of 3 mercaptohexanol (3MH) and indole in beer brewed by wild-type yeast strains and engineered yeast strains. The left axis shows 3MH concentration and the right axis reports indole concentration. Strains shown from left to right: wild-type California Ale yeast (WLP001); WLP001 over-expressing IRC7 (Y27); WLP001 over-expressing STR3 (Y33); WLP001 over-expressing TnaA (Y182); and WLP001 over-expressing TnaA-H463F (Y502).

As shown in FIG. 2, beer brewed using WLP001 over-expressing wildtype TnaA (Y182) and WLP001 over-expressing TnaA-H463F mutant (Y502) was found to contain increased concentrations of 3MH relative to beer brewed using the wild-type California Ale yeast (WLP001), WLP001 over-expressing IRC7 (Y27), and WLP001 over-expressing STR3 (Y33). However, beer brewed using WLP001 over-expressing wildtype TnaA (Y182) was also found to contain increased concentrations of indole, whereas beer brewed using WLP001 over-expressing TnaA-H463F mutant (Y502) contained low indole levels.

Example 2

Generation of Wine Fermentation Strains

The TnaA coding sequence was derived from *Citrobacter amalonaticus* and codon optimized for expression in *Saccharomyces* yeast, as described in Example 1, and used to transform into the wine fermenting yeast strain Red Star Cote des Blancs.

Production of Fermented Products

The genetically modified yeast strains described herein were evaluated in fermentation of beer and wine. Briefly, the beer brewing strain California Ale Yeast WLP001 described in Example 1 and the wine fermenting strain Red Star Cote de Blancs expressing wildtype TnaA (Y919) and TnaA H463F (Y484) were cultured and were used to inoculate initial cultures. The resulting cultures were used to inoculate larger cultures which were then grown for several days. The resulting cultures were then used to inoculate 20 L wort, in the case of beer fermentation, or grape must or grape juice, for wine fermentation, in fermentors and were grown for several days until they reached a desired terminal gravity. The beer and wine were subsequently analyzed by gas chromatography mass spectrometry analysis for volatile thiols and indole, as described in Example 1.

Figure 3A:
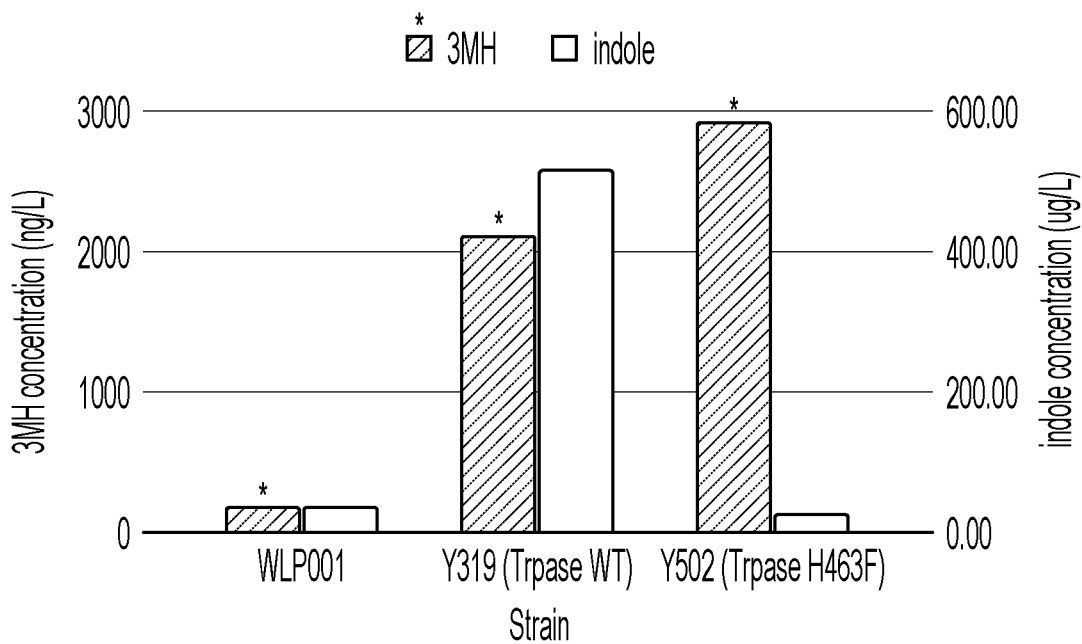
FIGS. 3A and 3B show concentrations of 3 mercaptohexanol (3MH) and indole in fermented products produced using the indicated yeast strains.
Figure 3B:
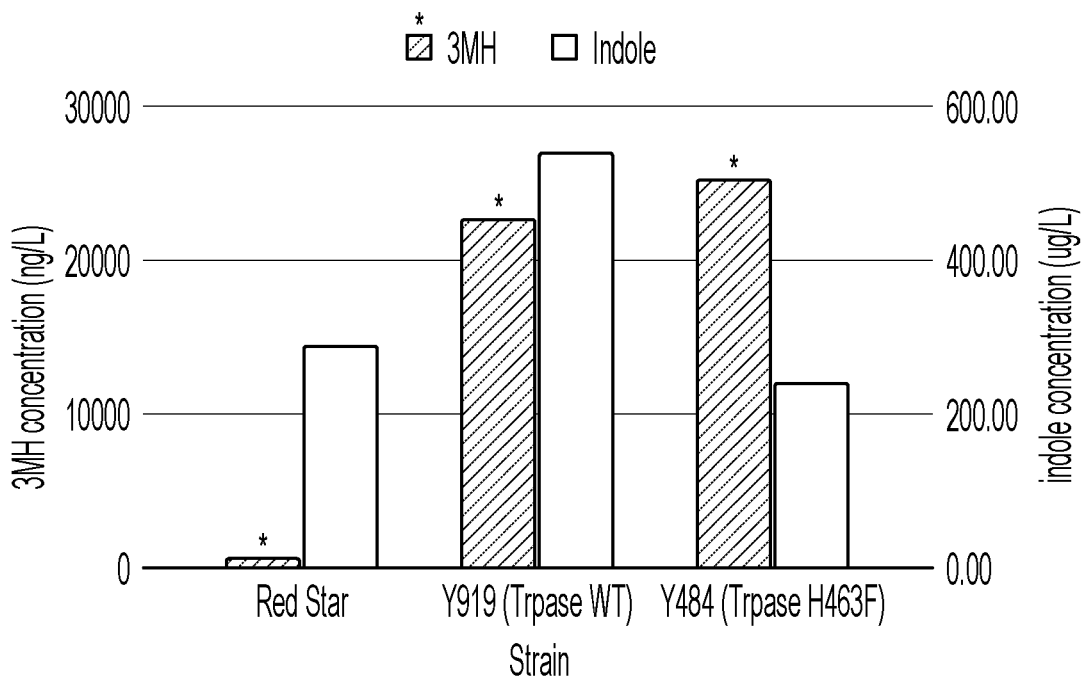

As shown in FIGS. 3A and 3B, the strains expressing the TnaA H463F mutation resulted in fermented products having increased 3MH concentrations while keeping indole concentrations comparable to the wildtype parent strains (WLP001 and Red Star, respectively).

Example 3

Addition of Precursors to Fermentation Process

The yeast strains described herein were further analyzed for production of fermented products using processes involving the addition of precursor to the fermentation process. As shown in FIG. 1G, at least one precursor to the medium or during the first fermentation process.

The yeast strains were cultured as described in Example 1. At initiation of the fermentation process, glutathione conjugated 3-mercaptohexan-1-ol (Glut-3-MH) was added to the wort. The yeast strains were inoculated in the wort in the presence or absence of Glut-3-MH. The beers were fermented at 20° C. until they reached terminal gravity, held for an additional 24 h for vicinal diketone (VDK) removal, and then cold conditioned at 0° C. to yield finished beer which was subsequently analyzed by gas chromatography mass spectrometry analysis for volatile thiols and indole.

Figure 4A:
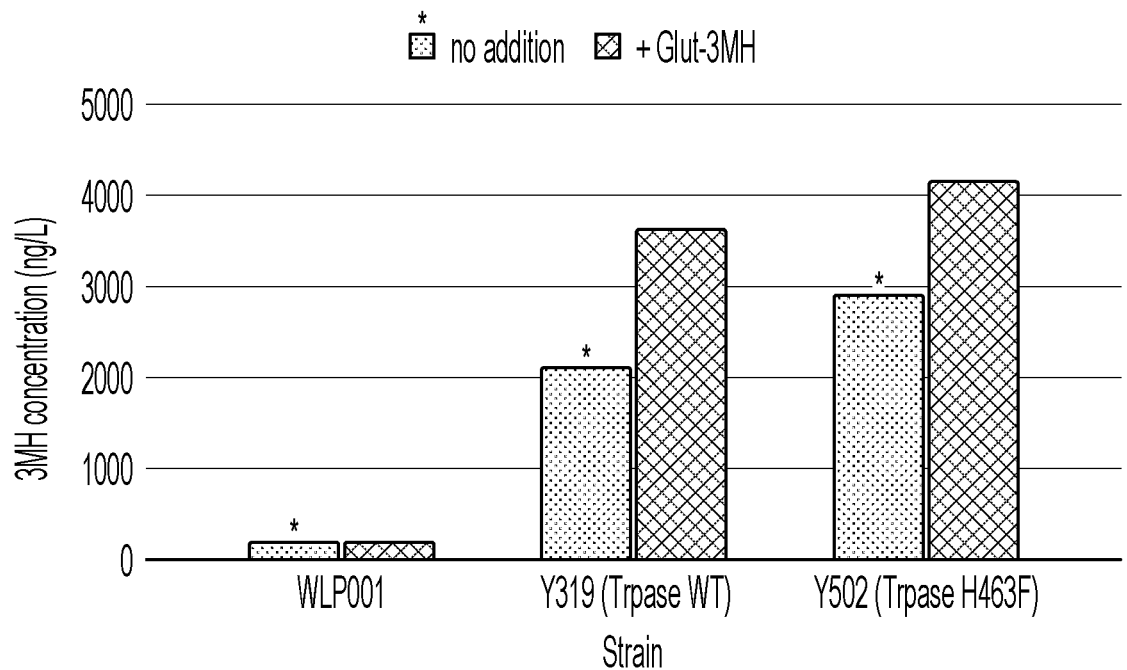
FIGS. 4A and 4B show concentrations of volatile thiols and indole in fermented products produced using the indicated yeast strains in the presence or absence of added glutathione conjugated 3-mercaptohexan-1-ol (Glut-3MH).
Figure 4B:
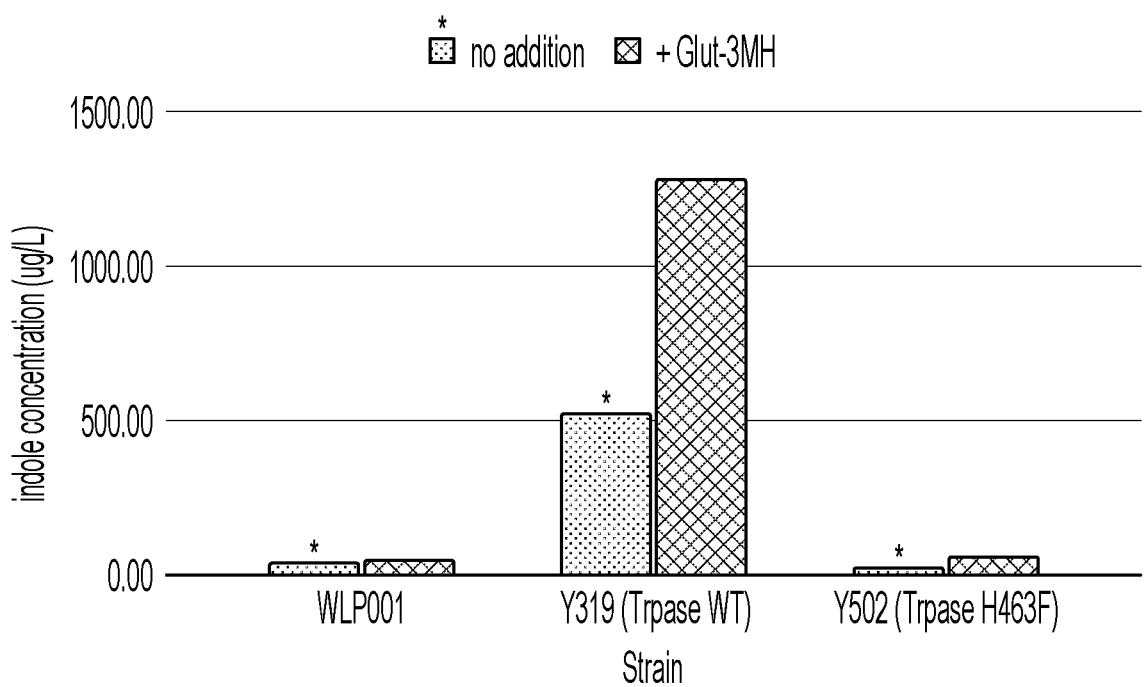

As shown in FIGS. 4A and 4B, the concentration of 3MH was increased in fermented products in beer fermentations using strains expressing wildtype TnaA or the TnaA H463F mutant in the presence or absence of additional Glut-3-MH to the fermentation process. The indole concentration was also increased in fermented products in beer fermentations using strains expressing wildtype TnaA, however, indole concentrations in beer fermentation using strains expressing TnaA H463F mutant were comparable to the wildtype parent strain (WLP001) in the presence or absence of additional Glut-3-MH to the fermentation process. The addition of the precursor Glut-3MH to the fermentation process resulted in increased production of 3MH as compared to control fermentations without the addition of Glut-3MH.

Example 4

Evaluation of TnaA Substitution Mutants

As described in Example 1, beer brewed using yeast strains expressing TnaA H463F mutant were found to contain increased levels of 3MH and low levels of indole as compared to beer brewed using yeast strains expressing wildtype TnaA. Additional amino acid substitutions of the histidine residue as position 463 of TnaA were also evaluated. Briefly, mutant TnaA genes containing a substitution of the histidine residue at position 463 to arginine (H463R), glutamic acid (H463E), threonine (H463T), glycine (H463G), isoleucine (H463I), or valine (H463V) were made by PCR mutagenesis, cloned into an expression plasmid under control of the HHF2 promoter, and transformed into yeast strains. See, Table 1.

The yeast strains were inoculated in wort and fermented at 20° C. until they reached terminal gravity, held for an additional 24 h for vicinal diketone (VDK) removal, and then cold conditioned at 0° C. to yield finished beer which was subsequently analyzed by gas chromatography mass spectrometry analysis for volatile thiols and indole.

Figure 5:
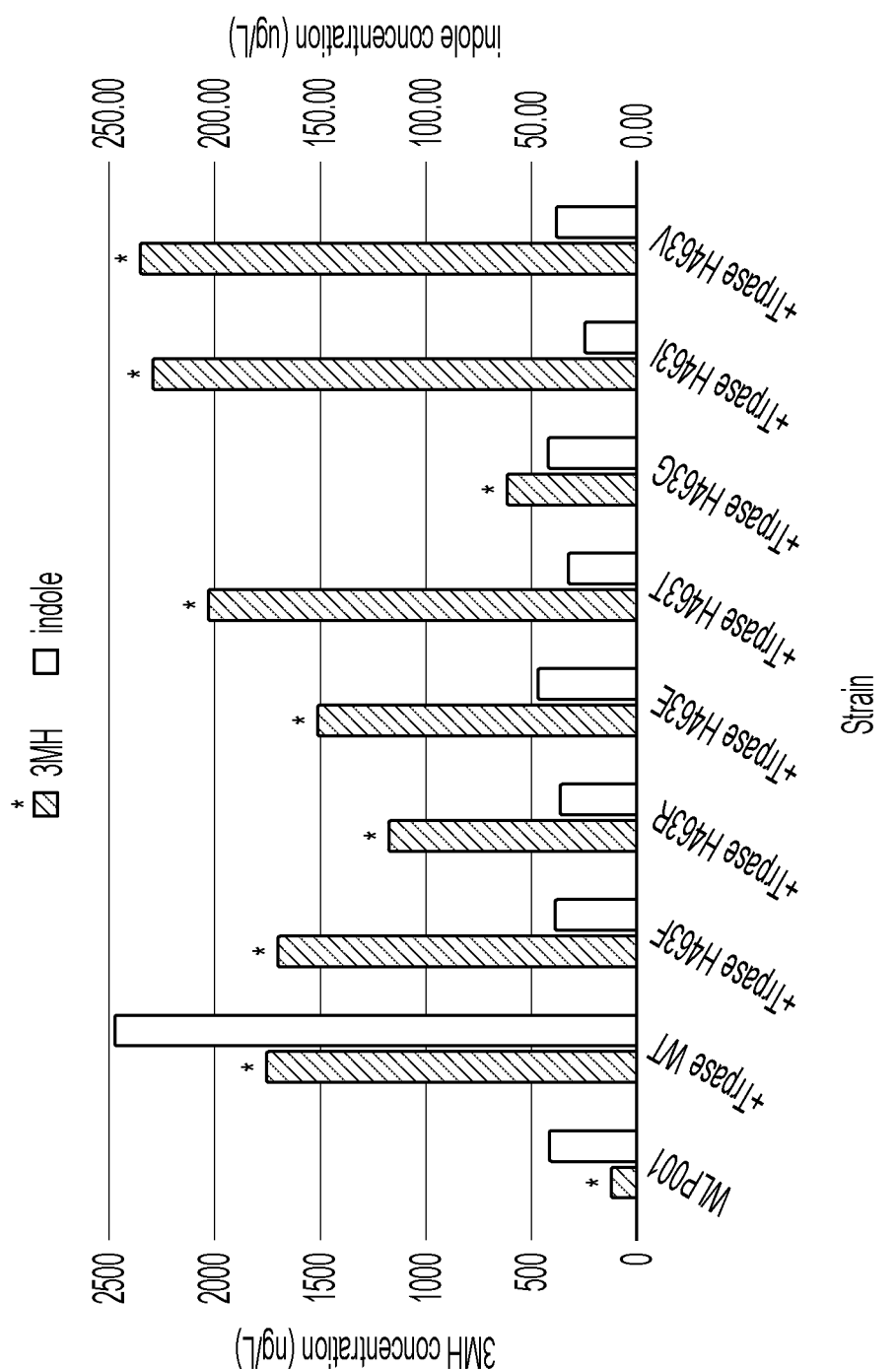
FIG. 5 shows concentrations of 3-mercaptohexan-1-ol (3MH) and indole in beer brewed using yeast strains expressing TnaA containing the indicated amino acid mutations. The left axis shows 3MH concentration (ng/L), and the right axis reports indole concentration (μg/L). Strains shown from left to right: wild-type California Ale yeast (WLP001); WLP001 over-expressing wildtype TnaA (Trpase WT); WLP001 over-expressing TnaA H463F mutant (Trpase H463F); WLP001 over-expressing wildtype TnaA H463R mutant (Trpase H463R); WLP001 over-expressing TnaA H463E mutant (Trpase H463E); WLP001 over-expressing wildtype TnaA H463T mutant (Trpase H463T); WLP001 over-expressing wildtype TnaA H463G mutant (Trpase H463G); WLP001 over-expressing wildtype TnaA H463I mutant (Trpase H463I); and WLP001 over-expressing wild-type TnaA H463V mutant (Trpase H463V).

As shown in FIG. 5, the concentration of 3MH was increased in fermented products in beer fermentations using strains expressing wildtype TnaA or the TnaA H463 mutants. The indole concentration was also increased in fermented products in beer fermentations using strains expressing wildtype TnaA, however, indole concentrations in beer fermentation using strains expressing the TnaA H463 mutants were comparable to the wildtype parent strain (WLP001).

Evaluation of TnaA Homologs

Homologs of TnaA from C. amalonaticus were identified, cloned into integration plasmid under control of the PGK1 promoter, and transformed into yeast strains. See, Table 1.

The yeast strains were inoculated in wort and fermented at 20° C. until they reached terminal gravity, held for an additional 24 h for vicinal diketone (VDK) removal, and then cold conditioned at 0° C. to yield finished beer which was subsequently analyzed by gas chromatography mass spectrometry analysis for volatile thiols and indole.

Figure 6:
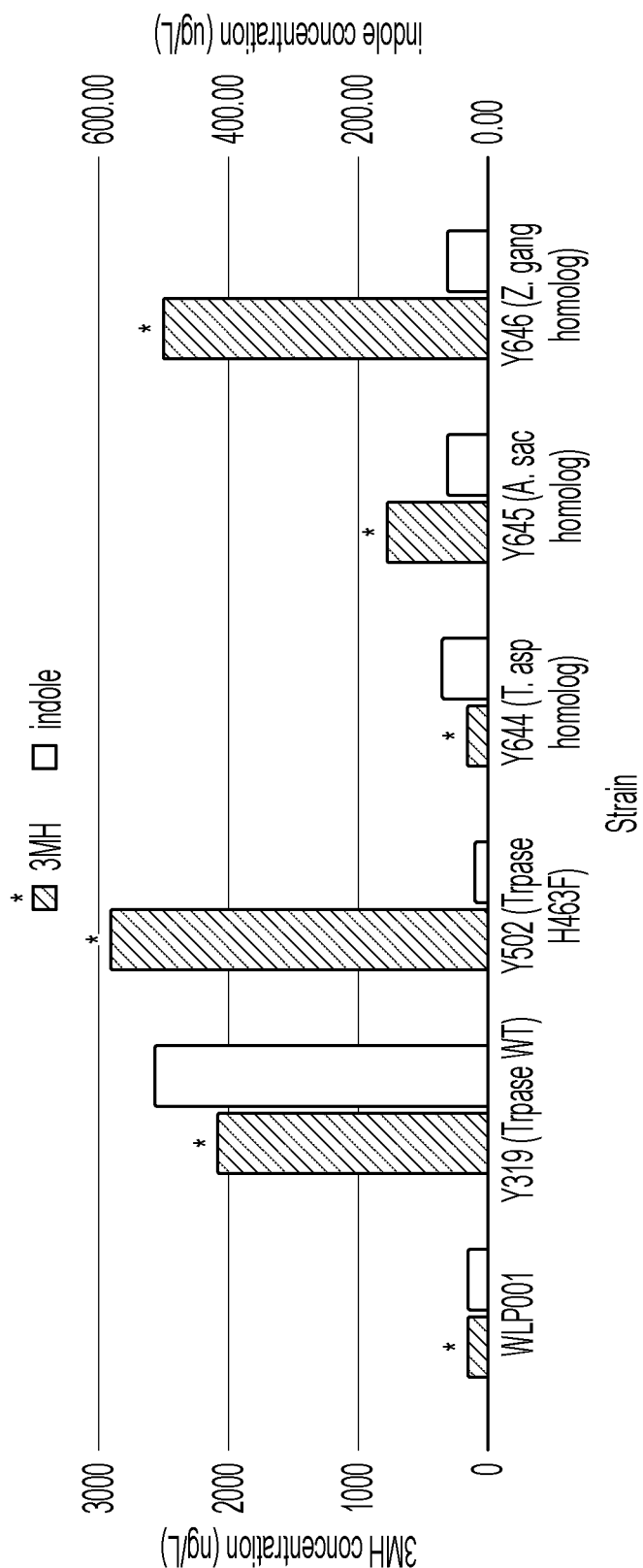
FIG. 6 shows concentrations of 3-mercaptohexan-1-ol (3MH) and indole in beer brewed using yeast strains expressing the tryptophanase TnaA from *Citrobacter amalonaticus* and homologous enzymes from other species. The left axis shows 3MH concentration (ng/L), and the right axis reports indole concentration (μg/L). Strains shown from left to right: wild-type California Ale yeast (WLP001); WLP001 over-expressing wildtype (WT) TnaA from *C. amalonaticus* (Y319; Trpase WT); WLP001 over-expressing TnaA from *C. amalonaticus* Trpase H463F mutant (Y502; Trpase H463F); WLP001 over-expressing a TnaA/Trpase homolog from *Trichoderma asperellum* (Y644; *T. asp* homolog); WLP001 over-expressing a TnaA/Trpase homolog from *Aspergillus saccharolyticus* (Y645; *A. sac* homolog); and WLP001 over-expressing a TnaA/Trpase homolog from *Zooshikella ganghwensis* (Y646; *Z. gang* homolog).

As shown in FIG. 6, the concentration of 3MH was increased in beer brewed using strains expressing wildtype TnaA, the TnaA H463F mutant, or TnaA homologs from T. asperellum, A. saccharolyticus, and Z. ganghwensis, which have 38%, 44%, and 82% sequene identities to TnaA from C. amalonaticus, respectively. The indole concentration was also increased in beer brewed using strains expressing wildtype TnaA, however, indole concentrations in beer fermentation using strains expressing the TnaA H463F mutant, or TnaA homologs from A. saccharolyticus and Z. ganghwensis were comparable to the wildtype parent strain (WLP001).

REFERENCES

1. Cannon, R. J. & Ho, C.-T. Volatile sulfur compounds in tropical fruits. Journal of Food and Drug Analysis (2018) 26, 445-468.
2. Watson, B. Early 2018 Beer Style Trends I Brewers Association. Brewers Association (2018). Available at: brewersassociation.org/insights/early-2018-beer-style-trends/.
3. Hahn, F. Why the hottest trend in beer is an IPA that tastes like pineapple or mango. Washington Post (2016). Available at: washingtonpost.com/lifestyle/food/pineapple-and-mango-in-the-pint-glass-so-hot-right-now/2016/05/22/73f6c52a-1dd2-11e6-b6e0-c53b7ef63b45_story.html.
4. Tominaga, T., Furrer, A., Henry, R. & Dubourdieu, D. Identification of new volatile thiols in the aroma of Vitis vinifera L. var. Sauvignon blanc wines. Flavour and Fragrance Journal (1998) 13, 159-162.
5. Swiegers, J. H. et al. Engineering volatile thiol release in Saccharomyces cerevisiae for improved wine aroma. Yeast (2007) 24, 561-574.

TABLE 1

Yeast strains

| Strains | Parent | Genotype/plasmid | Description |
| --- | --- | --- | --- |
| WLP001 | — | wt | S. cerevisise California Ale brewing strain |
| Y319 | WLP001 | ade2::pADE2-ADE2/pPGK1-Ca_TRPase | Wild type TRPase |
| Y502 | WLP001 | ade2::pADE2-ADE2/pPGK1-Ca_TRPase H463F | TRPase H463F |
| Y844 | WLP001 | ADE2::pADE2-ADE2/pPGK1-Tasp_TRPase | T. asperellum TRPase homolog |
| Y645 | WLP001 | ADE2::pADE2-ADE2/pPGK1-Acac_Trpase | A. saccharolyticus TRPase homolog |
| Y645 | WLP001 | ADE2::pADE2-ADE2/pPGK1-Zgang_Trpase | Z. ganghwensis TRPase homolog |
| WLP001 + TRPase WT | WLP001 | g418 HHF2p-Ca_TRPase-ENO1t | contains plasmid expressing Ca_TRPase |
| WLP001 + TRPase H463F | WLP001 | g418 HHF2p-Ca_TRPase_H463F-ENO1t | contains plasmid expressing Ca_TRPase-H463F |
| WLP001 + TRPase H463R | WLP001 | g418 HHF2p-Ca_TRPase_H463R-ENO1t | contains plasmid expressing Ca_TRPase-H463R |
| WLP001 + TRPase H463E | WLP001 | g418 HHF2p-Ca_TRPase_M463E-ENO1t | contains plasmid expressing Ca_TRPase-H463E |
| WLP001 + TRPase H463T | WLP001 | g418 HHF2p-Ca_TRPase_M463T-ENO1t | contains plasmid expressing Ca_TRPase-H463T |
| WLP001 + TRPase H463G | WLP001 | g418 HHF2p-Ca_TRPase_H463G-ENO1t | contains plasmid expressing Ca_TRPase-H463G |
| WLP001 + TRPase H463I | WLP001 | g418 HHF2p-Ca_TRPase_H463I-ENO1t | contains plasmid expressing Ca_TRPase-H463I |
| WLP001 + TRPase H463V | WLP001 | g418 HHF2p-Ca_TRPase_H463V-ENO1t | contains plasmid expressing Ca_TRPase-H463V |
| Red Star | — | wt | S. cerevisiae chardonnay strain |
| Y919 | Red Star Cote des Blancs | pPDC6::pPGK1-Ca_TRPase | Wild type TRPase |
| Y484 | Red Star Cote des Blancs | pPDC6::pPGK1-Ca_TRPase H463F | TRPase H463F |

6. Howell, K. S. et al. Genetic determinants of volatile-thiol release by *Saccharomyces cerevisiae* during wine fermentation. *Appl. Environ. Microbiol.* (2005) 71, 5420-5426.
7. Santiago, M. & Gardner, R. C. Yeast genes required for conversion of grape precursors to varietal thiols in wine. *FEMS Yeast Res.* (2015) 15, fov034.
8. Roland, A., Cavelier, F. & Schneider, R. How organic and analytical chemistry contribute to knowledge of the biogenesis of varietal thiols in wine. A review. *Flavour and Fragrance Journal* (2012) 27, 266-272.
9. Jeffery, D. W. Spotlight on Varietal Thiols and Precursors in Grapes and Wines. *Australian Journal of Chemistry* (2016) 69, 1323.
10. Holt, S. et al. Engineering *Saccharomyces cerevisiae* to release 3-Mercaptohexan-1-ol during fermentation through overexpression of an *S. cerevisiae* Gene, STR3, for improvement of wine aroma. *Appl. Environ. Microbiol.* 7(2011) 7, 3626-3632.
11. Roncoroni, M. et al. The yeast IRC7 gene encodes a R-lyase responsible for production of the varietal thiol 4-mercapto-4-methylpentan-2-one in wine. *Food Microbiol.* (2011) 28, 926-935.
12. Thibon, C. et al. Nitrogen catabolic repression controls the release of volatile thiols by *Saccharomyces cerevisiae* during wine fermentation. *FEMS Yeast Res.* (2008) 8, 1076-1086.
13. Bartowsky, E. J. & Pretorius, I. S. Microbial Formation and Modification of Flavor and Off-Flavor Compounds in Wine. Biology of Microorganisms on Grapes, in Must and in Wine 209-231 doi:10.1007/978-3-540-85463-0_11.
14. Holt, S., Miks, M. H., de Carvalho, B. T., Foulquid-Moreno, M. R. & Thevelein, J. M. The molecular biology of fruity and floral aromas in beer and other alcoholic beverages. *FEMS Microbiol. Rev.* (2019) 43, 193-222.
15. Vanzo, A. et al. UHPLC-MS/MS determination of varietal thiol precursors in Sauvignon Blanc grapes. *Sci. Rep.* (2017) 7.
16. Roland, A., Schneider, R., Razungles, A. & Cavelier, F. Varietal thiols in wine: discovery, analysis and applications. *Chem. Rev.* (2012) 111, 7355-7376.
17. Tominaga, T., Masneuf-Pomarède, I. & Dubourdieu, D. A S-cysteine conjugate, precursor of aroma of White Sauvignon. *OENO One* (1995) 29, 227.
18. Tominaga, T., des Gachons, C. P. & Dubourdieu, D. A New Type of Flavor Precursors in *Vitis vinifera* L. cv. Sauvignon Blanc: S-Cysteine Conjugates. *Journal of Agricultural and Food Chemistry* (1998) 46, 5215-5219.
19. Pena-Gallego, A., Hernández-Orte, P., Cacho, J. & Ferreira, V. S-Cysteinylated and S-glutathionylated thiol precursors in grapes. A review. *Food Chemistry* (2012) 131, 1-13.
20. Kishimoto, T., Morimoto, M., Kobayashi, M., Yako, N. & Wanikawa, A. Behaviors of 3-Mercaptohexan-1-ol and 3-Mercaptohexyl Acetate during Brewing Processes. *Journal of the American Society of Brewing Chemists* (2008) 66, 192-196.
21. Pinu, F. R., Jouanneau, S., Nicolau, L., Gardner, R. C. & Villas-Boas, S. G. Concentrations of the Volatile Thiol 3-Mercaptohexanol in Sauvignon blanc Wines: No Correlation with Juice Precursors. *American Journal of Enology and Viticulture* (2012) 63, 407-412.
22. Newton, W. A. & Snell, E. E. CATALYTIC PROPERTIES OF TRYPTOPHANASE, A MULTIFUNCTIONAL PYRIDOXAL PHOSPHATE ENZYME. *Proc. Natl. Acad. Sci. U.S.A.* (1964) 51, 382-389.
23. Pretorius, I. S. & Swiegers, J. H. Methods and microorganisms for modulating the conversion of non-volatile sulfur compounds to volatile thiol compounds. PCT Publication No. WO 2007/095682.
24. Pinu, F. R., Edwards, P. J. B., Gardner, R. C. & Villas-Boas, S. G. Nitrogen and carbon assimilation by *Saccharomyces cerevisiae* during Sauvignon blanc juice fermentation. *FEMS Yeast Res.* (2014) 14, 1206-1222.
25. Phillips, R. S., Johnson, N. & Kamath, A. V. Formation in Vitro of Hybrid Dimers of H463F and Y74F Mutant *Escherichia coli* Tryptophan Indole-lyase Rescues Activity with 1-Tryptophan†. *Biochemistry* (2002) 41, 4012-4019.
26. Cordente, A. G. et al. Inactivating Mutations in Irc7p Are Common in Wine Yeasts, Attenuating Carbon-Sulfur β-Lyase Activity and Volatile Sulfur Compound Production. *Appl. Environ. Microbiol.* (2019) 85.
27. Davis, P. M. & Qian, M. C. Progress on Volatile Sulfur Compound Analysis in Wine. ACS Symposium Series 93-115 (2011). doi:10.1021/bk-2011-1068.ch005
28. Smith, M. E., Bekker, M. Z., Smith, P. A. & Wilkes, E. N. Sources of volatile sulfur compounds in wine. *Australian Journal of Grape and Wine Research* (2015) 21, 705-712.
29. Charoenchai, C. Yeasts in Fruit Wine Fermentation. *Yeasts in the Production of Wine* (2019) 461-476. doi: 10.1007/978-1-4939-9782-4_15
30. Li, G. & Young, K. D. Indole production by the tryptophanase TnaA in *Escherichia coli* is determined by the amount of exogenous tryptophan. *Microbiology* (2013) 159, 402-410.

What is claimed is:

1. A genetically modified yeast cell, comprising a heterologous gene encoding a beta-lyase variant having beta-lyase activity that, when used for fermenting unhopped wort:
   (i) produces less than 150 μg/L indole and at least 200 ng/L 3-mercaptohexan-1-ol (3MH); or
   (ii) produces at least a 5-fold increased concentration of 3MH fold, as compared to a cell from which the genetically modified yeast cell is derived, and produces an indole concentration that is reduced by at least 5% as compared to a genetically modified yeast cell comprising wild-type beta-lyase.

2. The genetically modified yeast cell of claim 1, wherein the beta-lyase variant having beta-lyase activity has a sequence comprising the amino acid sequence of SEQ ID NO: 2 or a homolog thereof having an amino acid sequence with at least 90% sequence identity to the sequence as set forth in SEQ ID NO: 2,
   wherein the homolog does not comprise the sequence as set forth in SEQ ID NO: 1 and does not have a histidine at residue 463 or a corresponding residue, and
   wherein the sequence identity and the corresponding residue are determined using sequence alignment.

3. The genetically modified yeast cell of claim 2, wherein the beta-lyase variant having beta-lyase activity does not comprise the sequence as set forth in SEQ ID NO: 1, 6, or 7.

4. The genetically modified yeast cell of claim 1, wherein the beta-lyase variant having beta-lyase activity has the amino acid sequence as set forth in any one of SEQ ID NOs: 4 or 5.

5. The genetically modified yeast cell of claim 1, wherein the beta-lyase variant having beta-lyase activity comprises a substitution mutation at a position corresponding to position H463 of SEQ ID NO: 1.

6. The genetically modified yeast cell of claim 5, wherein the substitution mutation at a position corresponding to H463 of SEQ ID NO: 1 is a phenylalanine, arginine, glutamic acid, threonine, glycine, isoleucine, or valine.

7. The genetically modified yeast cell of claim 1, wherein the genetically modified yeast cell is of the genus *Saccharomyces*.

8. A fermentation composition comprising genetically modified yeast cell of claim 1, and wort.

9. The genetically modified yeast cell of claim 5, wherein the beta-lyase variant having beta-lyase activity has a sequence as set forth in SEQ ID NO: 2.

10. The genetically modified yeast cell of claim 5, wherein the beta-lyase variant having beta-lyase activity has a sequence as set forth in SEQ ID NO: 4.

11. The genetically modified yeast cell of claim 5, wherein the beta-lyase variant having beta-lyase activity has a sequence as set forth in SEQ ID NO: 5.

12. The genetically modified yeast cell of claim 1, wherein the genetically modified yeast cell is of the species *Saccharomyces cerevisiae* (*S. cerevisiae*).

13. The genetically modified yeast cell of claim 1, wherein the genetically modified yeast cell is of the species *Saccharomyces pastorianus* (*S. pastorianus*).

14. The genetically modified yeast cell of claim 11, wherein the genetically modified yeast cell is *S. cerevisiae* California Ale Yeast strain WLP001 or Red Star Cote des Blancs.

15. The genetically modified yeast cell of claim 1, wherein the genetically modified yeast cell is capable of producing increased levels of volatile thiols as compared to a cell that does not express the beta-lyase variant having beta-lyase activity.

16. The fermented composition of claim 8, comprising at least 500 ng/L 3MH.

17. The genetically modified yeast cell of claim 1, wherein the indole concentration is reduced by at least 20% compared to a genetically modified yeast cell comprising wild-type beta-lyase.

18. The genetically modified yeast cell of claim 1, wherein the indole concentration is reduced by at least 50% compared to a genetically modified yeast cell comprising wild-type beta-lyase.

19. The genetically modified yeast cell of claim 1, wherein the indole concentration is reduced by at least 70% compared to a genetically modified yeast cell comprising wild-type beta-lyase.

20. The genetically modified yeast cell of claim 1, wherein the wild-type beta-lyase is selected from the amino acid sequence of SEQ ID NOs: 1, 6, or 7.

* * * * *